(12) United States Patent
Amirsolaimani et al.

(10) Patent No.: US 11,635,624 B1
(45) Date of Patent: Apr. 25, 2023

(54) LIGHT GUIDE DISPLAY ASSEMBLY FOR PROVIDING INCREASED PUPIL REPLICATION DENSITY

(71) Applicant: Meta Platforms Technologies, LLC, Menlo Park, CA (US)

(72) Inventors: Babak Amirsolaimani, Redmond, WA (US); Scott Charles McEldowney, Redmond, WA (US); Yun-Han Lee, Redmond, WA (US); Lu Lu, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 172 days.

(21) Appl. No.: 17/135,994

(22) Filed: Dec. 28, 2020

(51) Int. Cl.
*G02B 27/01* (2006.01)
*G02B 27/28* (2006.01)
(52) U.S. Cl.
CPC ....... *G02B 27/0172* (2013.01); *G02B 27/286* (2013.01); *G02B 2027/0178* (2013.01)
(58) Field of Classification Search
CPC .. G02B 27/01; G02B 27/021; G02B 27/0101; G02B 27/0105; G02B 27/0114; G02B 27/0172; G02B 27/0178; G02B 27/286; G02B 2027/0174; G02B 2027/0178; G02B 2027/0185; G02B 2027/0194
See application file for complete search history.

(56) References Cited

U.S. PATENT DOCUMENTS

| | | | |
|---|---|---|---|
| 2017/0363871 A1* | 12/2017 | Vallius | G02B 6/0016 |
| 2019/0056593 A1* | 2/2019 | Bablumyan | G02B 27/44 |
| 2020/0278554 A1* | 9/2020 | Schultz | G02B 6/0031 |
| 2021/0199970 A1* | 7/2021 | Huang | G02B 27/0172 |
| 2021/0271086 A1* | 9/2021 | Song | G02B 6/0036 |
| 2022/0299768 A1* | 9/2022 | Bodiya | G02B 27/0018 |

* cited by examiner

*Primary Examiner* — Sultan Chowdhury
(74) *Attorney, Agent, or Firm* — Millburn IP PLLC

(57) ABSTRACT

A device includes a light guide and at least one in-coupling element configured to couple an image light into the light guide. The device also includes a first out-coupling element configured to couple a first portion of the image light out of the light guide as a plurality of first output lights. The device further includes a second out-coupling element spaced apart from the first out-coupling element by a distance and configured to couple a second portion the image light out of the light guide as a plurality of second output lights. The second output lights are substantially non-overlapping with the first output lights.

20 Claims, 21 Drawing Sheets

LIGHT GUIDE DISPLAY ASSEMBLY FOR PROVIDING INCREASED PUPIL REPLICATION DENSITY

TECHNICAL FIELD

The present disclosure relates generally to devices and, more specifically, to a light guide display assembly for providing an increased pupil replication density.

BACKGROUND

Near-eye displays ("NEDs") and head-up displays ("HUDs") have been widely implemented in a variety of applications, such as video playback, gaming, and sports. NEDs and HUDs have been used to realize virtual reality ("VR"), augmented reality ("AR"), or mixed reality ("MR"). NEDs and HUDs for AR ad/or MR applications display a virtual-environment image overlapping with or superimposed on real-world images or see-through images. Pupil-expansion light guide (or waveguide) display systems or assemblies with diffractive coupling structures are promising designs for NEDs and HUDs, which can potentially offer sun/eye-glasses form factors, a moderately large field of view ("FOV"), a high transmittance, and a large eye-box. A light guide display system includes a display element that generates an image light representing a virtual-environment image, and a light guide coupled with diffractive coupling structures to guide the image light to an eye-box of the light guide display system. The diffractive coupling structures functioning as an out-coupling element replicate the virtual-environment image at the output side of the light guide to expand an effective pupil. The light guide coupled with diffractive coupling structures may also function as an optical combiner to combine the image light and a light from the real world environment, such that the virtual-environment image represented by the image light generated by the display element is overlapped with or superimposed on a real-world image represented by the light from the real world environment.

SUMMARY OF THE DISCLOSURE

Consistent with a disclosed embodiment of the present disclosure, a device is provided. The device includes a light guide and at least one in-coupling element configured to couple an image light into the light guide. The device also includes a first out-coupling element configured to couple a first portion of the image light out of the light guide as a plurality of first output lights. The device further includes a second out-coupling element spaced apart from the first out-coupling element by a distance and configured to couple a second portion of the image light out of the light guide as a plurality of second output lights. The second output lights are substantially non-overlapping with the first output lights.

Consistent with a disclosed embodiment of the present disclosure, a method is provided. The method includes coupling, by at least one in-coupling element, an image light into a light guide. The method also includes coupling, by a first out-coupling element, a first portion of the image light out of the light guide as a plurality of first output lights. The method further includes coupling, by a second out-coupling element spaced apart from the first out-coupling element by a distance, a second portion of the image light out of the light guide as a plurality of second output lights. The second output lights are substantially non-overlapping with the first output lights.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
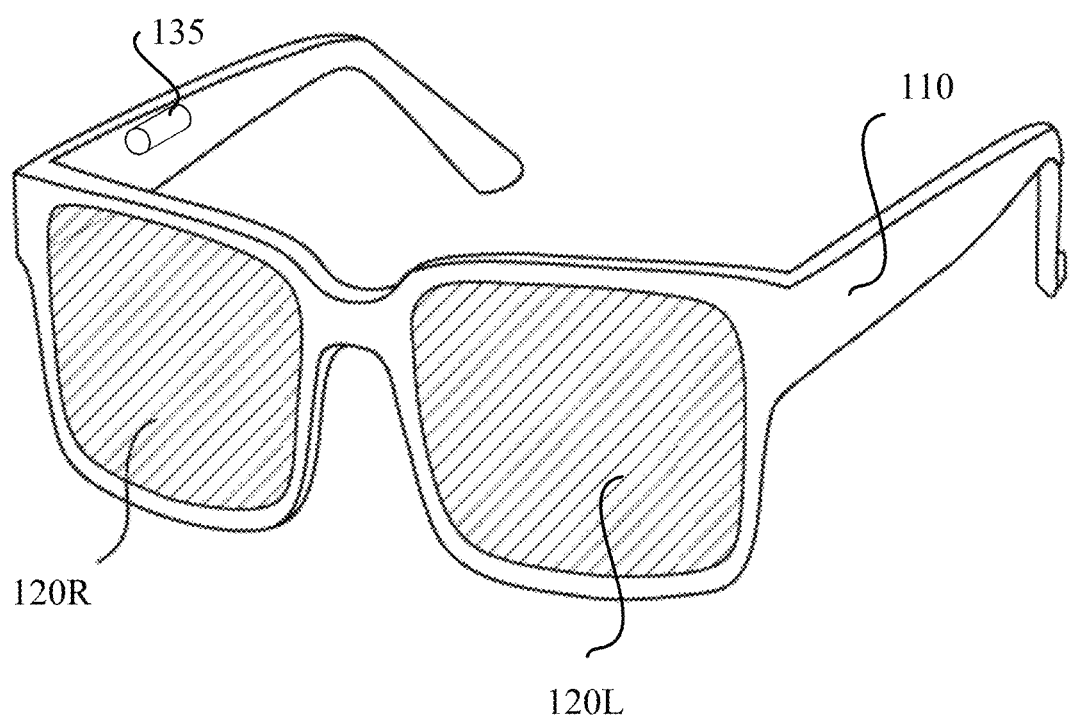
FIG. 1A schematically illustrates a diagram of a near-eye display ("NED"), according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film" and "layer" may include rigid or flexible, self-supporting or free-standing film, coating, or layer, which may be disposed on a supporting substrate or between substrates. The phrases "in-plane direction," "in-plane orientation," "in-plane rotation," "in-plane alignment pattern," and "in-plane pitch" refer to a direction, an orientation, a rotation, an alignment pattern, and a pitch in a plane of a film or a layer (e.g., a surface plane of the film or layer, or a plane parallel to the surface plane of the film or layer), respectively. The term "out-of-plane direction" indicates a direction that is non-parallel to the plane of the film or layer (e.g., perpendicular to the surface plane of the film or layer, e.g., perpendicular to a plane parallel to the surface plane). For example, when an "in-plane" direction refers to a direction within a surface plane, an "out-of-plane" direction may refer to a thickness direction perpendicular to the surface plane, or a direction that is not parallel with the surface plane.

The term "orthogonal" as used in "orthogonal polarizations" or the term "orthogonally" as used in "orthogonally polarized" means that an inner product of two vectors representing the two polarizations is substantially zero. For example, two lights with orthogonal polarizations or two orthogonally polarized lights may be two linearly polarized lights with polarizations in two orthogonal directions (e.g., an x-axis direction and a y-axis direction in a Cartesian coordinate system) or two circularly polarized lights with opposite handednesses (e.g., a left-handed circularly polarized light and a right-handed circularly polarized light).

The present disclosure provides a device (e.g., an optical device) or a light guide display assembly or system configured to provide an increased pupil replication density. The light guide display assembly may include a light guide (or a light guide stack) and one or more polarization selective elements coupled to the light guide (or the light guide stack). The polarization selective elements may function as in-coupling elements and/or out-coupling elements coupled with the light guide (or the light guide stack). In some embodiments, an in-coupling element and an out-coupling element may both be polarization selective. In some embodiments, the in-coupling element may be polarization nonselective, and the out-coupling element may be polarization selective. The light guide coupled with the one or more polarization selective elements may guide an image light representing a virtual-environment image generated by a light source assembly to an eye-box of the optical device in a polarization multiplexing manner and/or in a time multiplexing manner. The output light delivered to a spatial region within the eyebox may form a pupil (e.g., an exit pupil), within which the eye can receive the output light. The eye-box may include a plurality of pupils (e.g., exit pupils). The optical device of the present disclosure may provide an increased pupil replication density at the eye-box. In addition, a gap between neighboring pupils may be reduced as compared to a conventional light guide display assembly. Moreover, the gap between neighboring pupils may be adjusted. With the disclosed light guide display assembly, the image uniformity perceived at the eye-box may be improved, and undesirable artifacts may be suppressed or reduced.

In some embodiments, a polarization selective element may include any suitable polarization selective element, such as one or more polarization selective gratings or holographic elements fabricated based on isotropic or anisotropic materials. The polarization selective gratings or holographic elements may include suitable sub-wavelength structures, a birefringent material (e.g., a liquid crystal material), a photo-refractive holographic material, or any combination thereof. In some embodiments, the polarization selective element may be a linear-polarization selective element. In some embodiments, the polarization selective element may be a circular-polarization selective element.

In some embodiments, the light guide display assembly may include a light guide. In some embodiments, the light guide display assembly may include a first in-coupling element (e.g., a first in-coupling grating) configured to couple (e.g., via diffraction) a first input light (e.g., a first image light) into a TIR path inside the light guide, as a first TIR propagating light. In some embodiments, the first in-coupling element may be polarization selective. The light guide display assembly may also include a second in-coupling element (e.g., a second in-coupling grating) configured to couple a second input light (e.g., a second image light) into a TIR path inside the light guide, as a second TIR propagating light. In some embodiments, the second in-coupling element may be polarization selective. In some embodiments, the first input light and the second input light may have different (e.g., orthogonal) polarizations. In some embodiments, the first TIR propagating light and the second TIR propagating light may have different (e.g., orthogonal or non-orthogonal) polarizations. In some embodiments, at least one first TIR propagating ray included in the first TIR propagating light and at least one second TIR propagating ray included in the second TIR propagating light may have a substantially same propagation angle when propagating within the light guide through TIR.

In some embodiments, the light guide display assembly may include an in-coupling element that is polarization nonselective. The in-coupling element may be configured to couple an input light (e.g., an image light) into a TIR path inside the light guide, as a TIR propagating light. In some embodiments, the TIR propagating light may include two components (which may also be referred to as two lights) with orthogonal polarizations, e.g., a first component (or a first light) and a second component (or a second light) with orthogonal polarizations.

The light guide display assembly may include a first polarization selective out-coupling element (e.g., a first polarization selective out-coupling grating) and a second polarization selective out-coupling element (e.g., a second polarization selective out-coupling grating) having different (e.g., orthogonal) polarization selectivities. For example, the first polarization selective out-coupling element (e.g., the first polarization selective out-coupling grating) may be configured to couple a first TIR propagating light (or the first component of a TIR propagating light) having a first polarization out of the light guide at different positions (e.g., a plurality of first positions) along the light guide as a plurality of first output lights. The second polarization selective out-coupling element (e.g., the second polarization selective out-coupling grating) may be configured to couple a second TIR propagating light (or a second component of the TIR propagating light) having a second polarization out of the light guide at different positions (e.g., a plurality of second positions) along the light guide as a plurality of second output lights. The propagation direction of the second TIR propagating light (or the second component of the TIR propagating light) may be parallel with the propagation direction of the first TIR propagating light (or the first component of the TIR propagating light). In some embodiments, the second TIR propagating light and the first TIR propagating light may have the same propagation angle. The second polarization may be different from the first polarization. For example, in some embodiments, the second polarization may be orthogonal to the first polarization. At each pair of first position and second position, a pair of first output light and second output light may be substantially non-overlapping, forming two separate pupils. In some embodiments, the first output lights and the second output lights may have orthogonal polarizations. In some embodiments, the first output lights and the second output lights may have the same polarization. The first output lights and the second output lights may be distributed at an output side of the light guide to form spatially alternating pupils (e.g., exit pupils). In some embodiments, the propagation directions of the first output lights may be parallel with one another, and the propagation directions of the second output lights may be parallel with one another. In some embodiments, the propagation directions of the first output lights may be parallel with the propagation directions of the second output lights.

In some embodiments, the first polarization selective out-coupling element (e.g., the first polarization selective out-coupling grating) and the second polarization selective out-coupling element (e.g., the second polarization selective out-coupling grating) may be stacked and spaced apart from each other by a distance in a thickness direction of the light guide. In some embodiments, the first polarization selective out-coupling element and the second polarization selective out-coupling element may substantially overlap, or may be substantially aligned in the thickness direction of the light guide. In some embodiments, the first polarization selective out-coupling element and the second polarization selective out-coupling element may have a substantially same light exiting area (e.g., a substantially same area from which the respective TIR propagating light is coupled out from the light guide by the respective polarization selective out-coupling element).

In some embodiments, the first polarization selective out-coupling element and the second polarization selective out-coupling element may be stacked at the same surface of the light guide, and spaced apart from each other by a distance in the thickness direction of the light guide. In some embodiments, a space between the first and second polarization selective out-coupling elements in a thickness direction of the stack may be at least partially filled with an index-matching material for suppressing the light reflections within the space. In some embodiments, a space around the first and second polarization selective out-coupling elements may also be at least partially filled with an index-matching material for suppressing the light reflections within the space. In some embodiments, the distance between the first and second polarization selective out-coupling elements may be defined by the thickness of the index-matching material filled in the space between the first and second polarization selective out-coupling elements. In some embodiments, the thickness of the index-matching material filled in the space between the first and second polarization selective out-coupling elements may be adjustable. The adjustment of the thickness of the index-matching material may be achieved through various mechanisms depending on the type of the index-matching material. For example, when the index-matching material is a liquid or a flowable type, the index-matching material that fills the space between the first and second polarization selective out-coupling elements may be fluidly coupled with a storage tank. When more index-matching material is supplied from the storage tank to the space, the thickness of the index-matching material may be increased. When the index-matching material within the space is withdrawn to the storage tank, the thickness of the index-matching material within the space may be reduced. When the index-matching material is an elastic type (e.g., an elastomer), the thickness of the index-matching material may be changed when the first and second polarization selective out-coupling elements are moved closer to each other to compress the elastic index-matching material and reduce the thickness. The thickness of the index-matching material may be increased when the first and second polarization selective out-coupling elements are moved away from each other to stretch or extend the index-matching material to increase the thickness. In some embodiments, the index-matching material may be self-expandable. When the first and second polarization selective out-coupling elements are moved away to increase the space, the index-matching material may self-expand in the thickness direction, thereby increasing the thickness.

In some embodiments, the first polarization selective out-coupling element (e.g., the first polarization selective out-coupling grating) and the second polarization selective out-coupling element (e.g., the second polarization selective out-coupling grating) may be disposed at different surfaces of the light guide, and spaced apart from each other by the distance in the thickness direction of the light guide. In some embodiments, the distance between the first and second polarization selective out-coupling elements may be defined by the thickness of the light guide. In some embodiments, one or more additional elements/layers/films (e.g., an index-matching material layer) may be disposed between the first and second polarization selective out-coupling elements, and the distance between the first and second polarization selective out-coupling elements may be defined by the sum of the thicknesses of the light guide and the thickness(es) of the one or more additional elements/layers/films. In some embodiments, the thickness of the index-matching material layer disposed between the first and second polarization selective out-coupling elements may be adjustable. The adjustment may be performed through any suitable mechanism, including, but not limited to, the mechanisms described above.

As described above, a first gap or distance may exist between two neighboring output lights (e.g., a first output light and a neighboring second output light) out-coupled by the two polarization selective out-coupling elements respectively within a same output region of the light guide. The first gap between the neighboring output lights in a same region may be variable when the distance between the first and second polarization selective out-coupling elements varies. The output region may be defined as a region of the light guide including a pair of a first position (at which the first output light is output) and a second position (at which the second output light is output). For example, when the distance between the first and second polarization selective out-coupling elements increases, the first gap between two neighboring output lights output within the same output region of the light guide may increase. Accordingly, the first gap between two neighboring pupils formed by or corresponding to two neighboring output lights, which are out-coupled by the two polarization selective out-coupling elements respectively within the same output region of the light guide, may increase. When the distance between the first and second polarization selective out-coupling elements decreases, the first gap between two neighboring output lights may decrease. Accordingly, the first gap between two neighboring pupils corresponding to two neighboring output lights, which are out-coupled by the two polarization selective out-coupling elements respectively within the same output region of the light guide, may decrease. A second gap or distance may exist between two neighboring output lights at two different output regions of the light guide. The second gap may change when the first gap changes. When the first gap increases, the second gap may decrease. When the first gap decreases, the second gap may increase.

By coupling the image light out of the light guide using two polarization selective out-coupling elements, the number of output lights (and hence the number of pupils) may be increased within the eyebox as compared to a conventional light guide display assembly, thereby increasing the pupil replication density. In addition, by adjusting the distance between the first and second polarization selective out-coupling elements, a gap (the first gap or the second gap) between neighboring pupils corresponding to two neighboring output lights may be reduced as compared to a conventional light guide display assembly, thereby reducing or suppressing the undesirable artifacts that may otherwise be caused by a large gap between neighboring pupils. In addition, the gaps (the first gap and the second gap) between neighboring pupils may be adjusted to achieve a more uniform distribution of the pupils as compared to the conventional light guide display assembly. Further, as compared to the conventional light guide display assembly, the disclosed light guide display assembly may provide a same or similar pupil replication density with a light guide fabricated based on a material having a lower refractive index.

FIG. 1A illustrates a schematic diagram of a near-eye display ("NED") 100 according to an embodiment of the present disclosure. In some embodiments, the NED 100 may be referred to as a head-mounted display ("HMD"). The NED 100 may present media content to a user, such as one or more images, videos, audios, or a combination thereof. In some embodiments, audio content may be presented to the user via an external device (e.g., a speaker and/or a headphone). The NED 100 may operate as a VR device, an AR device, an MR device, or a combination thereof. In some embodiments, when the NED 100 operates as an AR and/or MR device, a portion of the NED 100 may be at least partially transparent, and internal components of the NED 100 may be at least partially visible.

As shown in FIG. 1A, the NED 100 may include a frame 110, a left display system 120L and a right display system 120R. In some embodiments, one or more devices shown in FIG. 1A may be omitted. In some embodiments, one or more additional devices or components not shown in FIG. 1A may also be included in the NED 100. The frame 110 may include a suitable type of mounting structure configured to mount the left display system 120L and the right display system 120R to a body part (e.g. a head) of the user (e.g., adjacent eyes of the user). The frame 110 may be coupled to one or more optical elements, which may be configured to display media content to the user. In some embodiments, the frame 110 may represent a frame of eye-wear glasses. The left display system 120L and the right display system 120R may be configured to enable the user to view virtual content presented by the NED 100 and/or to view images of real-world objects. For example, in some embodiments, each of the left display system 120L and the right display system 120R may include a see-through optical element. In some embodiments, the left display system 120L and the right display system 120R may include any suitable display assembly (not shown) configured to generate a light (e.g., an image light presenting a virtual-environment image) and to direct the image light to an eye of the user. In some embodiments, the NED 100 may include a projection system. For illustrative purposes, FIG. 1A shows that the projection system may include a projector 135 coupled to the frame 110.

Figure 1B:
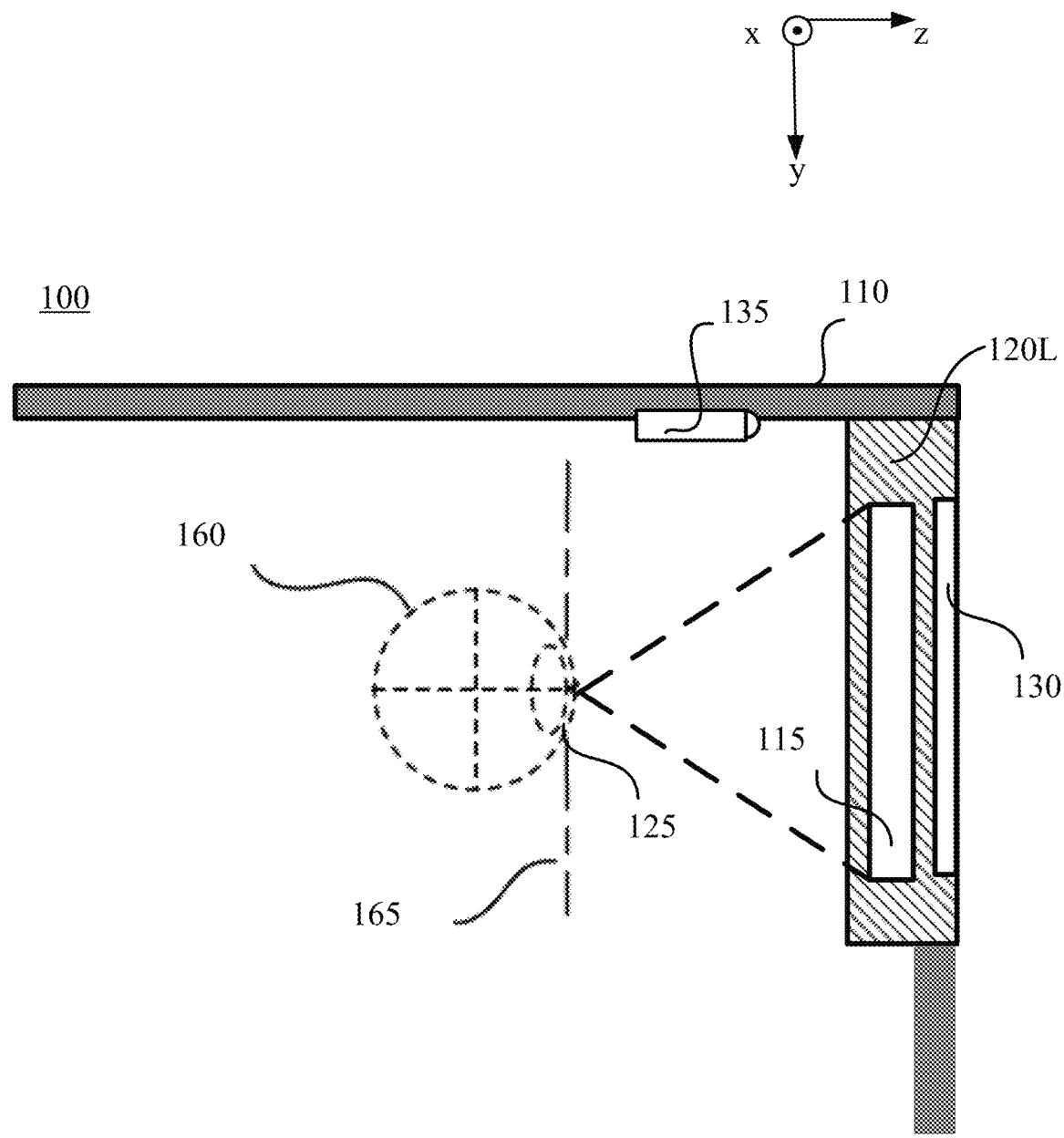
FIG. 1B schematically illustrates a cross-sectional view of half of the NED shown in FIG. 1A, according to an embodiment of the present disclosure.

FIG. 1B is a cross-sectional view of the NED 100 shown in FIG. 1A according to an embodiment of the present disclosure. For purposes of illustration, FIG. 1B shows the cross-sectional view associated with the left display system 120L of the NED 100. The cross-sectional view of the right display system 120R may be similar to that shown for the left display system 120L. As shown in FIG. 1B, for an eye 160, the left display system 120L may include an optical device 115 for providing an increased pupil replication density to the eye 160. In some embodiments, the optical device 115 may be a light guide display assembly 115. The light guide display assembly 115 may include a light guide or a stack of light guides. An exit pupil 125 may be a spatial region or location within an eye-box 165 where an eye 160 may be positioned to receive lights delivered by the light guide display assembly 115 when the user wears the NED 100. For illustrative purposes, FIG. 1B shows the cross-sectional view associated with a single eye 160 and a single light guide display assembly 115. In some embodiments, another light guide display assembly separate from and similar to the light guide display assembly 115 shown in FIG. 1B may be included to provide an image light to another eye located at an exit pupil.

The light guide display assembly 115 may include a light guide and/or one or more gratings fabricated based on one or more materials (e.g., a plastic, a glass, etc.) with one or more refractive indices. The light guide display assembly 115 may effectively minimize the weight and increase the pupil replication density of the NED 100. In some embodiments, the light guide display assembly 115 may be a component of the NED 100. In some embodiments, the light guide display assembly 115 may be a component of some other NED, or other system that directs an image light to a particular location. As shown in FIG. 1B, the light guide display assembly 115 may be provided for one eye 160 of the user. The light guide display assembly 115 for one eye may be separated or partially separated from a similar light guide display assembly for the other eye. In certain embodiments, a single light guide display assembly 115 may be used for both eyes of the user.

In some embodiments, the NED 100 may include one or more optical elements (not shown) disposed between the light guide display assembly 115 and the eye 160. The optical elements may be configured to, e.g., correct aberrations in an image light emitted from the light guide display assembly 115, magnify an image light emitted from the light guide display assembly 115, or perform another type of optical adjustment of an image light emitted from the light guide display assembly 115. Examples of the one or more optical elements may include an aperture, a Fresnel lens, a convex lens, a concave lens, a filter, any other suitable optical element that affects an image light, or a combination thereof. In some embodiments, the light guide display assembly 115 may include a stack of light guide displays. In some embodiments, the stacked light guide displays may include a polychromatic display (e.g., a red-green-blue ("RGB") display) formed by stacking light guide displays. Respective monochromatic light sources included in the light guide displays may be configured to emit lights of different colors. For example, the stacked light guide displays may include a polychromatic display configured to project image lights on multiple planes (e.g., multi-focus colored display). In some embodiments, the stacked light guide displays may include a monochromatic display configured to project an image light on multiple planes (e.g., multi-focus monochromatic display). Various embodiments of the light guide display assembly 115 are described below.

In some embodiments, the NED 100 may include an adaptive dimming element 130, which may dynamically adjust the transmittance of real-world lights from the real-world environment, thereby switching the NED 100 between a VR device and an AR device or between a VR device and an MR device. In some embodiments, along with switching between the AR/MR device and the VR device, the adaptive dimming element 130 may be used in the AR and/MR device to mitigate differences in brightness of real and virtual objects.

Figure 2:
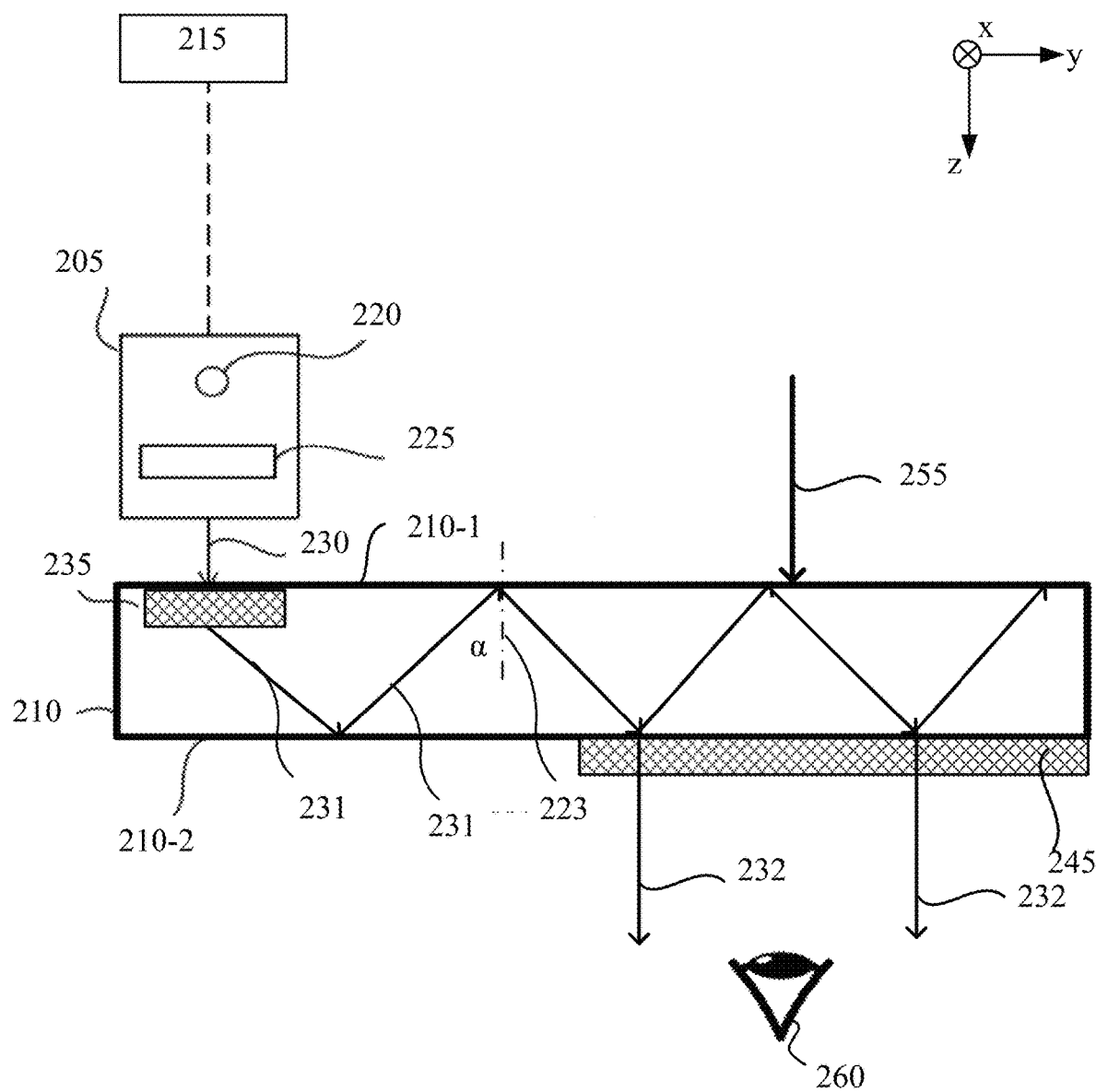
FIG. 2 schematically illustrates a diagram of a conventional light guide display assembly.

FIG. 2 illustrates a schematic diagram of a conventional optical system or device 200. The optical device 200 may also be referred to as a light guide display assembly (or light guide display system) 200. The optical device 200 may also be referred to as a waveguide display system or assembly 200. The light guide display assembly 200 may be implemented in an NED, such as the NED 100 for VR, AR, and/or MR applications.

As shown in FIG. 2, the light guide display assembly 200 may include a light source assembly 205, a light guide 210 (or a waveguide 210), and a controller 215. The light source assembly 205 may generate an image light 230 representing a virtual-environment image. The light guide display assembly 200 may include an in-coupling element 235 configured to couple the image light 230 into the light guide 210 as an in-coupled light 231. The in-coupling element 235 may be disposed at a first surface 210-1 of the light guide 210. The in-coupled light 231 may propagate within the light guide 210 toward an out-coupling element 245 through total internal reflection ("TIR"), when an incidence angle of the in-coupled light 231 at an inner surface of the light guide 210 (e.g., an angle α between the light incident onto the inner surface and a normal of the inner surface) is greater than or equal to a critical angle. Thus, the in-coupled light 231 may also be referred to a TIR propagating light. The angle formed by the TIR propagating light 231 and the normal of the inner surface of the light guide 210 (or the incidence angle of the TIR propagating light 231 incident onto the inner surface of the light guide) may be referred to as a guided angle or a propagation angle. The in-coupling element 235 and the out-coupling element 245 may be polarization nonselective.

When the TIR propagating light 231 is incident onto different portions of the out-coupling element 245 as the TIR propagating light 231 propagates along the light guide 210, the out-coupling element 245 may couple (e.g., diffract) the TIR propagating light 231 out of the light guide 210 as a plurality of out-coupled lights (or output lights) 232, at different portions of the out-coupling element 245 or from different positions along the light guide 210. In this way, the out-coupling element 245 replicates the image light 230 received from the light source assembly 205 to expand an effective pupil of the light guide display assembly 200. Each output light 232 may have the same field of view ("FOV") as the image light 230 generated by the light source assembly 205. Each output light 232 may correspond to (or form) a pupil (or exit pupil) within an eyebox (not shown). The pupil is a spatial region or location in which an eye 260 can receive the output light 232. The eyebox may include a plurality of pupils arranged in an array. Different pupils (e.g., exit pupils) may present substantially the same image content to the eye 260. In some embodiments, output image lights 232 representing different pupils may have substantially the same FOV. Thus, when the eye 260 moves to different positions, the eye 260 may still receive the same image content if the eye 260 is positioned at a replicated pupil. The position of the pupil may change when the position of the output light 232 forming the pupil is changed. The number of output lights 232 within the eyebox may correspond to the number of pupils. Thus, the number of output lights within the eyebox may at least partially determine a pupil replication density. The pupil replication density is a quantitative measure of replication of the image light at the output side of the light guide. The pupil replication density may be defined as the number of pupils per unit distance in a pupil expansion/replication direction, or the number of pupils per unit area within the eyebox. For the simplicity of illustration and discussion, in the illustrated embodiments, the pupil replication density is calculated as the number of pupils per unit distance in the pupil expansion/replication direction, e.g., along the light guide in 1D pupil expansion/replication.

The critical angle may be determined by a refractive index of a material from which the light guide is fabricated (provided that an outside environment of the light guide is air with a refractive index of about 1.0). For example, the critical angle for a BK-7 glass is about 42°. The critical angle may be reduced by disposing a reflective coating at a surface of the light guide or by using a material having a higher refractive index to fabricate the light guide. When the critical angle is reduced, the pupil replication density provided by the light guide display assembly may be increased. However, adding a reflective coating or using a material having a higher reflective index may increase the cost and weight of the light guide. For light guides fabricated from conventional glass materials (e.g., BK-7 glass), a maximum value of the propagation angle α at which a light can propagate within the light guide through TIR is about 50°.

In a conventional light guide display system, the in-coupling element and/or the out-coupling element may not be polarization selective. In addition, the conventional light guide display system may only include a single out-coupling element. Thus, two polarized lights having different polarizations that propagate at the same TIR propagating angle may be out-coupled by the out-coupling element at the same position. That is, the two polarized lights may be out-coupled as an output light 232 to form a same pupil (or may be output as two substantially overlapping output lights, which may form a single pupil). For example, the two substantially overlapping pupils may have 50% or greater overlapping regions. Thus, the pupil replication density of a conventional light guide display assembly may be low. In addition, a gap or distance between the neighboring pupils formed by the output lights 232 may be fixed once the light guide display assembly is fabricated, and may not be adjustable. A large gap between neighboring pupils may cause artifacts due to the non-uniformity of the virtual-environment image reproduced at the output side of the light guide 210.

In the conventional light guide display assembly shown in FIG. 2, which includes a single, polarization nonselective out-coupling element, the gap or distance between the neighboring output lights 232 may be large. In addition, the gap between the output lights 232 may be fixed. Thus, the pupil replication density may be low, and may not be adjustable. The conventional light guide display assemblies may suffer from a significant number of artifacts caused by the sparsely distributed pupils (i.e., low replication density) and/or the nonuniform distribution of the pupils.

FIGS. 3A-8B illustrate schematic diagrams of light guide display assemblies configured to provide an increased pupil replication density, according to various embodiments of the present disclosure. For illustrative and discussion purposes, each of polarization selective in-coupling elements and out-coupling elements shown in the figures may include one or more polarization selective gratings, e.g., transmissive type or reflective type polarization selective gratings. A polarization selective grating included in a polarization selective in-coupling element may be referred to as a polarization selective in-coupling grating. A polarization selective grating included in a polarization selective out-coupling element may be referred to as a polarization selective out-coupling grating. For illustrative and discussion purposes, all of the polarization selective in-coupling gratings and all of the polarization selective out-coupling gratings shown in the figures may be of the same type (e.g., transmissive or reflective). In some embodiments, the polarization selective in-coupling gratings may be of different types. In some embodiments, the polarization selective out-coupling gratings may be of different types. In some embodiments, the polarization selective in-coupling gratings and the polarization selective out-coupling gratings may be of different types.

In some embodiments, the polarization selective element may include an optically anisotropic material (e.g., an LC material). An optic axis of the optically anisotropic material may be configured with a spatially varying orientation in both an in-plane direction and an out-of-plane direction to provide a polarization sensitive holographic response. In some embodiments, the optically anisotropic material including an optical axis configured with such a spatially varying orientation may form a polarization volume hologram ("PVH") or a PVH element. The term "optic axis" may refer to a direction in a crystal. A light propagating in the optic axis direction may not experience birefringence (or double refraction). An optic axis may be a direction rather than a single line: lights that are parallel to that direction may experience no birefringence. In some embodiments, the PVH may be configured to substantially (or primarily) diffract a circularly polarized light (or an elliptically polarized light) having a predetermined handedness, and substantially (or primarily) transmit (e.g., with negligible diffraction) a circularly polarized light (or an elliptically polarized light) having a handedness that is opposite to the predetermined handedness. It is understood that the PVH may transmit the circularly polarized light (or the elliptically polarized light) having the predetermined handedness, with a much smaller light transmittance than the circularly polarized light (or the elliptically polarized light) having the handedness that is opposite to the predetermined handedness. The PVH may diffract the circularly polarized light (or the elliptically polarized light) having the handedness that is opposite to the predetermined handedness, with a much smaller diffraction efficiency than the circularly polarized light (or the elliptically polarized light) having the predetermined handedness. An unpolarized light or a linearly polarized light may be decomposed into two circularly polarized components (e.g., a first component and a second component) with opposite handednesses. Thus, the first component may be substantially diffracted by the PVH, and the second component may be substantially transmitted (e.g., with negligible diffraction) by the PVH. The PVH may be configured to substantially forwardly or backwardly diffract the circularly polarized light (or the elliptically polarized light) having the predetermined handedness. When the PVH is configured to substantially forwardly diffract the circularly polarized light (or the elliptically polarized light) having the predetermined handedness, the PVH may be referred to as a transmissive PVH. When the PVH is configured to substantially backwardly diffract the circularly polarized light (or the elliptically polarized light) having the predetermined handedness, the PVH may be referred to as a reflective PVH.

In some embodiments, the PVH may include optically anisotropic molecules (e.g., LC molecules) arranged in a plurality of helix structures in a volume of the PVH. The handedness of the helical structures may define the polarization selectivity of the PVH. In some embodiments, the PVH may be configured to substantially diffract a circularly polarized light (or an elliptically polarized light) having a handedness that is the same as the handedness of the helical structures, and substantially transmit (e.g., with negligible diffraction) a circularly polarized light (or an elliptically polarized light) having a handedness that is opposite to the handedness of the helical structures. In some embodiments, the optically anisotropic molecules in the PVH may not be arranged in a plurality of helix structures in a volume of the PVH. The handedness of the rotation of the directors of the optically anisotropic molecules at an optically anisotropic molecule director plane may define the polarization selectivity of the PVH. An optically anisotropic molecule director plane (or a molecule director plane) is a plane formed by or including directors of the optically anisotropic molecules. The optically anisotropic molecules may be arranged in a plurality of parallel molecule director planes within the volume of the PVH. In some embodiments, the PVH may be configured to substantially diffract a circularly polarized light (or an elliptically polarized light) having a handedness that is the same as the handedness of the rotation of the directors of the optically anisotropic molecules at the molecule director planes, and substantially transmit (e.g., with negligible diffraction) a circularly polarized light (or an elliptically polarized light) having a handedness that is opposite to the handedness of the rotation of the directors of the optically anisotropic molecules at the molecule director planes.

In some embodiments, depending on the handedness of the helical structures within the volume of the PVH, or the handedness of the rotation of the directors of the optically anisotropic molecules at the molecule director planes within the volume of the PVH, the PVH may be referred to as a left-handed PVH or a right-handed PVH. For example, a left-handed PVH may be configured to substantially forwardly diffract or backwardly diffract a left-handed circularly polarized ("LHCP") light, and substantially transmit (e.g., with negligible diffraction) a right-handed circularly polarized ("RHCP") light. A right-handed PVH may be configured to substantially forwardly diffract or backwardly diffract an RHCP light and substantially (e.g., primarily) transmit (e.g., with negligible diffraction) an LHCP light.

In the following descriptions, for illustrative purposes, polarization selective gratings including PVH (also referred to as PVH gratings) may be used as examples of the polarization selective in-coupling element, the polarization selective out-coupling element, and/or the polarization selective redirecting/folding element. In some embodiments, the light guide display assembly may also include other suitable polarization selective elements (e.g., sub-wavelength structures, a photo-refractive holographic material, a birefringent material (e.g., a liquid crystal material), or combinations thereof) to provide an increased pupil replication density, following the same or similar design principles described herein with respect to the embodiments having light guide(s) coupled with one or more PVH gratings. Although polarization selective gratings may be used as examples of the polarization selective elements included in the polarization selective in-coupling element and out-coupling element, the polarization selective elements are not limited to polarization selective gratings.

In addition, for illustrative purposes, one-dimensional ("1D") pupil expansion or replication (e.g., horizontal pupil expansion or replication) with an increased pupil replication density is used an example to explain the principle of increasing the pupil replication density. In some embodiments, two-dimensional ("2D") pupil expansion or replication (e.g., horizontal and vertical pupil expansions) may also be achieved by introducing one or more additional polarization selective elements (e.g., a polarization selective folding element or redirecting element) configured to provide a pupil expansion or replication in a direction different from the pupil expansion or replication direction provided by the out-coupling elements already shown in the figures. In some embodiments, the one or more additional polarization selective elements (e.g., a polarization selective folding element or redirecting element) may be configured to redirect the image light by 90° toward the polarization selective out-coupling elements. In some embodiments, the redirecting element may include one or more polarization selective elements, and may be referred to as a polarization selective redirecting element. In some embodiments, multiple functions, e.g., redirecting, folding, and/or expanding the image light generated by the light source assembly may be combined into a single element, e.g. an out-coupling element. In such embodiments, the redirecting element may be omitted. For example, the out-coupling element may be configured to expand the pupil in two or more different pupil replication/expansion directions.

In some embodiments, a multi-color (e.g., full-color) 2D pupil expansion (or replication) may be achieved by stacking three light guides configured to deliver component color images (e.g., primary color images) by in-coupling and subsequently out-coupling, e.g., red, green, and blue lights, respectively, in any suitable order. In some embodiments, a multi-color (e.g., full-color) 2D pupil expansion (or replication) may be achieved by stacking two light guides configured to deliver component color images (e.g., primary color images) by in-coupling and subsequently out-coupling, e.g., a combination of red and green lights, and a combination of green and blue lights, respectively, in any suitable order.

Figure 3A:
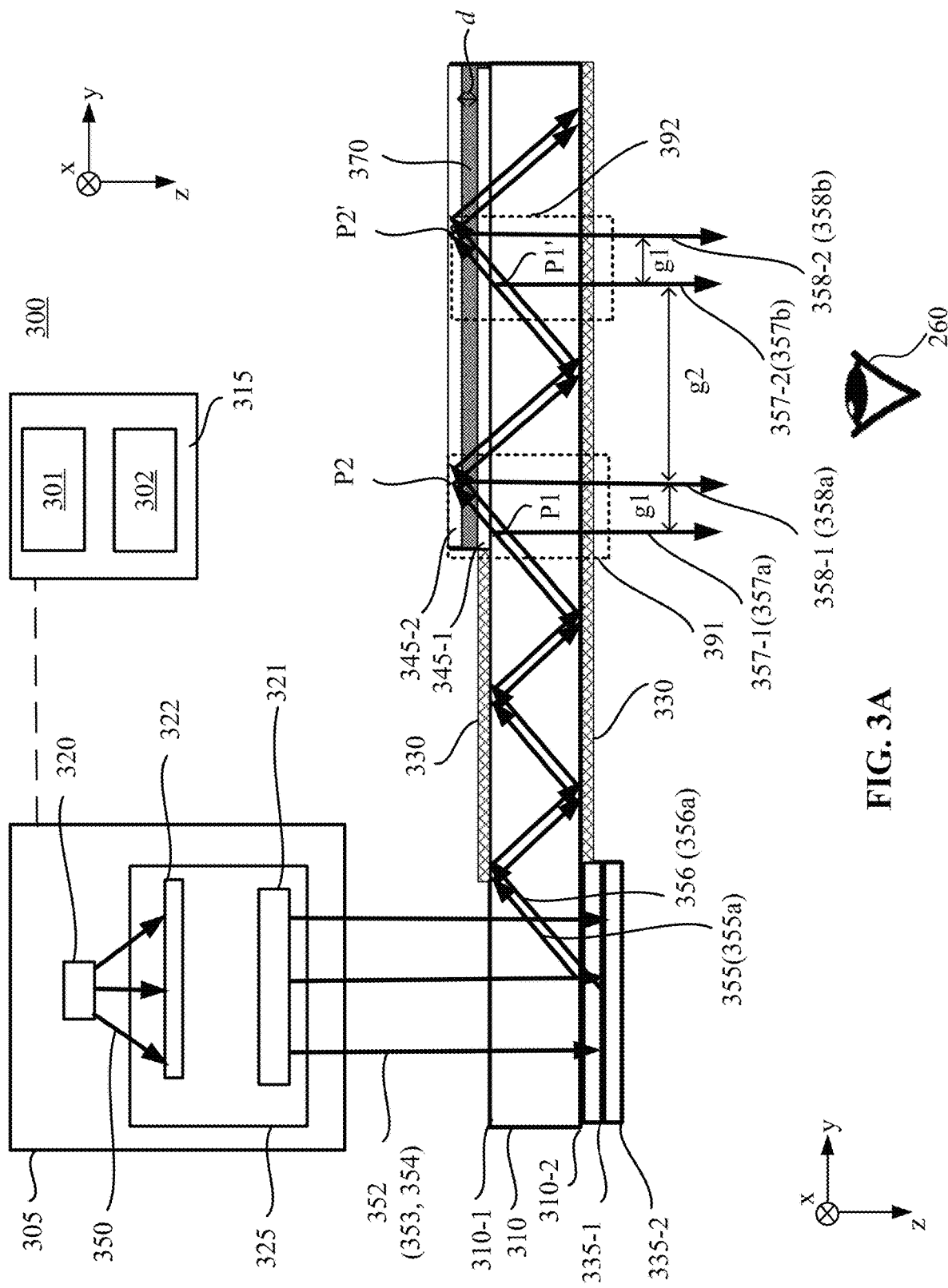
FIG. 3A schematically illustrates a diagram of a light guide display assembly configured to provide an increased pupil replication density, according to an embodiment of the present disclosure.

FIG. 3A illustrate a schematic diagram of an optical system or device 300 for providing an increased pupil replication density, according to an embodiment of the present disclosure. The optical device 300 may also be referred to as a light guide display assembly 300. The light guide display assembly 300 may include elements, structures, and/or functions that are the same as or similar to those included in the light guide display assembly 200 shown in FIG. 2. Descriptions of the same or similar elements, structures, and/or functions can refer to the descriptions rendered above in connection with FIG. 2.

As shown in FIG. 3A, the light guide display assembly 300 may include a light source assembly 305, a light guide 310, and a controller 315. The controller 315 may include a processor or processing unit 301. The processor 301 may be any suitable processor, such as a central processing unit ("CPU"), a graphic processing unit ("GPU"), etc. The controller 315 may include a storage device 302. The storage device 302 may be a non-transitory computer-readable medium, such as a memory, a hard disk, etc. The storage device 302 may be configured to store data or information, including computer-executable program instructions or codes, which may be executed by the processor 301 to perform various controls or functions of the methods or processes. The controller 315 may be configured to control the operations of various elements included in the light guide display assembly 300, such as the light source assembly 305.

The light source assembly 305 may include a light source (e.g., an electronic display) 320, and a light conditioning system 325. The light source 320 may be any suitable light source configured to generate a light, such as an image light representing a virtual-environment image and having a predetermined FOV. In some embodiments, the light source 320 may be a light source configured to generate a coherent or partially coherent light. The light source 320 may include, e.g., a laser diode, a vertical cavity surface emitting laser, a light emitting diode, or a combination thereof. In some embodiments, the light source 320 may include a display panel, such as a liquid crystal display ("LCD") panel, a liquid-crystal-on-silicon ("LCoS") display panel, an organic light-emitting diode ("OLED") display panel, a micro light-emitting diode ("micro-LED") display panel, a digital light processing ("DLP") display panel, a laser scanning display panel, or a combination thereof. In some embodiments, the light source 320 may include a self-emissive panel, such as an OLED display panel, a laser scanning display panel, or a micro-LED display panel. In some embodiments, the light source 320 may include a display panel that is illuminated by an external source, such as an LCD panel, an LCoS display panel, or a DLP display panel. Examples of an external source may include a laser, an LED, an OLED, or a combination thereof.

The light conditioning system 325 may include one or more optical components configured to condition the light emitted by the light source 320. In some embodiments, the light conditioning system 325 may be controlled by the controller 315 to perform various conditioning of the light emitted by the light source 320. Conditioning the light may include, e.g., transmitting, attenuating, expanding, collimating, and/or adjusting orientation of the light.

In some embodiments, as shown in FIG. 3A, the light conditioning system 325 may include a polarization conversion element 322 and a collimator 321. In some embodiments, the light source assembly 305 may include other elements not shown in FIG. 3A. The controller 315 may control various elements included in the light guide display assembly 300, such as the light source assembly 305. The light source 320 may be configured to emit an image light 350 representing a virtual-environment image during a display frame. The image light 350 may be polarized or unpolarized. The image light 350 may be configured with a predetermined FOV. In some embodiments, the image light 350 may be a diverging light. The light conditioning system 325 may include suitable optical elements configured to process the image light 350. The optical paths of the image light 350 propagating in the light conditioning system 325 are not shown in FIG. 3A. The image light 350 may propagate in the light conditioning system 325 in any suitable optical paths. The light conditioning system 325 may be configured to process the image light 350 emitted during the display frame, such that the light source assembly 305 may output an image light 352 with predetermined properties. For example, the image light 352 may be an unpolarized light or a polarized light with a predetermined polarization. The image light 352 may be decomposed into two orthogonally polarized components: a first polarized component 353 having a first polarization and a second polarized component 354 having a second polarization orthogonal to the first polarized component 353. The light guide 310 may be configured to receive the first polarized component 353 as a first input light 353 and the second polarized component 354 as a second input light 354.

In some embodiments, the polarization conversion element 322 in the light conditioning system 325 may be configured to convert the image light 350 into an image light with a predetermined polarization (e.g., a linear polarization), before the image light 350 is incident onto the collimator 321. In some embodiments, the polarization conversion element 322 may be disposed between the light source 320 and the collimator 321. In some embodiments, the polarization conversion element 322 may be disposed between the collimator 321 and the light guide 310. In some embodiments, the image light 350 may have a predetermined polarization (e.g., a linear polarization) or may be unpolarized, and the polarization conversion element 322 may be omitted.

In some embodiments, the collimator 321 (e.g., a collimating lens) may be configured to collimate the image light 350 generated by the light source 320. For example, in the embodiment shown in FIG. 3A, the collimator 321 may be disposed between the polarization conversion element 322 and the light guide 310, and configured to collimate the image light output from the polarization conversion element 322 before the image light is incident onto the light guide 310. Although not shown, in some embodiments, the collimator 321 may be disposed between the light source 320 and the polarization conversion element 322, and configured to collimate the image light 350 output from the light source 320 before the image light 350 is incident onto the polarization conversion element 322.

The light guide display assembly 300 may include one or more in-coupling elements (e.g., 335-1 and 335-2) coupled to the light guide 310. In some embodiments, each of the in-coupling elements 335-1 and 335-2 may be polarization selective. In some embodiments, each of the in-coupling elements 335-1 and 335-2 may include one or more gratings. For discussion purposes, each in-coupling element (335-1 or 335-2) may be referred to as an in-coupling grating. It is understood that in other embodiments, the in-coupling element 335-1 or 335-2 may include a non-grating structure. Although two in-coupling gratings 335-1 and 335-2 (which may be referred to as a first in-coupling grating 335-1 and a second in-coupling grating 335-2) are shown for illustrative purposes, the number of in-coupling element is not limited to one or two, and may be any other suitable number, such as three, four, etc. Each of the in-coupling gratings 335-1 and 335-2 may be a transmissive type grating or a reflective type grating. In some embodiments, the light guide display assembly 300 may include an in-coupling element that is polarization nonselective and configured to couple the image light 352 into the light guide 310.

A polarization selective element may include a polarization selective grating or holographic element fabricated based on isotropic or anisotropic materials. The polarization selective grating or holographic element may include suitable sub-wavelength structures, a birefringent material (e.g., a liquid crystal material), a photo-refractive holographic material, or any combination thereof. A period of the polarization selective grating included in the in-coupling element 335-1 or 335-2 may be configured to enable a light coupled by the in-coupling element into the light guide 310 to propagate within the light guide 310 through TIR.

In the embodiment shown in FIG. 3A, the first and second in-coupling gratings 335-1 and 335-2 may be configured to couple, via diffraction, the first input light 353 and the second input light 354 with different (e.g., orthogonal) polarizations into the light guide 310, respectively. For example, the first in-coupling grating 335-1 may couple, via diffraction, the first input light 353 into the light guide 310 as a first TIR propagating light 355. The second in-coupling grating 335-2 may couple, via diffraction, the second input light 354 into the light guide 310 as a second TIR propagating light 356. In some embodiments, the first TIR propagating light 355 and the second TIR propagating light 356 may have different (e.g., orthogonal) polarizations. In some embodiments, the first TIR propagating light 355 and the second TIR propagating light 356 may have a substantially same propagation angle inside the light guide 310.

The light guide display assembly 300 may also include one or more out-coupling elements 345-1 and 345-2 coupled to the light guide 310. The number of the out-coupling elements may not be limited to one or two, and may be any other suitable number, such as three, four, etc. In some embodiments, each out-coupling element 345-1 or 345-2 may be polarization selective. In some embodiments, each of the out-coupling elements 345-1 and 345-2 may include one or more gratings. For discussion purposes, each out-coupling element 345-1 or 345-2 may be referred to as an out-coupling grating. It is understood that in other embodiments, the out-coupling element 345-1 or 345-2 may include a non-grating structure. In the embodiment shown in FIG. 3A, two out-coupling gratings are shown, a first out-coupling grating 345-1 and a second out-coupling grating 345-2. Each of the out-coupling gratings 345-1 and 345-2 may be a transmissive type grating or a reflective type grating. The out-coupling elements 345-1 and 345-2 may be stacked at a same surface of the light guide 310, such as a first surface 310-1 or a second surface 310-2. For illustrative purposes, FIG. 3A shows that the out-coupling elements 345-1 and 345-2 are stacked at the first surface 310-1 of the light guide 310. In some embodiments, the out-coupling element 345-1 or 345-2 may include one or more diffraction gratings, one or more cascaded reflectors, one or more prismatic surface elements, and/or an array of holographic reflectors, or any combination thereof. The light guide 310 may include one or more materials configured to facilitate the TIR of the light 352 when the light 352 is in-coupled into the light guide 310. The light guide 310 may include, for example, a plastic, a glass, and/or polymers. The light guide 310 may have a relatively small form factor.

In the embodiment shown in FIG. 3A, the first out-coupling grating 345-1 and the second out-coupling grating 345-2 may be configured to couple, via diffraction, the first TIR propagating light 355 and the second TIR propagating light 356 out of the light guide 310, respectively. For example, the first out-coupling grating 345-1 may be configured to couple the first TIR propagating light 355 out of the light guide 310 at different first positions (e.g., P1 and P1') of the first out-coupling grating 345-1 as a plurality of first output lights, e.g., 357-1 and 357-2. The second out-coupling grating 345-2 may be configured to couple the second TIR propagating light 356 out of the light guide 310 at different second positions (e.g., P2 and P2') of the second out-coupling grating 345-2 as a plurality of second output lights, e.g., 358-1 and 358-2. In some embodiments, the propagation directions of the first output lights 357-1 and 357-2 may be parallel with one another, and the propagation directions of the second output lights 358-1 and 358-2 may be parallel with one another. In some embodiments, the propagation directions of the first output lights 357-1 and 357-2 may be parallel with the propagation directions of the second output lights 358-1 and 358-2. That is, the first output lights 357-1 and 357-2 and the second output lights 358-1 and 358-2 may propagate in a substantially same direction. In other words, the first out-coupling grating 345-1 and the second out-coupling grating 345-2 may be configured to respectively couple, via diffraction, the first TIR propagating light 355 and the second TIR propagating light 356 out of the light guide 310, with a substantially same diffraction angle. In some embodiments, the first output lights 357-1 and 357-2 may have a substantially same polarization, the second output lights 358-1 and 358-2 may have a substantially same polarization. The first output lights 357-1 and 357-2 and the second output lights 358-1 and 358-2 may have orthogonal polarizations.

The first output light 357-1 and the second output light 358-1 may be coupled out of the light guide 310 at a same output region 391 of the light guide 310. The region 391 may be defined by the first position P1, from which the first TIR propagating light 355 is coupled out of the light guide 310 by the first out-coupling grating 345-1, and the second position P2, from which the second TIR propagating light 356 is coupled out of the light guide 310 by the second out-coupling grating 345-2. The first output light 357-2 and the second output light 358-2 may be coupled out of the light guide 310 at a same output region 392 of the light guide 310. The output region 392 may be defined by the first position P1', from which the first TIR propagating light 355 is coupled out of the light guide 310 by the out-coupling grating 345-1, and the second position P2', from which the second TIR propagating light 356 is coupled out of the light guide 310 by the second out-coupling grating 345-2. In some embodiments, each of the output lights 357-1, 357-2, 358-1, and 358-2 may have a same FOV as the image light 350. In other words, each of the output lights 357-1, 357-2, 358-1, and 358-2 may represent the same image content as the image light 350.

In some embodiments, the polarizations of the TIR propagating light 355 and the TIR propagating light 356 may be maintained when propagating inside the light guide 310. In some embodiments, the polarizations of at least one of the TIR propagating light 355 or the TIR propagating light 356 may be changed when propagating inside the light guide 310, e.g., may change after being totally internally reflected at an inner surface of the light guide 310 and may become depolarized. In some embodiments, the light guide display assembly 300 may include one or more polarization correction films 330 disposed adjacent or at one or more surfaces (e.g., one or two outer surfaces) of the light guide 310. In some embodiments, the polarization correction film 330 may be configured to preserve the polarization states of the TIR propagating light 355 and/or the TIR propagating light 356 while the TIR propagating light 355 and/or the TIR propagating light 356 propagate inside the light guide 310. For example, the polarization correction film 330 may be configured to compensate for the depolarization of at least one of the TIR propagating light 355 or 356 when the TIR propagating lights 355 and 356 propagate inside the light guide 310, thereby maintaining the polarization of the at least one of the TIR propagating light 355 or 356.

In some embodiments, each of the first in-coupling grating 335-1 and the second in-coupling grating 335-2 may be disposed at a first surface 310-1 or a second surface 310-2 of the light guide 310. For example, in some embodiments, the in-coupling gratings 335-1 and 335-2 may be disposed at the first surface 310-1 or the second surface 310-2 of the light guide 310 side by side or in a stacked configuration. In some embodiments, the first out-coupling grating 345-1 and the second out-coupling grating 345-2 may be disposed at the same surface (e.g., at the first surface 310-1 or the second surface 310-2) of the light guide 310, in a stack configuration. The first out-coupling grating 345-1 and the second out-coupling grating 345-2 may be spaced apart from each other by a distance d, in the thickness direction of the stack of the first out-coupling grating 345-1 and the second out-coupling grating 345-2 (or in the thickness direction of the light guide 310). In some embodiments, the first out-coupling grating 345-1 and the second out-coupling grating 345-2 may substantially overlap in the thickness direction of the light guide 310. In some embodiments, the first out-coupling grating 345-1 and the second out-coupling grating 345-2 may have a substantially same light exiting area (e.g., a substantially same area from which the respective TIR propagating light is coupled out from the light guide 310 by the respective out-coupling grating).

In some embodiments, a space between the first out-coupling grating 345-1 and the second out-coupling grating 345-2 may be at least partially filled with an index-matching material 370 to suppress the light reflections within the space. The index-matching material 370 may have a refractive index profile with a first refractive index at a first interface with the first out-coupling grating 345-1 matches with a refractive index of the material of the first out-coupling grating 345-1, and a second refractive index at a second interface with the second out-coupling grating 345-2 matches with a refractive index of the material of the second out-coupling grating 345-2. The refractive index of the index-matching material 370 may gradually vary from the first refractive index at the first interface to the second refractive index at the second interface. In some embodiments, a space around the first out-coupling grating 345-1 and the second out-coupling grating 345-2 may also be at least partially filled with the index-matching material 370, for suppressing the light reflections within the space. In some embodiments, the distance d between the first out-coupling grating 345-1 and the second out-coupling grating 345-2 may equal to the thickness of the index-matching material 370 filling the space between the first out-coupling grating 345-1 and the second out-coupling grating 345-2. In some embodiments, the distance d between the first out-coupling grating 345-1 and the second out-coupling grating 345-2 may be fixed. In some embodiments, the distance d between the first out-coupling grating 345-1 and the second out-coupling grating 345-2 may be adjustable by a suitable mechanism disclosed herein.

For illustrative purposes, FIG. 3A shows that the in-coupling gratings 335-1 and 335-2 are stacked at the second surface 310-2 of the light guide 310, and the out-coupling gratings 345-1 and 345-2 are stacked at the first surface 310-1 of the light guide 310. Although not shown, in some embodiments, the in-coupling gratings 335-1 and 335-2 may be stacked or disposed side by side at the first surface 310-1, and the out-coupling gratings 345-1 and 345-2 may be stacked at the second surface 310-2. In some embodiments, the in-coupling gratings 335-1 and 335-2 and the stack of the out-coupling gratings 345-1 and 345-2 may be disposed at the same surface (e.g., the first surface 310-1 or the second surface 310-2) of the light guide 310.

At least one (e.g., each) of the grating 335-1, 335-2, 345-1, or 345-2 may be a polarization selective grating configured to substantially (e.g., primarily) diffract a polarized light having a predetermined polarization and substantially (e.g., primarily) transmit, with substantially zero or negligible diffraction, a polarized light having a polarization different from the predetermined polarization (e.g., an orthogonal polarization). The predetermined polarizations associated with the gratings 335-1, 335-2, 345-1, and 345-2 may or may not be the same. In some embodiments, the in-coupling gratings 335-1 and 335-2 may be configured to diffract polarized lights having orthogonal polarizations. For example, the first in-coupling grating 335-1 may be configured to substantially (e.g., primarily) diffract a polarized light having a first polarization and substantially (e.g., primarily) transmit, with substantially zero or negligible diffraction, a polarized light having a second polarization orthogonal to the first polarization. The second in-coupling grating 335-2 may be configured to substantially (e.g., primarily) diffract a polarized light having the second polarization, and substantially (e.g., primarily) transmit, with substantially zero or negligible diffraction, a polarized light having the first polarization orthogonal to the second polarization.

In some embodiments, the out-coupling gratings 345-1 and 345-2 may be configured to diffract polarized lights with orthogonal polarizations, e.g., orthogonally polarized lights. Each of the out-coupling gratings 345-1 and 345-2 may have the same polarization selectivity as a corresponding one of the in-coupling gratings 335-1 and 335-2. For example, the first out-coupling grating 345-1 may have the same polarization selectivity as the first in-coupling grating 335-1, and the second out-coupling grating 345-2 may have the same polarization selectivity as the second in-coupling grating 335-2. The first out-coupling grating 345-1 may be configured to substantially (e.g., primarily) diffract a polarized light having the first polarization, and substantially (e.g., primarily) transmit, with substantially zero or negligible diffraction, a polarized light having the second polarization orthogonal to the first polarization. The second out-coupling grating 345-2 may be configured to substantially (e.g., primarily) diffract a polarized light having the second polarization, and substantially (e.g., primarily) transmit, with substantially zero or negligible diffraction, a polarized light having the first polarization orthogonal to the second polarization. In some embodiments, the first out-coupling grating 345-1 may have the same polarization selectivity as the second in-coupling grating 335-2, and the second out-coupling grating 345-2 may have the same polarization selectivity as the first in-coupling grating 335-1.

In some embodiments, at least one (e.g., each) of the grating 335-1, 335-2, 345-1, or 345-2 may be a circular polarization selective grating, which may be configured to substantially (e.g., primarily) diffract a circularly polarized light having a predetermined handedness, and substantially (e.g., primarily) transmit, with substantially zero or negligible diffraction, a circularly polarized light having a handedness opposite to the predetermined handedness. The in-coupling gratings 335-1 and 335-2 may be configured to diffract circularly polarized lights with opposite handednesses. For example, the first in-coupling grating 335-1 may be configured to diffract a circularly polarized light having a first predetermined handedness (e.g., left handedness or right handedness), and the second in-coupling grating 335-2 may be configured to diffract a circularly polarized light having a second predetermined handedness (e.g., right handedness or left handedness) opposite to the first predetermined handedness. The out-coupling gratings 345-1 and 345-2 may be also configured to diffract circularly polarized lights with opposite handednesses. For example, the first out-coupling grating 345-1 may be configured to diffract a light having the first predetermined handedness, and the second out-coupling grating 345-2 may be configured to diffract a light having the second predetermined handedness opposite to the first predetermined handedness. In some embodiments, each of the in-coupling gratings 335-1 and 335-2 may include a transmissive PVH or a reflective PVH. In some embodiments, each of the out-coupling gratings 345-1 and 345-2 may include a transmissive PVH or a reflective PVH. Various combinations of transmissive PVHs and/or reflective PVHs may be included in or implemented as the in-coupling gratings 335-1 and 335-2, and the out-coupling gratings 345-1 and 345-2.

In the embodiment shown in FIG. 3A, reflective PVH gratings are used as examples of the in-coupling gratings 335-1 and 335-2 and out-coupling gratings 345-1 and 345-2. The in-coupling gratings 335-1 and 335-2 may be configured to substantially backwardly diffract circularly polarized lights having opposite handednesses. The out-coupling gratings 345-1 and 345-2 may be configured to substantially backwardly diffract circularly polarized lights having opposite handednesses. For discussion purposes, the out-coupling gratings 345-1 and 345-2 may have the same polarization selectivity as the in-coupling gratings 335-1 and 335-2, respectively. For example, the first input light 353 propagating toward the in-coupling grating 335-1 may be an RHCP light, and the second input light 354 propagating toward the in-coupling grating 335-2 may be an LHCP light. Each of the in-coupling grating 335-1 and the out-coupling gratings 345-1 may be configured to substantially backwardly diffract an RHCP light as an RHCP light, and substantially transmit, with substantially zero or negligible diffraction, an LHCP light as an LHCP light. Each of the in-coupling grating 335-2 and the out-coupling grating 345-2 may be configured to substantially backwardly diffract an LHCP light as an LHCP light, and substantially transmit, with substantially zero or negligible diffraction, an RHCP light as an RHCP light.

As shown in FIG. 3A, for illustrative purposes, the light source 320 may emit the image light 350 that is an unpolarized light or a linearly polarized light. The polarization conversion element 322 may be omitted. The image light 350 may represent a display image or a virtual-environment image. In some embodiments, the image light 350 may be collimated by the collimator 321 as the image light 352. The image light 352 may be decomposed into two orthogonally polarized components: the first polarized component 353 having the first polarization (e.g., an RHCP light) and the second polarized component 354 having the second polarization (e.g., an LHCP light). The light guide 310 may receive the first polarized component 353 (e.g., an RHCP light) and the second polarized component 354 (e.g., an LHCP light) as the first input light 353 (e.g., an RHCP light) and the second input light 354 (e.g., an LHCP light), respectively. The light guide 310 may receive the first input light 353 (e.g., an RHCP light) and the second input light 354 (e.g., an LHCP light) during a same time period (e.g., simultaneously), for example, during a same display frame of the display image (or a same sub-frame of a display frame) generated by the light source 320.

The first in-coupling grating 335-1 may be configured to couple, via diffraction, the first input light 353 (e.g., an RHCP light) into the light guide 310 as a first TIR propagating light 355 (e.g., an RHCP light). For illustrative purposes, FIG. 3A shows one first TIR propagating ray 355a of the first TIR propagating light 355. As the first in-coupling grating 335-1 is configured to substantially backwardly diffract an RHCP light and substantially transmit an LHCP light with negligible diffraction, the second input light 354 (e.g., an LHCP light) may be transmitted, without diffraction, through the first in-coupling grating 335-1 toward the second in-coupling grating 335-2 without changing the polarization. The second in-coupling grating 335-2 may be configured to couple, via diffraction, the second input light 354 (e.g., an LHCP light) into the light guide 310 as a second TIR propagating light 356 (e.g., an LHCP light). For illustrative purposes, FIG. 3A shows one second TIR propagating ray 356a of the second TIR propagating light 356. In some embodiments, the initial polarization of the first TIR propagating light 355 (e.g., right-handed circular polarization) may be maintained when propagating inside the light guide 310 through TIR toward the first out-coupling grating 345-1, e.g. by one or more polarization correction films 330. In some embodiments, the initial polarization of the second TIR propagating light 356 (e.g., left-handed circular polarization) may be maintained when propagating inside the light guide 310 through TIR toward the second out-coupling grating 345-2, e.g. by the one or more polarization correction films 330.

The first out-coupling grating 345-1 may be configured to consecutively couple, via diffraction, the first TIR propagating light 355 (e.g., an RHCP light) out of the light guide 310 at different first positions (e.g., P1 and P1') of the first out-coupling grating 345-1 as a plurality of first output lights 357-1 and 357-2 (e.g., RHCP lights), when the first TIR propagating light 355 (e.g., an RHCP light) is incident onto different portions of the first out-coupling grating 345-1. Thus, the first out-coupling grating 345-1 may replicate the image light 353 received from the light source assembly 305 to expand an effective pupil of the light guide display assembly 300. For illustrative purposes, FIG. 3A shows one first output ray 357a of the first output light 357-1 (e.g., an RHCP light) and one first output ray 357b of the first output light 357-2 (e.g., an RHCP light).

As the first out-coupling grating 345-1 is configured to substantially backwardly diffract an RHCP light and substantially transmit an LHCP light with negligible diffraction, the second TIR propagating light 356 (e.g., an LHCP light) may be transmitted, without diffraction, through the first out-coupling grating 345-1 toward the second out-coupling grating 345-2 without changing the polarization. The second out-coupling grating 345-2 may be configured to consecutively couple, via diffraction, the second TIR propagating light 356 (e.g., an LHCP light) out of the light guide 310 at different second positions (e.g., P2 and P2') of the second out-coupling grating 345-2 as a plurality of second output lights 358-1 and 358-2 (e.g., LHCP lights), when the second TIR propagating light 356 (e.g., an LHCP light) is incident onto different portions of the second out-coupling grating 345-2. As the first out-coupling grating 345-1 is configured to substantially backwardly diffract an RHCP light and transmit an LHCP light with negligible diffraction, the second output lights 358-1 and 358-2 (e.g., LHCP lights) may be transmitted, with substantially zero or negligible diffraction, through the first out-coupling grating 345-1 and the light guide 310 toward the eye 260. Thus, the second out-coupling grating 345-2 may replicate the image light 354 received from the light source assembly 305 to expand an effective pupil of the light guide display assembly 300. For illustrative purposes, FIG. 3A shows one second output ray 358a of the second output light 358-1 (e.g., an LHCP light) and one second output ray 358b of the second output light 358-2 (e.g., an LHCP light).

Referring to FIG. 3A, each of the image lights out-coupled from the light guide 310 (e.g., the output lights 357-1, 357-2, 358-1, and 358-2) may form or correspond to a pupil. The first output lights 357-1 and 357-2 may form a plurality of first pupils. The second output lights 358-1 and 358-2 may form a plurality of second pupils. Due to the distance between the first out-coupling element 345-1 and the second out-coupling element 345-2, within a same output region (e.g., 391), a pair of a first pupil (e.g., 357-1) and a second pupil (e.g., 358-1) may be sufficiently separated. An output light (e.g., output light 357-1, 357-2, 358-1, or 358-2) at a specific position (e.g., position P1, P2, P1', or P2') may correspond to one replication of the image light 350. Thus, the first output lights 357-1, 357-2, 358-1, and 358-2 may correspond to four different replicated pupils. A pupil replication density is a quantitative measure of replication of the image light 350 that is received by the light guide 310 and out-coupled from the light guide 310 as image lights towards the eye 260. The pupil replication density may be defined as the number of pupils (or image lights separately out-coupled from the light guide 310) per unit distance in a pupil expansion/replication direction, or per unit area within the eyebox. For simplicity of discussion, the pupil replication density described below is defined as the number of pupils per unit distance in the pupil expansion/replication direction. For example, in FIG. 3A, the pupil expansion/replication direction may be the x-axis direction, or a direction along the length of the light guide 310.

In the disclosed embodiments, a first gap or distance g1 may exist between two neighboring pupils corresponding to two neighboring output lights 357-1 and 358-1 out-coupled, respectively, by the two out-coupling gratings 345-1 and 345-2 within the same output region 391 of the light guide 310. Similarly, the first gap g1 may exist between the two neighboring output lights 357-2 and 358-2 out-coupled, respectively, by the two out-coupling gratings 345-1 and 345-2 within the same output region 392 of the light guide 310. In other words, within the same output region 391, the gap g1 may exist between two neighboring pupils within a pair of a first pupil and a second pupil (e.g., 358-1). A second gap g2 may exist between the output light 358-1 out-coupled by the out-coupling grating 345-1 in the output region 391 of the light guide 310, and the output light 357-2 out-coupled by the out-coupling grating 345-2 within the output region 392 of the light guide 310. In other words, the second gap g2 may exist between two neighboring pupils (a first pupil and a second pupil) from two neighboring output regions 391 and 392 along the light guide 310.

In a conventional light guide display assembly (e.g., 200 shown in FIG. 2) having a single, polarization nonselective out-coupling element (e.g., 245), only two output lights (e.g., 357-1 and 357-2 or 358-1 and 358-2) may be provided, as the output lights 357-1 and 358-1 would coincide with each other, and the output lights 357-2 and 358-2 would coincide with each other. Therefore, the conventional light guide display assembly 200 may provide only two pupils within the eyebox. In the light guide display assembly 300, by using two stacked, polarization selective out-coupling gratings 345-1 and 345-2 spaced apart by a non-zero distance, the two image lights 355 and 356 having different polarizations may be separately coupled out of the light guide 310 within a same output region 391 (or 392) of the light guide 310 as two separate output lights 357-1 and 358-1 (or 357-2 and 358-2). Thus, within each output region 391 or 392, two separate pupils may be formed, rather than one pupil as in the conventional light guide assembly. Thus, the light guide display assembly 300 may provide four pupils. Accordingly, the pupil replication density may be increased as compared to a conventional light guide display assembly (e.g., 200 shown in FIG. 2).

In the light guide display assembly 300, the gaps g1 and g2 may be adjusted by adjusting the distance d between the first out-coupling grating 345-1 and the second out-coupling grating 345-2. For example, the first gap g1 may increase as the distance d increases (correspondingly the second gap g2 may decrease as the distance d increases). The first gap g1 may decrease as the distance d decreases (correspondingly the second gap g2 may increase as the distance d decreases). The first gap g1 may be adjusted to be sufficiently large to separate the neighboring pupils out-coupled at the same output region (e.g., 391 or 392) of the light guide 310. In addition, when the first gap g1 is adjusted, the second gap g2 may be adjusted accordingly. By adjusting the gaps g1 and g2, the distance between any two neighboring pupils may be adjusted to increase the uniformity of pupil distribution (e.g., g1 may be adjusted to be substantially equal to g2).

Figure 3B:
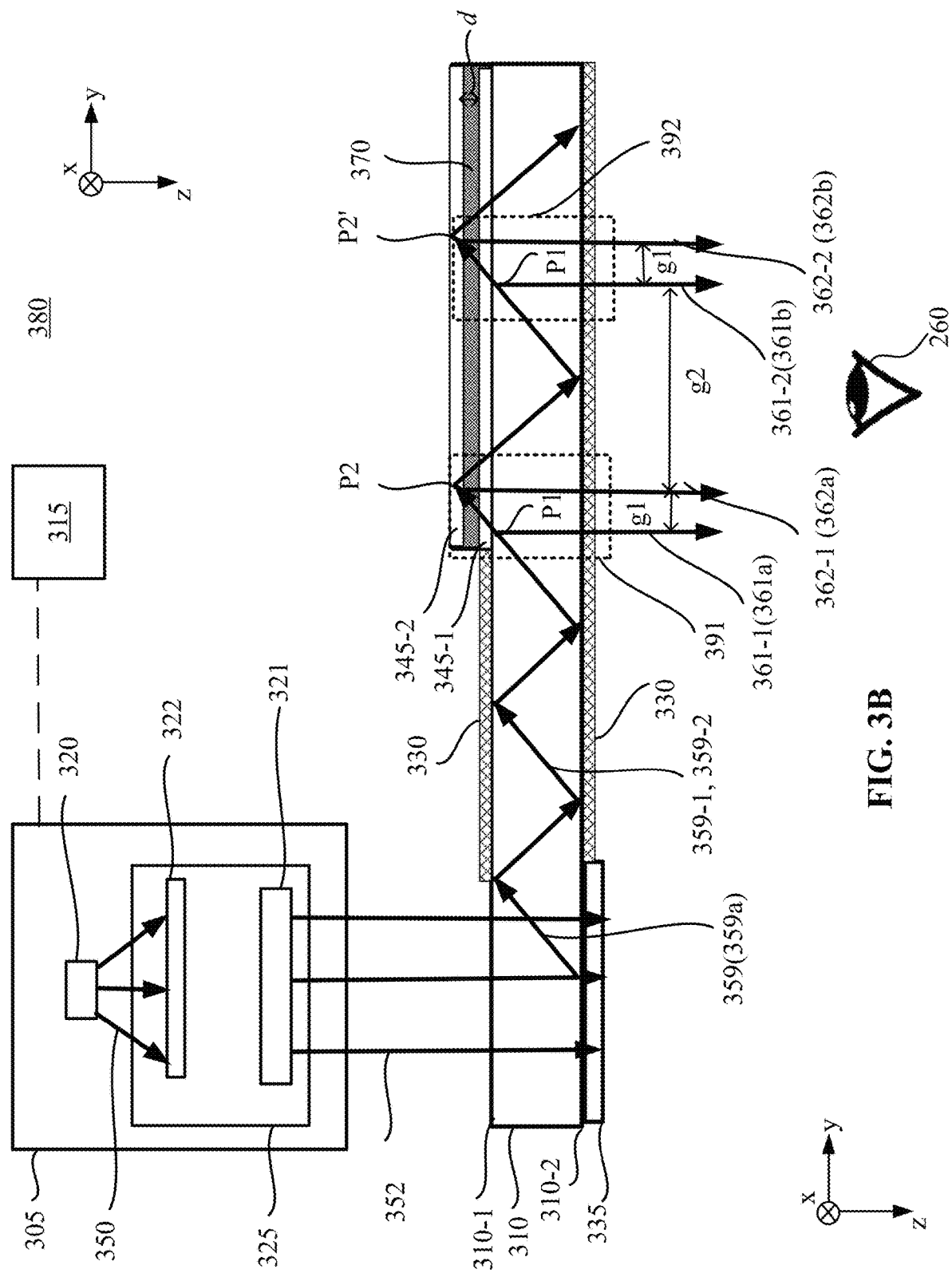
FIG. 3B schematically illustrates a diagram of a light guide display assembly configured to provide an increased pupil replication density, according to another embodiment of the present disclosure.

FIG. 3B schematically illustrates a diagram of a light guide display assembly 380 configured to provide an increased pupil replication density, according to another embodiment of the present disclosure. The light guide display assembly 300 shown in FIG. 3B may include elements, structures, and/or functions that are the same as or similar to those included in the light guide display assembly 300 shown in FIG. 3A. Descriptions of the same or similar elements, structures, or functions can refer to the above descriptions rendered in connection with FIG. 3A.

As shown in FIG. 3B, the light guide display assembly 380 may include a single in-coupling element 335 that may be polarization nonselective and configured to couple the image light 352 into the light guide 310 as a TIR propagating light (or an in-coupled light) 359. The TIR propagating light 359 may be an unpolarized light or a linearly polarized light that includes two circularly polarized components (or lights) with orthogon polarizations, e.g., a first circularly polarized component (or light) 359-1 having a first handedness and a second circularly polarized component (or light) 359-2 having a second handedness orthogonal to the first handedness. For illustrative purposes, FIG. 3B shows one TIR propagating ray 359a of the TIR propagating light 359.

The first out-coupling grating 345-1 may be configured to consecutively couple, via diffraction, the first circularly polarized component 359-1 (e.g., an RHCP component) out of the light guide 310 at different first positions (e.g., P1 and P1') of the first out-coupling grating 345-1 as a plurality of first output lights 361-1 and 361-2 (e.g., RHCP lights), when the TIR propagating light 359 is incident onto different portions of the first out-coupling grating 345-1. For illustrative purposes, FIG. 3B shows one first output ray 361a of the first output light 361-1 (e.g., an RHCP light) and one first output ray 361b of the first output light 361-2 (e.g., an RHCP light).

As the first out-coupling grating 345-1 is configured to substantially backwardly diffract an RHCP light and substantially transmit an LHCP light with negligible diffraction, the second circularly polarized component 359-2 (e.g., an LHCP light) may be transmitted, with negligible diffraction, through the first out-coupling grating 345-1 toward the second out-coupling grating 345-2 without changing the polarization. The second out-coupling grating 345-2 may be configured to consecutively couple, via diffraction, the second circularly polarized component 359-2 (e.g., an LHCP light) out of the light guide 310 at different second positions (e.g., P2 and P2') of the second out-coupling grating 345-2 as a plurality of second output lights 362-1 and 362-2 (e.g., LHCP lights), when the second circularly polarized component 359-2 (e.g., an LHCP light) is incident onto different portions of the second out-coupling grating 345-2. As the first out-coupling grating 345-1 is configured to substantially backwardly diffract an RHCP light and transmit an LHCP light with negligible diffraction, the second output lights 362-1 and 362-2 (e.g., LHCP lights) may be transmitted, with substantially zero or negligible diffraction, through the first out-coupling grating 345-1 and the light guide 310 toward the eye 260. For illustrative purposes, FIG. 3B shows one second output ray 362a of the second output light 362-1 (e.g., an LHCP light) and one second output ray 362b of the second output light 362-2 (e.g., an LHCP light).

In some embodiments, the light guide display assembly 300 may include one or more polarization correction films 330 disposed adjacent or at one or more surfaces (e.g., one or two outer surfaces) of the light guide 310. In some embodiments, the polarization correction film 330 may be configured to preserve the polarization states of the TIR propagating light 359 while the TIR propagating light 359 propagates inside the light guide 310. For example, the polarization correction film 330 may be configured to compensate for the depolarization of the TIR propagating light 359 while the TIR propagating light 359 propagates inside the light guide 310, thereby maintaining the polarization of the TIR propagating light 359.

Figure 4A:
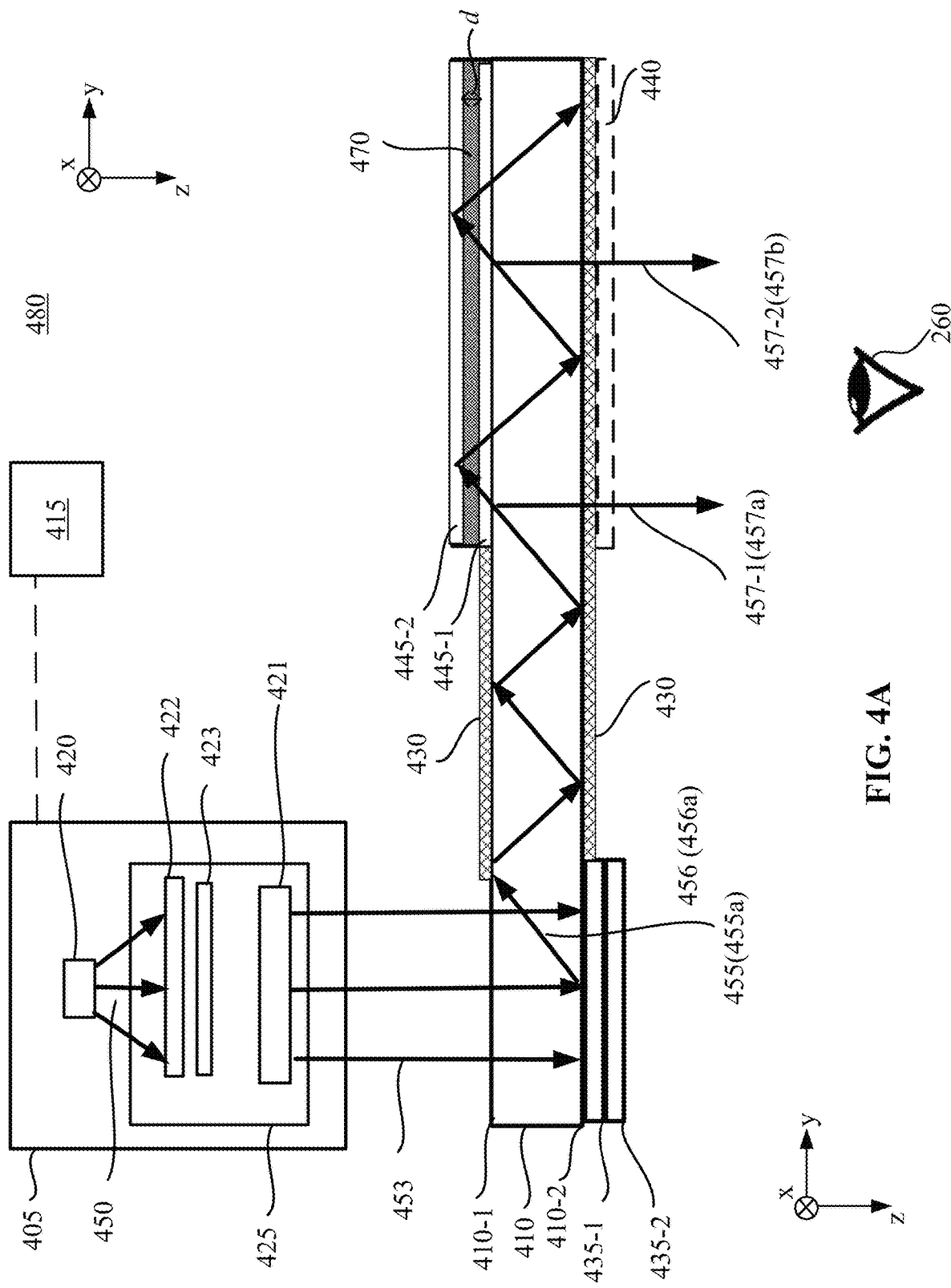
FIGS. 4A and 4B schematically illustrate diagrams of a light guide display assembly during a first sub-frame and a second sub-frame of a display frame, respectively, according to an embodiment of the present disclosure.
Figure 4B:
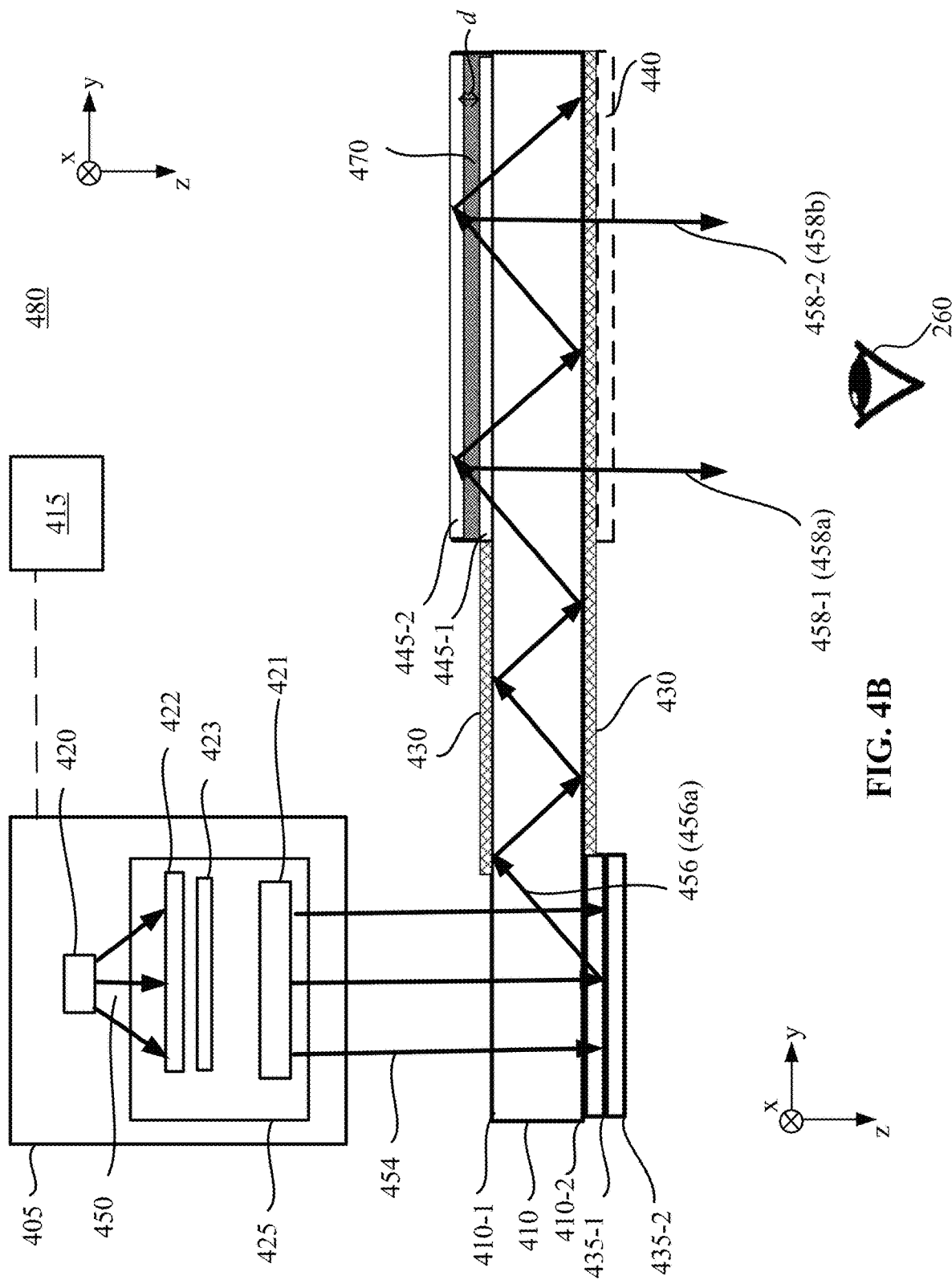

FIGS. 4A and 4B illustrate schematic diagrams of a light guide display assembly 400 configured to provide an increased pupil replication density during a first sub-frame and a second sub-frame of a display frame, respectively. It is to be noted that, in some embodiments, the display frame may not be divided into sub-frames. In this embodiment, FIGS. 4A and 4B illustrate schematic diagrams of the light guide display assembly 400 during two consecutive time periods, such as a first time period and a second time period, respectively. The light guide display assembly 400 shown in FIGS. 4A and 4B may include elements, structures, and/or functions that are the same as or similar to those included in the light guide display assembly 300 shown in FIG. 3A, or the light guide display assembly 380 shown in FIG. 3B. Descriptions of the same or similar elements, structures, or functions can refer to the above descriptions rendered in connection with FIG. 3A or FIG. 3B.

As shown in FIG. 4A, the light guide display assembly 400 may include a light source assembly 405, a light guide 410, and a controller 415, which may include elements, structures, and/or functions that are the same as or similar to those of the light source assembly 305, the light guide 310, and the controller 315 shown in FIG. 3A and FIG. 3B, respectively.

The light source assembly 405 may include a light source 420, which may be similar to the light source 320 shown in FIG. 3A. The light source assembly 405 may include a light conditioning system 425, which may include a polarization conversion element 422, a collimator 421, and a first polarization switch 423. The polarization conversion element 422 and the collimator 421 may be similar to polarization conversion element 322 and the collimator 321 shown in FIG. 3A, respectively. In some embodiments, the light source assembly 405 may include other elements not shown in FIG. 4A. The controller 415 may control various elements included in the light guide display assembly 400, such as the light source assembly 405. In some embodiments, the first polarization switch 423 may not be a part of the light conditioning system 425. Instead, the first polarization switch 423 may be disposed between the light conditioning system 425 and the light guide 410. For example, the first polarization switch 423 may be disposed at a surface of the light guide 410.

The light source 420 may be configured to emit an image light 450 representing a virtual-environment image during a display frame. The image light 450 may be configured with a predetermined FOV. The light conditioning system 425 may be configured to process the image light 450 emitted during the display frame, such that the light source assembly 405 may be configured to output a first image light 453 and a second image light 454 with orthogonal polarizations in a time-sequential manner. The light source assembly 405 may be configured to output the first image light 453 and the second image light 454 alternately in the time-sequential manner by controlling, e.g., by the controller 415, the first polarization switch 423 coupled to the light source 420. By switching the first polarization switch 423 on and off, the polarization of the image light incident onto the collimator 421 may be switched between a first polarization (e.g., the first image light 453) and a second polarization (e.g., the second image light 454). In some embodiments, the light source assembly 405 may be configured to output the first image light 453 and the second image light 454 with orthogonal polarizations during two consecutive sub-frames of the display frame, respectively. In some embodiments, the display frame may not be divided into sub-frames, and the light source assembly 405 may be configured to alternately output the first image light 453 and the second image light 454 with orthogonal polarizations during the display frame. During the display frame, the first polarization switch 423 may be consecutively switched between a switching state and a non-switching state, such that the light source assembly 405 may be configured to alternately output the first image light 453 and the second image light 454 with orthogonal polarizations during the display frame. In some embodiments, each of the first image light 453 and the second image light 454 may be associated with the full predetermined FOV of the image light 450. The light guide 410 may be configured to receive the first image light 453 as a first input light and the second image light 454 as a second input light during the two consecutive time periods (e.g., sub-frames of the display frame), respectively.

In some embodiments, the light source 420 may be configured to emit the image light 450 that is unpolarized or polarized. In some embodiments, the image light 450 may be a diverging light. The light conditioning system 425 may be configured to receive the image light 450 from the light source 420, and process the image light 450 to output the first image light 453 and the second image light 454 configured with predetermined properties. The light conditioning system 425 may include suitable optical elements configured to process the image light 450. The optical paths of the image light 450 propagating in the light conditioning system 425 are not shown in FIG. 4A. The image light 450 may propagate in the light conditioning system 425 in any suitable optical paths.

In some embodiments, the polarization conversion element 422 in the light conditioning system 425 may be configured to convert the image light 450 into an image light with a predetermined polarization (e.g., a circular polarization) during the display frame, before the image light 450 is incident onto the first polarization switch 423. In some embodiments, the polarization conversion element 422 may be disposed between the light source 420 and the first polarization switch 423. For example, in some embodiments, the light source 420 may be configured to emit the image light 450 that is a linearly polarized light, and the polarization conversion element 422 may include a quarter-wave plate ("QWP") configured to convert the linearly polarized image light to a circularly polarized image light with the first handedness. The QWP may output the circularly polarized image light with the first handedness to the first polarization switch 423. In some embodiments, the light source 420 may be configured to emit the image light 450 that is an unpolarized image light, and the polarization conversion element 422 may include a linear polarizer and the QWP. The linear polarizer may be configured to convert the unpolarized image light to a linearly polarized image light. The QWP may be configured to convert the linearly polarized image light to a circularly polarized image light with the first handedness. The QWP may output the circularly polarized image light with the first handedness to the first polarization switch 423. In some embodiments, when the light source 420 emits the image light 450 that is an unpolarized image light, the combination of the linear polarizer and the QWP may be replaced by a circular polarizer. In some embodiments, the light source 420 may be configured to emit the image light 450 with a predetermined polarization, and the polarization conversion element 422 may be omitted.

In some embodiments, the collimator 421 (e.g., a collimating lens) may be configured to collimate the image light 450 generated by the light source 420. For example, in the embodiment shown in FIG. 4A, the collimator 421 may be disposed between the first polarization switch 423 and the light guide 410, and configured to collimate the image light output from the first polarization switch 423 before the image light is incident onto the light guide 410. Although not shown, in some embodiments, the collimator 421 may be disposed between the polarization conversion element 422 and the first polarization switch 423, and configured to collimate the image light output from the polarization conversion element 422 before the image light is incident onto the first polarization switch 423. In some embodiments, the collimator 421 may be disposed between the light source 420 and the polarization conversion element 422, and configured to collimate the image light output from the light source 420 before the image light is incident onto the polarization conversion element 422.

In some embodiments, the first polarization switch 423 may be an active element configured to maintain a polarization of an incident light or switch a polarization of an incident light to an orthogonal polarization, depending on an operation state (e.g., switching or non-switching state) of the first polarization switch 423. In some embodiment, the controller 415 may be configured to control the operation state of the first polarization switch 423. In some embodiment, the first polarization switch 423 may be configured to maintain a handedness of a circularly polarized incident light or switch a handedness of a circularly polarized incident light to an opposite handedness, depending on the operation state (e.g., switching or non-switching state) of the first polarization switch 423. In the embodiment shown in FIG. 4A, the first polarization switch 423 is a part of the light conditioning system 425. In some embodiments, the first polarization switch 423 may not be a part of the light conditioning system 425. Instead, the first polarization switch 423 may be a part of the light source assembly 405, and may be disposed between the light conditioning system 425 and the light guide 410. In some embodiments, the first polarization switch 423 may not be a part of the light source assembly 405, and may be coupled to the light guide 410. For example, the first polarization switch 423 may be disposed at a surface of one of the light guide 410 of the light guide 410.

In some embodiments, the first polarization switch 423 may include an SHWP. For example, in some embodiments, the light source 420 may be configured to emit the image light 450 that is a circularly polarized image light with a first handedness toward the first polarization switch 423 (e.g., SHWP). In some embodiments, the polarization conversion element 422 may be omitted. The first polarization switch 423 (e.g., SHWP) may be controlled by the controller 415 to operate in the non-switching state to maintain the handedness of the circularly polarized image light. The first polarization switch 423 (e.g., SHWP) may be controlled by the controller 415 to operate in the switching state to switch the handedness of the circularly polarized image light from the first handedness to a second handedness opposite to the first handedness.

The light guide 410 may be coupled with one or more in-coupling elements. In some embodiments, each in-coupling element may be polarization selective. In some embodiments, each in-coupling element may include one or more gratings. For discussion purposes, the in-coupling element may be referred to as an in-coupling grating. It is understood that in other embodiments, the in-coupling element may include a non-grating structure. In the embodiment shown in FIG. 4A, two polarization selective in-coupling gratings, a first in-coupling grating 435-1 and a second in-coupling grating 435-2, are coupled with the light guide 410. The number of the in-coupling gratings is not limited to two, and can be any suitable number, such as one, three, four, five, six, etc. In some embodiments, the first in-coupling grating 435-1 and the second in-coupling grating 435-2 may be configured to couple, via diffraction, the first and second input lights having orthogonal polarizations into the light guide 410 during the two consecutive sub-frames, respectively. The first input light 453 and the second input light 454 may propagate inside the light guide 410 through TIR during the two consecutive sub-frames, respectively.

The light guide 410 may also be coupled with one or more out-coupling elements. In some embodiments, each out-coupling element may be polarization selective. In some embodiments, each out-coupling element may include one or more polarization selective gratings. For discussion purposes, each out-coupling element may be referred to as an out-coupling grating. It is understood that in other embodiments, the out-coupling element may include a non-grating structure. In the embodiment shown in FIG. 4A, two out-coupling gratings, a first out-coupling grating 445-1 and a second out-coupling grating 445-2, are coupled with the light guide 410. Each of the in-coupling gratings 435-1 and 435-2 and the out-coupling gratings 445-1 and 445-2 may be a transmissive type grating (e.g., a transmissive PVH) or a reflective type grating (e.g., a reflective PVH).

The first out-coupling grating 445-1 and the second out-coupling grating 445-2 may be spaced apart from each other by a distance d, in the stacking direction of the first out-coupling grating 445-1 and the second out-coupling grating 445-2 (or in the thickness direction of the light guide 410). In some embodiments, the first out-coupling grating 445-1 and the second out-coupling grating 445-2 may substantially overlap or be aligned in the thickness direction of the light guide 410. In some embodiments, the first out-coupling grating 445-1 and the second out-coupling grating 445-2 may have a substantially same light exiting area (e.g., a substantially same area from which the respective TIR propagating light is coupled out from the light guide 410 by the respective out-coupling grating).

In some embodiments, a space between the first out-coupling grating 445-1 and the second out-coupling grating 445-2 may be at least partially filled with an index-matching material 470, which may be configured to suppress the light reflections within the space. The index-matching material 470 may have a refractive index matching with the refractive indices of the materials of the first out-coupling grating 445-1 and the second out-coupling grating 445-2. In some embodiments, a space around the first out-coupling grating 445-1 and the second out-coupling grating 445-2 may also be at least partially filled with the index-matching material 470 for suppressing the light reflections within the space. In some embodiments, the distance d between the first out-coupling grating 445-1 and the second out-coupling grating 445-2 may be defined by the thickness of the index-matching material 470 that fills the space between the first out-coupling grating 445-1 and the second out-coupling grating 445-2. In some embodiments, the distance d between the first out-coupling grating 445-1 and the second out-coupling grating 445-2 may be fixed. In some embodiments, the distance d between the first out-coupling grating 445-1 and the second out-coupling grating 445-2 may be adjustable by a suitable mechanism.

For illustrative purposes, FIG. 4A shows that the in-coupling gratings 435-1 and 435-2 are stacked at the second surface 410-2 of the light guide 410, and the out-coupling gratings 445-1 and 445-2 are stacked at the first surface 410-1 of the light guide 410. Although not shown, in some embodiments, the in-coupling gratings 435-1 and 435-2 may be stacked or disposed side by side at the first surface 410-1, and the out-coupling gratings 445-1 and 445-2 may be stacked at the second surface 410-2. In some embodiments, the in-coupling gratings 435-1 and 435-2 and the stack of the out-coupling gratings 445-1 and 445-2 may be disposed at the same surface (e.g., the first surface 410-1 or the second surface 410-2) of the light guide 410.

The in-coupling gratings 435-1 and 435-2 may be embodiments of (or may be similar to) the in-coupling gratings 335-1 and 335-2 shown in FIG. 3A. The out-coupling gratings 445-1 and 445-2 may be embodiments of (or may be similar to) the out-coupling gratings 345-1 and 345-2 shown in FIG. 3A. In some embodiments, each of the in-coupling gratings 435-1 and 435-2 and each of the out-coupling gratings 445-1 and 445-2 may be a transmissive type grating (e.g., a transmissive PVH grating) or a reflective type grating (e.g., a reflective PVH grating). In the embodiment shown in FIGS. 4A and 4B, the in-coupling gratings 435-1 and 435-2 may be reflective PVH gratings configured to backwardly diffract circularly polarized lights with orthogonal polarizations (e.g., a first circularly polarized light with a first handedness and a second circularly polarized light with a second handedness that is opposite to the first handedness), respectively. The out-coupling gratings 445-1 and 445-2 may be reflective PVH gratings configured to backwardly diffract circularly polarized lights with orthogonal polarizations, respectively. The out-coupling gratings 445-1 and 445-2 may have the same polarization selectivity as the in-coupling gratings 435-1 and 435-2, respectively.

As shown in FIG. 4A, during a first sub-frame of the display frame, the light source 420 may emit the image light 450 toward the polarization conversion element 422. For illustrative purposes, the image light 450 may be an unpolarized light or a linearly polarized light. The polarization conversion element 422 may be configured to convert the image light 450 into a circularly polarized light (e.g., an RHCP light). The polarization conversion element 422 may output the circularly polarized light toward the first polarization switch 423 (e.g., SHWP). The first polarization switch 423 (e.g., SHWP) may be controlled by the controller 415 to operate in the non-switching state to transmit the circularly polarized light (e.g., an RHCP light) without affecting the polarization. For example, the first polarization switch 423 (e.g., SHWP) may transmit the circularly polarized light (e.g., an RHCP light) received from the polarization conversion element 422 as a circularly polarized light (e.g., an RHCP light). In some embodiments, the circularly polarized light (e.g., an RHCP light) may be collimated by the collimator 421 as the first image light 453 (e.g., an RHCP light). That is, during the first sub-frame of the display frame, the light source assembly 405 may be configured to output the first image light 453 (e.g., an RHCP light) toward the light guide 410. The first image light 453 (e.g., an RHCP light) may also be referred to as the first input light 453 (e.g., an RHCP light) of the light guide 410.

The first in-coupling grating 435-1 may be configured to couple, via diffraction, the first input light 453 (e.g., an RHCP light) into the light guide 410 as a first TIR propagating light 455 (e.g., an RHCP light). For illustrative purposes, FIG. 4A shows one first TIR propagating ray 455a of the first TIR propagating light 455. In some embodiments, the initial polarization of the first TIR propagating light 455 (e.g., right-handed circular polarization) may be maintained when propagating inside the light guide 410 through TIR toward the first out-coupling grating 445-1, e.g. by one or more polarization correction films 430. The first out-coupling grating 445-1 may be configured to couple, via diffraction, the first TIR propagating light 455 (e.g., an RHCP light) out of the light guide 410 at different positions of the first out-coupling grating 445-1 as a plurality of first output lights 457-1 and 457-2 (e.g., RHCP lights), when the first TIR propagating light 455 (e.g., an RHCP light) is incident onto the different positions of the first out-coupling grating 445-1. Thus, the first out-coupling grating 445-1 may replicate the image light 453 received from the light source assembly 405 to expand an effective pupil of the light guide display assembly 400. For illustrative purposes, FIG. 4A shows one first output ray 457a of the first output light 457-1 (e.g., an RHCP light) and one first output ray 457b of the first output light 457-2 (e.g., an RHCP light). For illustrative and discussion purposes, each of the first output light 457-1 and the first output light 457-2 represents a pupil (e.g. an exit pupil). Thus, FIG. 4A shows that at the first sub-frame, two pupils corresponding to the two RHCP output lights are provided at the output side of the light guide 410 for the first input light 453.

Referring to FIG. 4B, during a second sub-frame of the display frame, the light source 420 may output the image light 450 toward the polarization conversion element 422. For illustrative purposes, the image light 450 may be an unpolarized light or a linearly polarized light. The polarization conversion element 422 may be configured to convert the image light 450 into a circularly polarized light (e.g., an RHCP light), and may output the circularly polarized light toward the polarization switch 423 (e.g., SHWP). The polarization switch 423 (e.g., SHWP) may be configured to operate in the switching state to switch the handedness of the circularly polarized light (e.g., an RHCP light) to the opposite handedness. For example, the polarization switch 423 (e.g., SHWP) may transmit the circularly polarized light (e.g., an RHCP light) received from the polarization conversion element 422 as a circularly polarized light having an opposite handedness (e.g., an LHCP light). In some embodiments, the circularly polarized light (e.g., an LHCP light) may be collimated by the collimator 421 as the second image light 454 (e.g., an LHCP light). That is, during the second sub-frame of the display frame, the light source assembly 405 may be configured to output the second image light 454 (e.g., an LHCP light) toward the light guide 410. The second image light 454 (e.g., an LHCP light) may also be referred to as the second input light 454 (e.g., an LHCP light) of the light guide 410.

As the first in-coupling grating 435-1 is configured to substantially (e.g., primarily) backwardly diffract an RHCP light and substantially (e.g., primarily) transmit an LHCP light with negligible diffraction, the second input light 454 (e.g., an LHCP light) may be transmitted, without diffraction, through the light guide 410 and the first in-coupling grating 435-1 toward the second in-coupling grating 435-2 without changing the polarization. The second in-coupling grating 435-2 may be configured to couple, via diffraction, the second input light 454 (e.g., an LHCP light) into the light guide 410 as a second TIR propagating light 456 (e.g., an LHCP light). For illustrative purposes, FIG. 4B shows one second TIR propagating ray 456a of the second TIR propagating light 456. In some embodiments, the initial polarization of the second TIR propagating light 456 (e.g., left-handed circular polarization) may be maintained when propagating inside the light guide 410 through TIR toward the second out-coupling grating 445-2, e.g. by one or more polarization correction films 430.

The second out-coupling grating 445-2 may be configured to consecutively couple, via diffraction, the second TIR propagating light 456 (e.g., an LHCP light) out of the light guide 410 at different positions of the second out-coupling grating 445-2 as a plurality of second output lights 458-1 and 458-2 (e.g., LHCP lights), when the second TIR propagating light 456 (e.g., an LHCP light) is incident onto the different positions of the second out-coupling grating 445-2. As the first out-coupling grating 445-1 is configured to substantially (e.g., primarily) backwardly diffract an RHCP light and transmit an LHCP light with negligible diffraction, the second output lights 458-1 and 458-2 (e.g., LHCP lights) may be transmitted, with substantially zero or negligible diffraction, through the first out-coupling grating 445-1 and the light guide 410 toward the eye 260. Thus, the second out-coupling grating 445-2 may replicate the image light 454 received from the light source assembly 405 to expand an effective pupil of the light guide display assembly 400. For illustrative purposes, FIG. 4B shows one second output ray 458a of the second output light 458-1 (e.g., an LHCP light) and one second output ray 458b of the second output light 458-2 (e.g., an LHCP light). For discussion and illustrative purposes, each of the second output lights 458-1 and 485-2 represents a pupil.

Figure 4C:
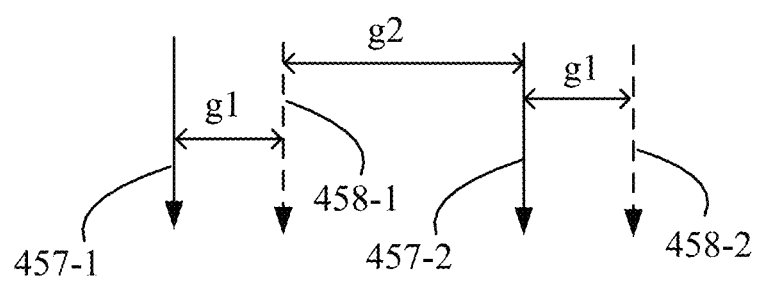
FIG. 4C schematically illustrates the output lights of a light guide during the first sub-frame and the second sub-frame, as shown in FIG. 4A and FIG. 4B, according to an embodiment of the present disclosure.

FIG. 4C schematically illustrates output lights of the light guide display assembly 400 during the consecutive sub-frames, i.e., the output lights 457-1, 458-1, 457-2, and 458-2 shown in FIG. 4A and FIG. 4B. The output lights 457-1 and 457-2 are output during a first sub-frame, as shown in FIG. 4A, and output lights 458-1 and 458-2 are output during a second sub-frame, as shown in FIG. 4B. Each of the output lights 457-1, 457-2, 458-1, and 458-2 may have the same FOV as the image light 450. In other words, each of the output lights 457-1, 457-2, 458-1, and 458-2 may represent the same image content as the image light 450. As shown in FIG. 4C, a first gap g1 may exist between two neighboring output lights that are output at consecutive sub-frames. For example, the first gap g1 may exist between the first output light 457-1 and the second output light 458-1, and between the first output light 457-2 and the second output light 458-2. A second gap g2 may exist between two neighboring output lights that are output at different positions of the light guide 410 (e.g., between the output light 458-1 output during the second sub-frame and the output light 457-2 output during the first sub-frame). For discussion purposes, the output lights 457-1 and 458-1 are regarded as being output from a same first output region (e.g., similar to output region 391 shown in FIG. 3A) of the light guide 410, and the output lights 457-2 and 458-2 are regarded as being output from a same second output region (e.g., similar to output region 392 shown in FIG. 3A) of the light guide 410. The first gap g1 may be adjusted to sufficiently separate the output lights 457-1 and 458-1, such that the pupils formed by the output lights 457-1 and 458-1 are substantially non-overlapping. Likewise, the output lights 457-2 and 458-2 may be sufficiently separated such that the pupils formed by the output lights 457-2 and 458-2 are substantially non-overlapping. A conventional light guide display assembly (e.g., 200) having a single, polarization nonselective out-coupling element may provide only two pupils (e.g., pupils formed by output lights 457-1 and 457-2 or pupils formed by output lights 458-1 and 458-2), as the output light 458-1 may coincide with the output light 457-1, and the output light 458-2 may coincide with the output light 457-2. The light guide display assembly 400 may provide four pupils formed by the output lights 457-1, 457-2, 458-1, and 458-2. Thus, the light guide display assembly 400 may provide an increased pupil replication density. The first gap g1 may be determined by the distance d between the first out-coupling grating 445-1 and the second out-coupling grating 445-2. When the distance d is increased, the first gap g1 may be increased, and the second gap g2 may be decreased. When the distance d is decreased, the first gap g1 may be decreased, and the second gap g2 may be increased. By suitably adjusting the distance d, the first gap g1 and the second gap g2 may be adjusted such that a uniform distribution of the pupils may be achieved (e.g., g1 may be adjusted to be substantially equal to g2).

Referring to FIGS. 4A and 4B, in some embodiments, a second polarization switch 440 may be coupled to the light guide 410 at the output side of the light guide 410. The second polarization switch 440 may be disposed between the light guide 410 and the eye 260. The second polarization switch 440 may be similar to the first polarization switch 423, and may be synchronized with the first polarization switch 423. For example, both of the second polarization switch 440 and the first polarization switch 423 may be controlled by the controller 415 to operate in the switching state during one of the first and second sub-frames, and to operate in the non-switching state during the other of the first and second sub-frames. In some embodiments, the second polarization switch 440 may not be synchronized with the first polarization switch 423. For example, the second polarization switch 440 and the first polarization switch 423 may be configured to operate in the switching state during different sub-frames, and to operate in the non-switching state during different sub-frames. In other words, in a sub-frame, one of the first polarization switch 423 and the second polarization switch 440 may operate in the switching state, and the other one of the first polarization switch 423 and the second polarization switch 440 may operate in the non-switching state.

For discussion purposes, in the embodiment shown in FIGS. 4A and 4B, the second polarization switch 440 (e.g., a second SHWP) may be synchronized with the first polarization switch 423 (e.g., a first SHWP) to operate in the non-switching state during the first sub-frame and operate in the switching state during the second sub-frame. Thus, during the first sub-frame, the second polarization switch 440 (e.g., a second SHWP) operating in the non-switching state may be configured to maintain the polarization of the first output light 457 (e.g., an RHCP light), and may output an image light (e.g., an RHCP light) having a polarization that is the same as the first output light 457 (e.g., an RHCP light). During the second sub-frame, the second polarization switch 440 (e.g., a second SHWP) operating in the switching state may be configured to switch the handedness of the second output light 458 (e.g., an LHCP light) and output an image light (e.g., an RHCP light) having a polarization that is opposite to the second output light 458 (e.g., an LHCP light). Thus, during the first sub-frame and the second sub-frame, the eye 260 may receive output image lights with the same polarization (e.g., RHCP lights).

Figure 5:
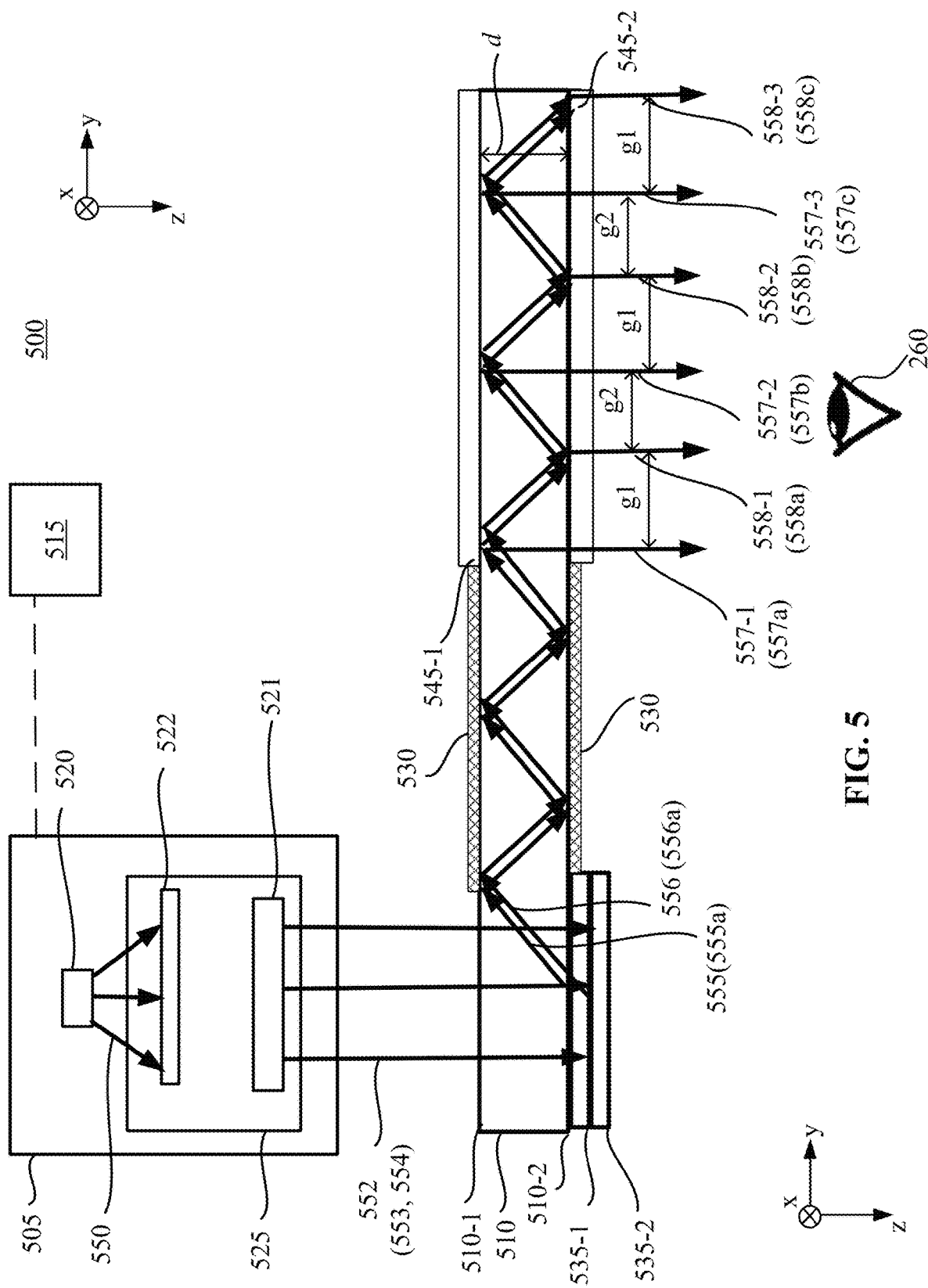
FIG. 5 schematically illustrates a diagram of a light guide display assembly configured to provide an increased pupil replication density, according to another embodiment of the present disclosure.

FIG. 5 illustrate schematic diagrams of a light guide display assembly 500 configured to provide an increased pupil replication density, according to an embodiment of the present disclosure. The light guide display assembly 500 shown in FIG. 5 may include elements, structures, and/or functions that are the same as or similar to those included in the light guide display assembly 300 shown in FIG. 3A, the light guide display assembly 380 shown in FIG. 3B, or the light guide display assembly 400 shown in FIGS. 4A-4C. Descriptions of the same or similar elements, structures, or functions can refer to the above descriptions rendered in connection with FIG. 3A, FIG. 3B, or FIGS. 4A-4C.

As shown in FIG. 5, the light guide display assembly 500 may include a light source assembly 505, a light guide 510, and a controller 515, which may include elements, structures, and/or functions that are the same as or similar to those of the light source assembly 305, the light guide 310, and the controller 315 shown in FIGS. 3A and 3B, respectively.

The light source assembly 505 may include a light source 520 and a light conditioning system 525 including a polarization conversion element 522 and a collimator 521, which may be similar to the light source 320 and the light conditioning system 325 including the polarization conversion element 322 and the collimator 321 shown in FIGS. 3A and 3B. Descriptions of the same or similar elements, structures, and/or functions may refer to the above descriptions rendered in connection with FIG. 3A or 3B. The controller 515 may control various elements included in the light guide display assembly 500, such as the light source assembly 505.

The light source 520 may be configured to emit an image light 550 representing a virtual-environment image during a display frame. The image light 550 may be configured with a predetermined FOV. The light conditioning system 525 may be configured to process the image light 550 emitted during the display frame, such that the light source assembly 505 may be configured to output an image light 552 with predetermined properties. For example, the image light 552 may be an unpolarized light or a polarized light with a predetermined polarization. The image light 552 may be decomposed into two orthogonally polarized components: a first polarized component 553 having a first polarization and a second polarized component 554 having a second polarization orthogonal to the first polarization. The light guide 510 may be configured to receive the first polarized component 553 as a first input light 553 and the second polarized component 554 as a second input light 554. The optical paths of the image light 550 propagating in the light conditioning system 525 are not shown in FIG. 5. The image light 550 may propagate in the light conditioning system 525 in any suitable optical paths. In some embodiments, the light source assembly 505 and the eye 260 may be arranged at the same side of the light guide 510.

The light guide 510 may be coupled with one or more in-coupling elements. In some embodiments, each in-coupling element may be polarization selective. In some embodiments, each in-coupling element may include one or more polarization selective gratings. For discussion purposes, each in-coupling element may be referred to as an in-coupling grating. It is understood that in other embodiments, the in-coupling element may include a non-grating structure. In the embodiment shown in FIG. 5, the light guide 510 may be coupled with a first in-coupling grating 535-1 and a second in-coupling grating 535-2. For illustrative purposes, FIG. 5 shows that the in-coupling gratings 535-1 and 535-2 are stacked at the first surface 510-1 of the light guide 510. In some embodiments, the light guide display assembly 500 may include a single in-coupling element. The number of in-coupling elements is not limited to one or two, and may be any suitable number, such as three, four, etc.

The light guide 510 may be coupled with one or more out-coupling elements. In some embodiments, each out-coupling element may be polarization selective. In some embodiments, each out-coupling element may include one or more gratings. For discussion purposes, each out-coupling element may be referred to as an out-coupling grating. It is understood that in other embodiments, the out-coupling element may include a non-grating structure. In the embodiment shown in FIG. 5, the light guide 510 may be coupled with a first out-coupling grating 545-1 and a second out-coupling grating 545-2. The number of out-coupling elements is not limited to two, and may be any suitable number, such as three, four, etc. The first out-coupling grating 545-1 and the second out-coupling grating 545-2 may be disposed at different surfaces of the light guide 510. For example, the first out-coupling grating 545-1 and the second out-coupling grating 545-2 may be disposed at a first surface 510-1 and a second surface 510-2 of the light guide 510, respectively. The first out-coupling grating 545-1 and the second out-coupling grating 545-2 may be spaced apart from each other by a distance d, in the thickness direction of the light guide 510. In some embodiments, the distance d between the first out-coupling grating 545-1 and the second out-coupling grating 545-2 may be defined in part by the thickness of the light guide 510. In some embodiments, one or more additional elements/layers/films (e.g., an index-matching material layer) may be disposed between the first out-coupling grating 545-1 and the second out-coupling grating 545-2, and the distance d between the first out-coupling grating 545-1 and the second out-coupling grating 545-2 may be defined by the thicknesses of the light guide and the one or more additional elements/layers/films. In some embodiments, the distance d between the first out-coupling grating 545-1 and the second out-coupling grating 545-2 may be fixed. In some embodiments, the distance d between the first out-coupling grating 545-1 and the second out-coupling grating 545-2 may be adjustable by a suitable mechanism. For example, by adjusting the thickness of the one or more additional elements/layers/films between the light guide 510 and the out-coupling grating 545-1 and/or 545-2, the distance d may be adjusted. In some embodiments, the first out-coupling grating 545-1 and the second out-coupling grating 545-2 may substantially overlap and be aligned with one another in the thickness direction of the light guide 510. In some embodiments, the first out-coupling grating 545-1 and the second out-coupling grating 545-2 may have a substantially same light exiting area (e.g., a substantially same area from which the respective TIR propagating light is coupled out from the light guide 510 by the respective out-coupling grating).

Each of the in-coupling gratings 535-1 and 535-2 and out-coupling gratings 545-1 and 545-2 may be a transmissive or reflective grating. In the embodiment shown in FIG. 5, the first in-coupling grating 535-1 and the second in-coupling grating 535-2 may be reflective PVH gratings configured to substantially (e.g., primarily) diffract circularly polarized lights having orthogonal polarizations. The first out-coupling grating 545-1 may be a reflective PVH grating, and the second out-coupling grating 545-2 may be transmissive PVH grating. The first out-coupling grating 545-1 and the second out-coupling grating 545-2 may be configured to substantially (e.g., primarily) diffract circularly polarized lights having orthogonal polarizations. Each of the out-coupling gratings 545-1 and 545-2 may have the same polarization selectivity as a corresponding one of the in-coupling gratings 535-1 and 535-2. For illustration and discussion purposes, in the embodiment shown in FIG. 5, the in-coupling grating 535-1 and the out-coupling grating 545-1 may have the same polarization selectivity, and the in-coupling grating 535-2 and the out-coupling grating 545-2 may have the same polarization selectivity. For example, the in-coupling grating 535-1 and the out-coupling grating 545-1 may be configured to substantially (e.g., primarily) diffract an RHCP light, and substantially (e.g., primarily) transmit, with substantially zero or negligible diffraction, an LHCP light. The in-coupling grating 535-2 and the out-coupling grating 545-2 may be configured to substantially (e.g., primarily) diffract an LHCP light, and substantially (e.g., primarily) transmit, with substantially zero or negligible diffraction, an RHCP light.

As shown in FIG. 5, for illustrative purposes, the light source 520 may emit the image light 550 that is an unpolarized light or a linearly polarized light. The polarization conversion element 522 may be omitted. The image light 550 may represent a display image or a virtual-environment image. In some embodiments, the image light 550 may be collimated by the collimator 521 as the image light 552. The image light 552 may be decomposed into two orthogonally polarized components: the first polarized component 553 having the first polarization (e.g., an RHCP light) and the second polarized component 554 having the second polarization (e.g., an LHCP light) orthogonal to the first polarization. The light guide 510 may receive the first polarized component 553 (e.g., an RHCP light) and the second polarized component 554 (e.g., an LHCP light) as the first input light 553 (e.g., an RHCP light) and the second input light 554 (e.g., an LHCP light), respectively. The light guide 510 may receive the first input light 553 (e.g., an RHCP light) and the second input light 554 (e.g., an LHCP light) together during a same time period (i.e., simultaneously), e.g., during a same display frame of the display image (or a same sub-frame of a display frame) generated by the light source 520.

The first in-coupling grating 535-1 may be configured to couple, via diffraction, the first input light 553 (e.g., an RHCP light) into the light guide 510 as a first TIR propagating light 555 (e.g., an RHCP light). For illustrative purposes, FIG. 5 shows one first TIR propagating ray 555a of the first TIR propagating light 555. As the first in-coupling grating 535-1 is configured to substantially (e.g., primarily) backwardly diffract an RHCP light and substantially (e.g., primarily) transmit an LHCP light with negligible diffraction, the second input light 554 (e.g., an LHCP light) may be transmitted, without diffraction, through the first in-coupling grating 535-1 toward the second in-coupling grating 535-2 without changing the polarization. The second in-coupling grating 535-2 may be configured to couple, via diffraction, the second input light 554 (e.g., an LHCP light) into the light guide 510 as a second TIR propagating light 556 (e.g., an LHCP light). For illustrative purposes, FIG. 5 shows one second TIR propagating ray 556a of the second TIR propagating light 556. In some embodiments, the initial polarization of the first TIR propagating light 555 (e.g., right-handed circular polarization) may be maintained when propagating inside the light guide 510 through TIR toward the first out-coupling grating 545-1, e.g. by one or more polarization correction films 530. In some embodiments, the initial polarization of the second TIR propagating light 556 (e.g., left-handed circular polarization) may be maintained when propagating inside the light guide 510 through TIR toward the second out-coupling grating 545-2 by, e.g., the one or more polarization correction films 530.

The first out-coupling grating 545-1 may be configured to consecutively couple, via diffraction, the first TIR propagating light 555 (e.g., an RHCP light) out of the light guide 510 at different positions of the first out-coupling grating 545-1 as a plurality of first output lights e.g., 557-1, 557-2, and 557-3 (e.g., RHCP lights), when the first TIR propagating light 555 (e.g., an RHCP light) is incident onto the different positions of the first out-coupling grating 545-1. Thus, the first out-coupling grating 545-1 may replicate the image light 553 received from the light source assembly 505 to expand an effective pupil of the light guide display assembly 500. For illustrative purposes, FIG. 5 shows one first output ray 557a of the first output light 557-1 (e.g., an RHCP light), one first output ray 557b of the first output light 557-2 (e.g., an RHCP light), and one first output ray 557c of the first output light 557-3 (e.g., an RHCP light).

The second out-coupling grating 545-2 may be configured to consecutively couple, via diffraction, the second TIR propagating light 556 (e.g., an LHCP light) out of the light guide 510 at different positions of the second out-coupling grating 545-2 as a plurality of second output lights, e.g., 558-1, 558-2, and 558-3 (e.g., RHCP lights), when the second TIR propagating light 556 (e.g., an LHCP light) is incident onto the different positions of the second out-coupling grating 545-2. Thus, the second out-coupling grating 545-2 may replicate the image light 554 received from the light source assembly 505 to expand an effective pupil of the light guide display assembly 500. FIG. 5 shows one second output ray 558a of the second output light 558-1 (e.g., an RHCP light), one second output ray 558b of the second output light 558-2 (e.g., an RHCP light), and one second output ray 558c of the second output light 558-3 (e.g., an RHCP light). Each of the output lights 557-1, 557-2, 557-3, 558-1, 558-2, and 558-3 may have the same FOV as the image light 550. In other words, each of the output lights 557-1, 557-2, 557-3, 558-1, 558-2, and 558-3 may represent the same image content as the image light 550.

Referring to FIG. 5, a gap between two neighboring pupils (or a gap between two neighboring output image lights) may be adjusted by adjusting the distance d between the first out-coupling grating 545-1 and the second out-coupling grating 545-2. For example, a first gap g1 between the first output light 557-1 and the second output light 558-1, a second gap g2 between the second output light 558-1 and the first output light 557-2, or a first gap g1 between the first output light 557-3 and the second output light 558-3, may be adjusted by adjusting the distance d between the first out-coupling grating 545-1 and the second out-coupling grating 545-2. A conventional light guide display assembly (e.g., 200) having a single, polarization nonselective out-coupling element (or grating) may provide only three pupils (e.g., pupils formed by 557-1, 557-2, and 557-3, or pupils formed by 558-1, 558-2, and 558-3), as there may not be output lights 558-1, 558-2, and 558-3. The light guide display assembly 500 may provide six pupils formed by the output lights 557-1, 557-2, 557-3, 558-1, 558-2, and 558-3. Due to the increased number of pupils, the gap between two neighboring pupils may be reduced. Accordingly, light guide display assembly 500 may provide an increased pupil replication density. In addition, the gap (g1 or g2) between two neighboring pupils provided by the light guide display assembly 500 may be adjusted to achieve a more uniform pupil distribution (e.g., g1 and g2 may be adjusted to be substantially the same).

Figure 6A:
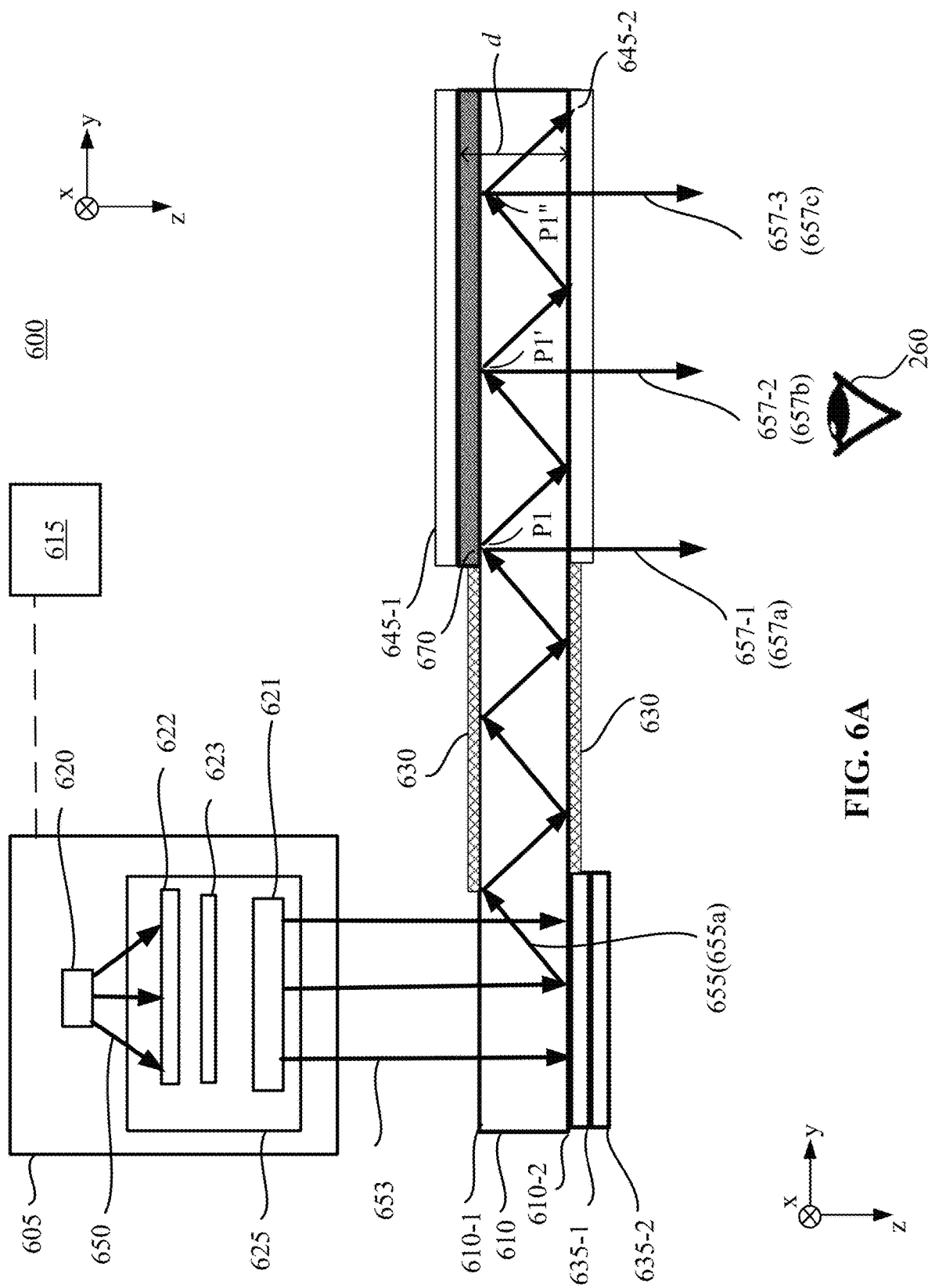
FIGS. 6A and 6B schematically illustrate diagrams of a light guide display assembly during a first sub-frame and a second sub-frame of a display frame, respectively, according to another embodiment of the present disclosure.
Figure 6B:
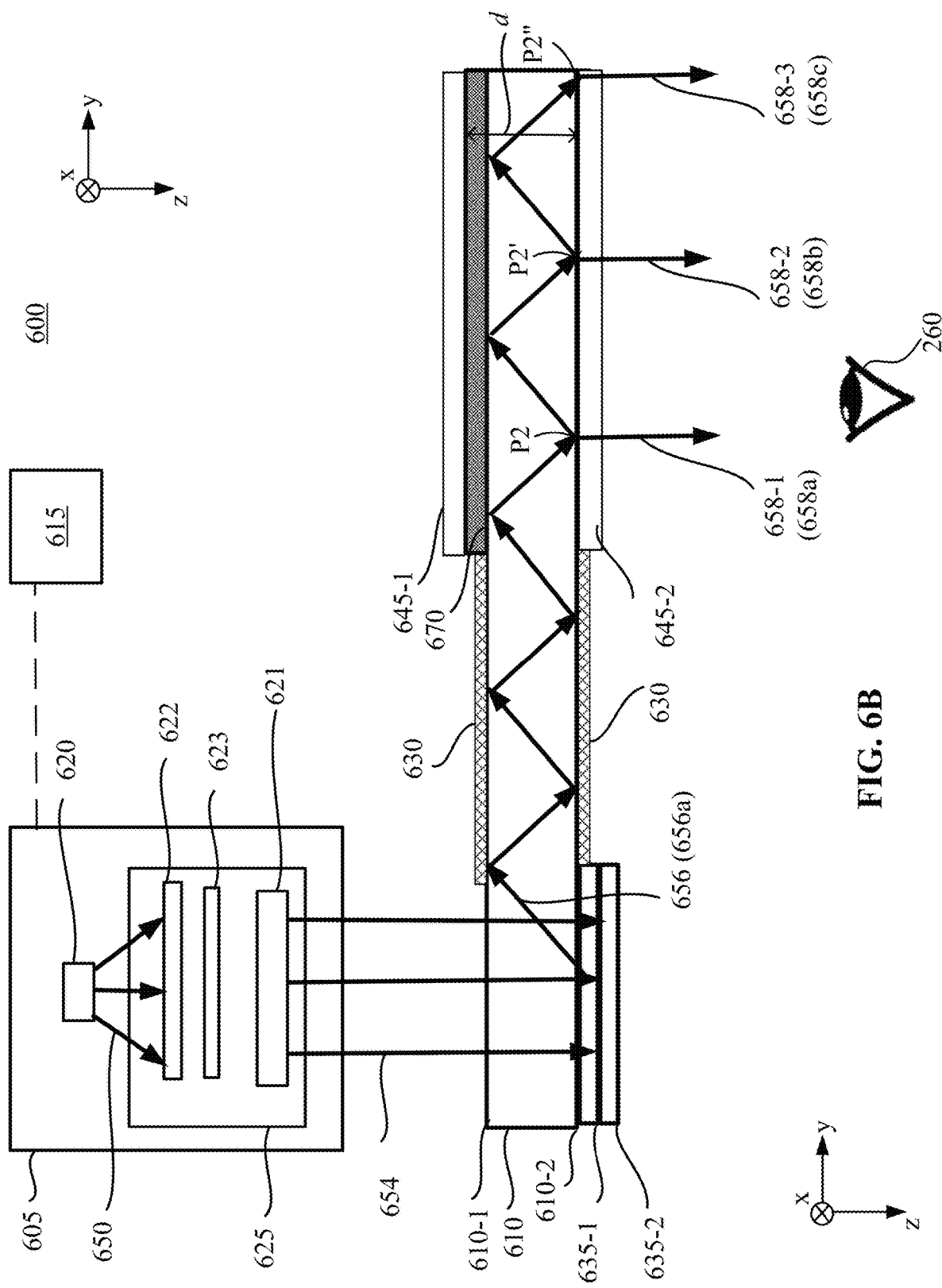

FIGS. 6A and 6B illustrate schematic diagrams of a light guide display assembly 600 configured to provide an increased pupil replication density during a first sub-frame and a second sub-frame of a display frame, respectively, according to an embodiment of the present disclosure. It is to be noted that, in some embodiments, the display frame may not be divided into sub-frames. In this embodiment, FIGS. 6A and 6B illustrate schematic diagrams of the light guide display assembly 600 during two consecutive time periods (or sub-frames), such as a first time period (or a first sub-frame) and a second time period (or a second sub-frame), respectively. The light guide display assembly 600 shown in FIGS. 6A and 6B may include elements, structures, and/or functions that are the same as or similar to those included in the light guide display assembly 300 shown in FIG. 3A, the light guide display assembly 380 shown in FIG. 3B, the light guide display assembly 400 shown in FIGS. 4A-4C, or the light guide display assembly 500 shown in FIG. 5. Descriptions of the same or similar elements, structures, or functions can refer to the above descriptions rendered in connection with FIGS. 3-5.

As shown in FIG. 6A, the light guide display assembly 600 may include a light source assembly 605, a light guide 610, and a controller 615, which may include elements, structures, and/or functions that are the same as or similar to those of the light source assembly 305, the light guide 310, and the controller 315 shown in FIGS. 3A and 3B, respectively. In some embodiments, the light source assembly 605, the light guide 610, and the controller 615 may include elements, structures, and/or functions that are the same as or similar to those of the light source assembly 405, the light guide 410, and the controller 415 shown in FIGS. 4A and 4B, respectively. In some embodiments, the light source assembly 605, the light guide 610, and the controller 615 may include elements, structures, and/or functions that are the same as or similar to those of the light source assembly 505, the light guide 510, and the controller 515 shown in FIG. 5, respectively.

The light source assembly 605 may include a light source 620, which may be similar to the light source 520 shown in FIG. 5, the light source 420 shown in FIGS. 4A and 4B, or the light source 320 shown in FIG. 3A. The light source assembly 605 may include a light conditioning system 625, which may include a polarization conversion element 622, a collimator 621, and a first polarization switch 623, which may be similar to the polarization conversion element 422, the collimator 421, and the first polarization switch 423 shown in FIGS. 4A and 4B, respectively. In some embodiments, the light source assembly 605 may include other elements not shown in FIG. 6A. The controller 615 may control various elements included in the light guide display assembly 600, such as the light source assembly 605. In some embodiments, the first polarization switch 623 may not be a part of the light conditioning system 625. Instead, the first polarization switch 623 may be disposed between the light conditioning system 625 and the light guide 610. For example, the first polarization switch 623 may be disposed at a surface of the light guide 610.

The light source 620 may be configured to emit an image light 650 representing a virtual-environment image during a display frame or sub-frame. The image light 650 may be configured with a predetermined FOV. The light conditioning system 625 may be configured to process the image light 650 emitted during the display frame, such that the light source assembly 605 may be configured to output a first image light 653 and a second image light 654 with orthogonal polarizations in a time-sequential manner. The output of the first image light 653 and the second image light 654 with orthogonal polarization in a time-sequential manner may be realized by the first polarization switch 623 coupled to the light source 620. For example, in some embodiments, the light source assembly 605 may be configured to output the first image light 653 and the second image light 654 with orthogonal polarizations during two consecutive sub-frames of the display frame, respectively. In some embodiments, the display frame may not be divided into sub-frames, and the light source assembly 605 may be configured to alternately output the first image light 653 and the second image light 654 with orthogonal polarizations during a same display frame. During the display frame, the first polarization switch 623 may be alternately switched between a switching state and a non-switching state, such that the light source assembly 605 may be configured to alternately output the first image light 653 and the second image light 654 with orthogonal polarizations during the display frame. In some embodiments, each of the first image light 653 and the second image light 654 may be associated with the full predetermined FOV of the image light 650. The light guide 610 may be configured to receive the first image light 653 as a first input light and the second image light 654 as a second input light during the two consecutive time periods (e.g., two consecutive sub-frames of the display frame), respectively.

In some embodiments, the light source 620 may be configured to emit the image light 650 that is unpolarized or polarized. In some embodiments, the image light 650 may be a diverging light. The light conditioning system 625 may be configured to receive the image light 650 from the light source 620, and process the image light 650 to output the first image light 653 and the second image light 654 configured with predetermined properties. The light conditioning system 625 may include suitable optical elements configured to process the image light 650. The optical paths of the image light 650 propagating in the light conditioning system 625 are not shown in FIG. 6A. The image light 650 may propagate in the light conditioning system 625 in any suitable optical paths.

In some embodiments, the polarization conversion element 622 in the light conditioning system 625 may be configured to convert the image light 650 into an image light with a predetermined polarization (e.g., a circular polarization) during the display frame, before the image light 650 is incident onto the first polarization switch 623. In some embodiments, the polarization conversion element 622 may be disposed between the light source 620 and the first polarization switch 623. In some embodiments, the light source 620 may be configured to emit the image light 650 with a predetermined polarization, and the polarization conversion element 622 may be omitted.

In some embodiments, the collimator 621 (e.g., a collimating lens) may be configured to collimate the image light 650 generated by the light source 620. For example, in the embodiment shown in FIG. 6A, the collimator 621 may be disposed between the first polarization switch 623 and the light guide 610, and configured to collimate the first image light output from the first polarization switch 623. Although not shown, in some embodiments, the collimator 621 may be disposed between the polarization conversion element 622 and the first polarization switch 623, and configured to collimate the image light output from the polarization conversion element 622. In some embodiments, the collimator 621 may be disposed between the light source 620 and the polarization conversion element 622, and configured to collimate the image light 650 output from the light source 620.

In some embodiments, the first polarization switch 623 may be similar to the first polarization switch 423 shown in FIGS. 4A and 4B. In some embodiments, the first polarization switch 623 may include an SHWP. In the embodiment shown in FIG. 6A, the first polarization switch 623 is a part of the light conditioning system 625. In some embodiments, the first polarization switch 623 may not be a part of the light conditioning system 625. Instead, the first polarization switch 623 may be a part of the light source assembly 605, and may be disposed between the light conditioning system 625 and the light guide 610. In some embodiments, the first polarization switch 623 may not be a part of the light source assembly 605, and may be coupled to the light guide 610. For example, the first polarization switch 623 may be disposed at a surface of one of the light guide 610 of the light guide 610.

The light guide 610 may be coupled with one or more in-coupling elements. In some embodiments, each in-coupling element may be polarization selective. In some embodiments, each in-coupling element may include one or more polarization selective gratings. For discussion purposes, each in-coupling element may be referred to as an in-coupling grating. It is understood that in other embodiments, the in-coupling element may include a non-grating structure. In the embodiment shown in FIG. 6A, the light guide 610 may be coupled with a first in-coupling grating 635-1 and a second in-coupling grating 635-2. For illustrative purposes, FIG. 6 shows that the in-coupling gratings 635-1 and 635-2 are stacked at the first surface 610-1 of the light guide 610. In some embodiments, the in-coupling gratings 635-1 and 635-2 may be stacked at the second surface 610-2 of the light guide 610. In some embodiments, the in-coupling gratings 635-1 and 635-2 may be disposed side by side on a surface of the light guide 610. In some embodiments, the light guide display assembly 600 may include a single in-coupling element. The number of in-coupling elements is not limited to one or two, and may be any suitable number, such as three, four, etc.

The light guide 610 may be coupled with one or more out-coupling elements. In some embodiments, each out-coupling element may be polarization selective. In some embodiments, each out-coupling element may include one or more gratings. For discussion purposes, each out-coupling element may be referred to as an out-coupling grating. It is understood that in other embodiments, the out-coupling element may include a non-grating structure. In the embodiment shown in FIG. 6A, the light guide 610 may be coupled with a first out-coupling grating 645-1 and a second out-coupling grating 645-2. The number of out-coupling elements is not limited to two, and may be any suitable number, such as three, four, etc. The first out-coupling grating 645-1 and the second out-coupling grating 645-2 may be disposed at different surfaces of the light guide 610. For example, the first out-coupling grating 645-1 and the second out-coupling grating 645-2 may be disposed at a first surface 610-1 and a second surface 610-2 of the light guide 610, respectively. The first out-coupling grating 645-1 and the second out-coupling grating 645-2 may be spaced apart from each other by a distance d, in the thickness direction of the light guide 610. In some embodiments, the distance d between the first out-coupling grating 645-1 and the second out-coupling grating 645-2 may be defined by the thickness of the light guide 610. In some embodiments, one or more additional elements/layers/films (e.g., an index-matching material layer) may be disposed between the first out-coupling grating 645-1 and the second out-coupling grating 645-2, and the distance d between the first out-coupling grating 645-1 and the second out-coupling grating 645-2 may be defined by the thicknesses of the light guide and the one or more additional elements/layers/films. In some embodiments, the distance d between the first out-coupling grating 645-1 and the second out-coupling grating 645-2 may be fixed. In some embodiments, the distance d between the first out-coupling grating 645-1 and the second out-coupling grating 645-2 may be adjustable by a suitable mechanism. The distance d may be changed by changing the thickness of the one or more additional elements/layers/films. In some embodiments, the first out-coupling grating 645-1 and the second out-coupling grating 645-2 may substantially overlap and align with one another in the thickness direction of the light guide 610. In some embodiments, the first out-coupling grating 645-1 and the second out-coupling grating 645-2 may have a substantially same light exiting area (e.g., a substantially same area from which the respective TIR propagating light is coupled out from the light guide 610 by the respective out-coupling grating).

Each of the in-coupling gratings 635-1 and 635-2 and out-coupling gratings 645-1 and 645-2 may be a transmissive or reflective grating. In the embodiment shown in FIG. 6A, the first in-coupling grating 635-1 and the second in-coupling grating 635-2 may be reflective PVH gratings configured to substantially (e.g., primarily) diffract circularly polarized lights having orthogonal polarizations. The first out-coupling grating 645-1 may be a reflective PVH grating, and the second out-coupling grating 645-2 may be transmissive PVH grating. The first out-coupling grating 645-1 and the second out-coupling grating 645-2 may be configured to substantially (e.g., primarily) diffract circularly polarized lights having orthogonal polarizations. Each of the out-coupling gratings 645-1 and 645-2 may have the same polarization selectivity as a corresponding one of the in-coupling gratings 635-1 and 635-2. For illustration and discussion purposes, in the embodiment shown in FIG. 6A, the in-coupling grating 635-1 and the out-coupling grating 645-1 may have the same polarization selectivity, and the in-coupling grating 635-2 and the out-coupling grating 645-2 may have the same polarization selectivity. For example, the in-coupling grating 635-1 and the out-coupling grating 645-1 may be configured to substantially (e.g., primarily) diffract an RHCP light, and substantially (e.g., primarily) transmit, with substantially zero or negligible diffraction, an LHCP light. The in-coupling grating 635-2 and the out-coupling grating 645-2 may be configured to substantially (e.g., primarily) diffract an LHCP light, and substantially (e.g., primarily) transmit, with substantially zero or negligible diffraction, an RHCP light.

As shown in FIG. 6A, during a first sub-frame of the display frame, the light source 620 may emit the image light 650 toward the polarization conversion element 622. For illustrative purposes, the image light 650 may be an unpolarized light or a linearly polarized light. The polarization conversion element 622 may be configured to convert the image light 650 into a circularly polarized light (e.g., an RHCP light). The polarization conversion element 622 may output the circularly polarized light toward the first polarization switch 623 (e.g., SHWP). The first polarization switch 623 (e.g., SHWP) may be controlled by the controller 615 to operate in the non-switching state to transmit the circularly polarized light (e.g., an RHCP light) without affecting the polarization. For example, the first polarization switch 623 (e.g., SHWP) may transmit the circularly polarized light (e.g., an RHCP light) received from the polarization conversion element 622 as a circularly polarized light (e.g., an RHCP light). In some embodiments, the circularly polarized light (e.g., an RHCP light) may be collimated by the collimator 621 as the first image light 653 (e.g., an RHCP light). That is, during the first sub-frame of the display frame, the light source assembly 605 may be configured to output the first image light 653 (e.g., an RHCP light) toward the light guide 610. The first image light 653 (e.g., an RHCP light) may also be referred to as the first input light 653 (e.g., an RHCP light) of the light guide 610.

The first in-coupling grating 635-1 may be configured to couple, via diffraction, the first input light 653 (e.g., an RHCP light) into the light guide 610 as a first TIR propagating light 655 (e.g., an RHCP light). For illustrative purposes, FIG. 6A shows one first TIR propagating ray 655a of the first TIR propagating light 655. In some embodiments, the initial polarization of the first TIR propagating light 655 (e.g., right-handed circular polarization) may be maintained when propagating inside the light guide 610 through TIR toward the first out-coupling grating 645-1 by, e.g., one or more polarization correction films 630. The first out-coupling grating 645-1 may be configured to couple, via diffraction, the first TIR propagating light 655 (e.g., an RHCP light) out of the light guide 610 at different first positions (e.g., P1, P1', and P1") of the first out-coupling grating 645-1 as a plurality of first output lights (e.g., RHCP lights), e.g., 657-1, 657-2, and 657-3, when the first TIR propagating light 655 (e.g., an RHCP light) is incident onto the different first positions of the first out-coupling grating 645-1. Thus, the first out-coupling grating 645-1 may replicate the image light 653 received from the light source assembly 605 to expand an effective pupil of the light guide display assembly 600. For illustrative purposes, FIG. 6A shows one first output ray 657a of the first output light 657-1 (e.g., an RHCP light), one first output ray 657b of the first output light 657-2 (e.g., an RHCP light), and one first output ray 657c of the first output light 657-3 (e.g., an RHCP light).

Referring to FIG. 6B, during a second sub-frame of the display frame, the light source 620 may output the image light 650 toward the polarization conversion element 622. For illustrative purposes, the image light 650 may be an unpolarized light or a linearly polarized light. The polarization conversion element 622 may be configured to convert the image light 650 into a circularly polarized light (e.g., an RHCP light), and may output the circularly polarized light toward the polarization switch 623 (e.g., SHWP). The polarization switch 623 (e.g., SHWP) may be configured to operate in the switching state to switch the handedness of the circularly polarized light (e.g., an RHCP light) to the opposite handedness. For example, the polarization switch 623 (e.g., SHWP) may transmit the circularly polarized light (e.g., an RHCP light) received from the polarization conversion element 622 as a circularly polarized light having an opposite handedness (e.g., an LHCP light). In some embodiments, the circularly polarized light (e.g., an LHCP light) may be collimated by the collimator 621 as the second image light 654 (e.g., an LHCP light). That is, during the second sub-frame of the display frame, the light source assembly 605 may be configured to output the second image light 654 (e.g., an LHCP light) toward the light guide 610. The second image light 654 (e.g., an LHCP light) may also be referred to as the second input light 654 (e.g., an LHCP light) of the light guide 610.

As the first in-coupling grating 635-1 is configured to substantially (e.g., primarily) backwardly diffract an RHCP light and substantially (e.g., primarily) transmit an LHCP light with negligible diffraction, the second input light 654 (e.g., an LHCP light) may be transmitted, without diffraction, through the light guide 610 and the first in-coupling grating 635-1 toward the second in-coupling grating 635-2 without changing the polarization. The second in-coupling grating 635-2 may be configured to couple, via diffraction, the second input light 654 (e.g., an LHCP light) into the light guide 610 as a second TIR propagating light 656 (e.g., an LHCP light). For illustrative purposes, FIG. 6B shows one second TIR propagating ray 656*a* of the second TIR propagating light 656. In some embodiments, the initial polarization of the second TIR propagating light 656 (e.g., left-handed circular polarization) may be maintained when propagating inside the light guide 610 through TIR toward the second out-coupling grating 645-2 by e.g., by one or more polarization correction films 630.

The second out-coupling grating 645-2 may be configured to consecutively couple, via diffraction, the second TIR propagating light 656 (e.g., an LHCP light) out of the light guide 610 at different second positions (e.g., P2, P2', and P2'') of the second out-coupling grating 645-2 as a plurality of second output lights (e.g., RHCP lights), e.g., 658-1, 658-2, and 658-3, when the second TIR propagating light 656 (e.g., an LHCP light) is incident onto the different positions of the second out-coupling grating 645-2. Thus, the second out-coupling grating 645-2 may replicate the image light 654 received from the light source assembly 605 to expand an effective pupil of the light guide display assembly 600. For illustrative purposes, FIG. 6B shows one second output ray 658*a* of the second output light 658-1 (e.g., an RHCP light), one second output ray 658*b* of the second output light 658-2 (e.g., an RHCP light), and one second output ray 658*c* of the second output light 658-3 (e.g., an RHCP light). Each of the output lights 657-1, 657-2, 657-3, 658-1, 658-2, and 658-3 may have the same FOV as the image light 650. In other words, each of the output lights 657-1, 657-2, 657-3, 658-1, 658-2, and 658-3 may represent the same image content as the image light 650.

Figure 6C:
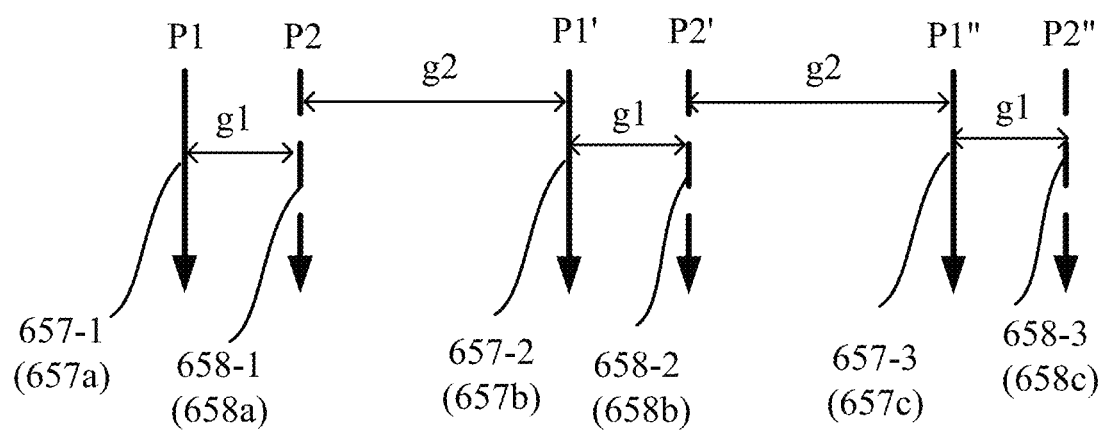
FIG. 6C schematically illustrates output lights of a light guide during the first sub-frame and the second sub-frame, as shown in FIG. 6A and FIG. 6B, according to an embodiment of the present disclosure.

FIG. 6C schematically illustrates the output lights of the light guide 610 during the two consecutive sub-frames, i.e., those shown in FIG. 6A and FIG. 6B. The output lights 657-1, 657-2, and 657-3 are output during the first sub-frame, and the output lights 658-1, 658-2, and 658-3 are output during the second sub-frame. Compared with a conventional light guide display assembly (e.g., 200) having a single, polarization nonselective out-coupling element, which may provide only three pupils (e.g., formed by output lights 657-1, 657-2, and 657-3, or formed by 658-1, 658-2, and 658-3), the light guide display assembly 600 may provide six pupils corresponding to output lights 657-1, 658-1, 657-2, 658-2, 657-3, and 658-3. Thus, the light guide display assembly 600 may provide an increased pupil replication density. In addition, the gap g1 or g2 between the neighboring pupils may be reduced as compared to the conventional light guide display assembly (e.g., 200). Further, the gap g1 or g2 may be adjusted by adjusting the distance d between the two out-coupling gratings 645-1 and 645-2, such that the gaps among neighboring pupils may be more uniform, resulting in a more uniform pupil distribution (e.g., g1 may be adjusted to be substantially equal to g2). For example, the distance d between the two out-coupling gratings 645-1 and 645-2 may be adjusted by adjusting the thickness of the one or more additional elements/layers/films (e.g., an index-matching material layer) 670 disposed between the first out-coupling grating 645-1 and the light guide 610, and/or between the second out-coupling grating 645-2 and the light guide 610.

Figure 7A:
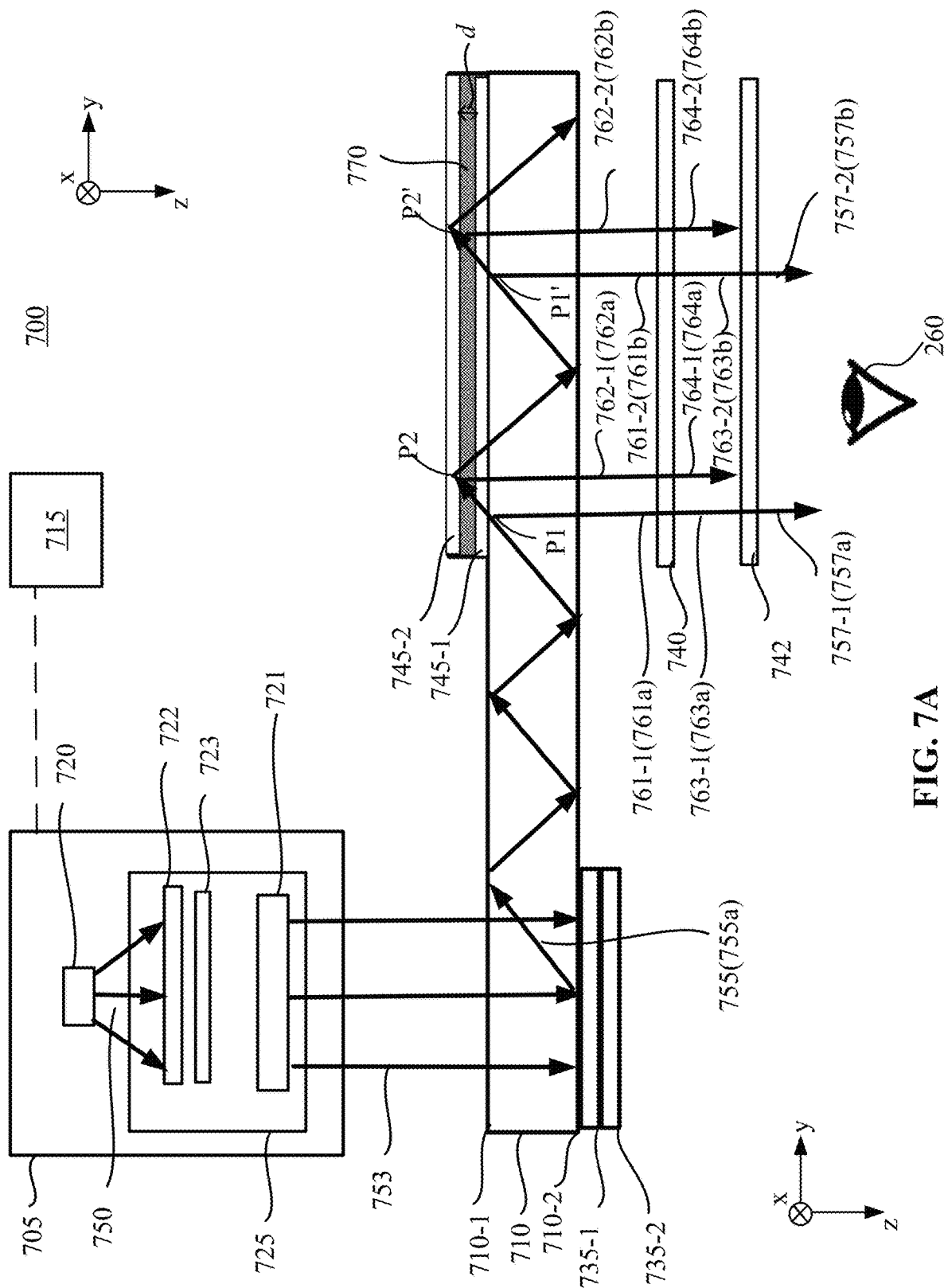
FIGS. 7A and 7B schematically illustrate diagrams of a light guide display assembly during a first sub-frame and a second sub-frame of a display frame, respectively, according to another embodiment of the present disclosure.
Figure 7B:
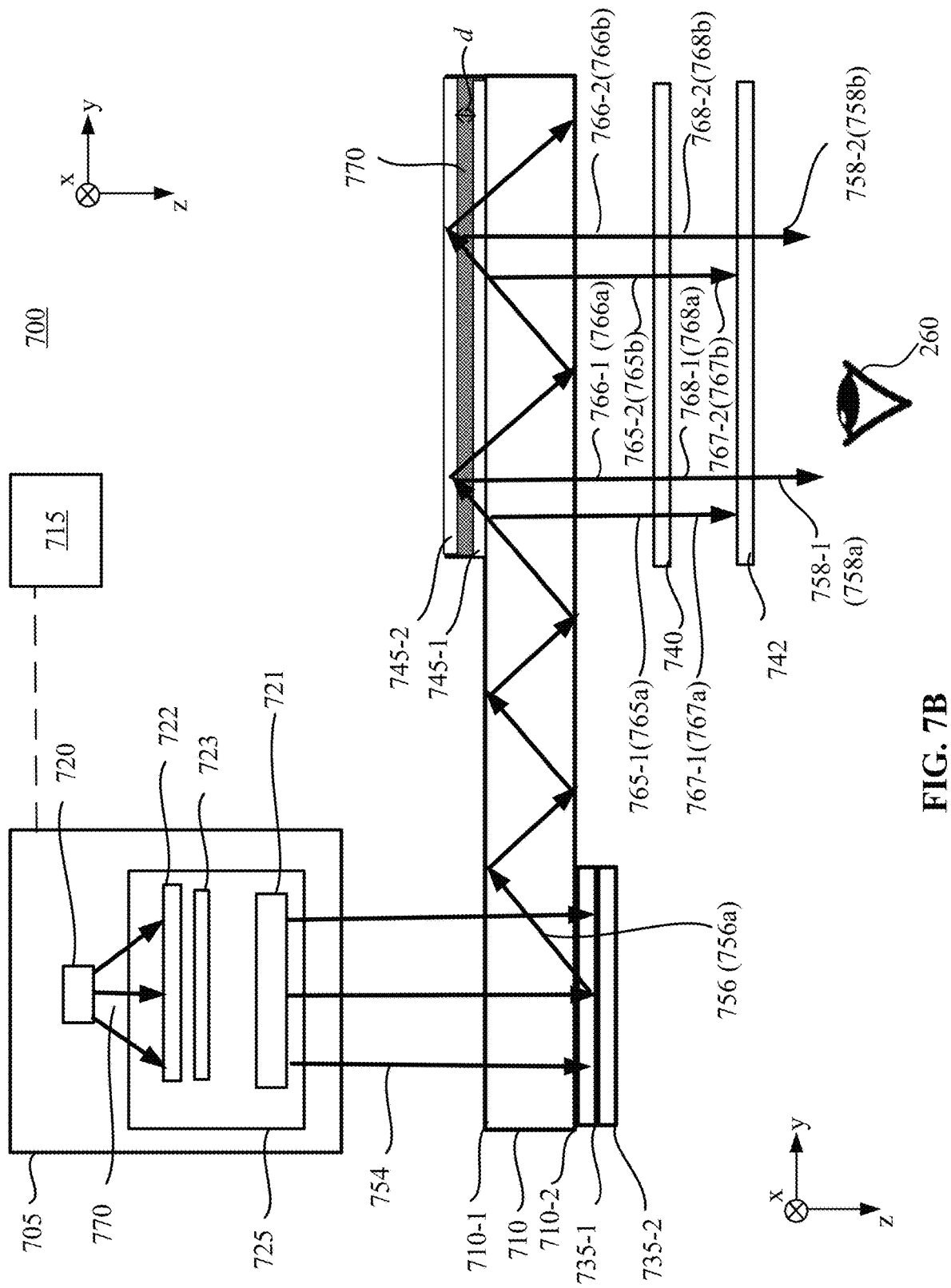

FIGS. 7A and 7B illustrate schematic diagrams of a light guide display assembly 700 configured to provide an increased pupil replication density during a first sub-frame and a second sub-frame of a display frame, respectively, according to an embodiment of the present disclosure. It is to be noted that, in some embodiments, the display frame may not be divided into sub-frames. In this embodiment, FIGS. 7A and 7B illustrate schematic diagrams of the light guide display assembly 700 during two consecutive time periods, such as a first time period (or first sub-frame) and a second time period (or second sub-frame), respectively. The light guide display assembly 700 shown in FIGS. 7A and 7B may include elements, structures, and/or functions that are the same as or similar to those included the light guide display assembly 300 shown in FIG. 3A, the light guide display assembly 380 shown in FIG. 3B, the light guide display assembly 400 shown in FIGS. 4A and 4B, the light guide display assembly 500 shown in FIG. 5, or the light guide display assembly 600 shown in FIGS. 6A and 6B. Descriptions of the same or similar elements, structures, or functions can refer to the above descriptions rendered in connection with FIG. 3A, FIG. 3B, FIGS. 4A and 4B, FIG. 5, or FIGS. 6A and 6B.

As shown in FIG. 7A, the light guide display assembly 700 may include a light source assembly 705, a light guide 710, and a controller 715, which may include elements, structures, and/or functions that are the same as or similar to those of the light source assembly 305, the light guide 310, and the controller 315 shown in FIGS. 3A and 3B, respectively. In some embodiments, the light source assembly 705, the light guide 710, and the controller 715 may include elements, structures, and/or functions that are the same as or similar to those of the light source assembly 405, the light guide 410, and the controller 415 shown in FIGS. 4A and 4B, respectively. In some embodiments, the light source assembly 705, the light guide 710, and the controller 715 may include elements, structures, and/or functions that are the same as or similar to those of the light source assembly 505, the light guide 510, and the controller 515 shown in FIG. 5, respectively. In some embodiments, the light source assembly 705, the light guide 710, and the controller 715 may include elements, structures, and/or functions that are the same as or similar to those of the light source assembly 605, the light guide 610, and the controller 615 shown in FIGS. 6A and 6B, respectively.

The light source assembly 705 may include a light source 720, which is similar to the light source 620 shown in FIGS. 6A and 6B, the light source 520 shown in FIG. 5, the light source 420 shown in FIGS. 4A and 4B, or the light source 320 shown in FIG. 3A. The light source assembly 705 may include a light conditioning system 725 that includes a polarization conversion element 722, a collimator 721, and a first polarization switch 723, which may be similar to the polarization conversion element 422, the collimator 421, and the first polarization switch 423 shown in FIGS. 4A and 4B, respectively, or may be similar to the polarization conversion element 622, the collimator 621, and the first polarization switch 623 shown in FIGS. 6A and 6B, respectively. In some embodiments, the light source assembly 705 may include other elements not shown in FIG. 7A. In some embodiments, the first polarization switch 723 may not be a part of the light conditioning system 725. Instead, the first polarization switch 723 may be disposed between the light conditioning system 725 and the light guide 710. For example, the first polarization switch 723 may be disposed at a surface of the light guide 710. The light guide display assembly 700 may also include a second polarization switch 740, which may be similar to the second polarization switch 440 shown in FIGS. 4A and 4B. The controller 715 may control various elements included in the light guide display assembly 700, such as the light source assembly 705, and/or the second polarization switch 740.

The light source 720 may be configured to emit an image light 750 representing a virtual-environment image during a display frame. The image light 750 may be configured with a predetermined FOV. The light conditioning system 725 may be configured to process the image light 750 emitted during the display frame, such that the light source assembly 705 may be configured to output a first image light 753 and a second image light 754 with orthogonal polarizations in a time-sequential manner. Outputting the first image light 753 and the second image light 754 with orthogonal polarizations in a time-sequential manner may be realized by the first polarization switch 723 coupled to the light source 720. For example, in some embodiments, the light source assembly 705 may be configured to output the first image light 753 and the second image light 754 with orthogonal polarizations during two consecutive sub-frames of the display frame, respectively. In some embodiments, the display frame may not be divided into sub-frames, and the light source assembly 705 may be configured to alternately output the first image light 753 and the second image light 754 with orthogonal polarizations during the display frame. During the display frame, the first polarization switch 723 may be consecutively switched between a switching state and a non-switching state, such that the light source assembly 705 may be configured to alternately output the first image light 753 and the second image light 754 with orthogonal polarizations during the display frame. In some embodiments, each of the first image light 753 and the second image light 754 may be associated with the full predetermined FOV of the image light 750. The light guide 710 may be configured to receive the first image light 753 as a first input light and the second image light 754 as a second input light during the two consecutive time periods (e.g., two consecutive sub-frames of the display frame), respectively.

In some embodiments, the light source 720 may be configured to emit the image light 750 that is unpolarized or polarized. In some embodiments, the image light 750 may be a diverging light. The light conditioning system 725 may be configured to receive the image light 750 from the light source 720, and process the image light 750 to output the first image light 753 and the second image light 754 configured with predetermined properties. The light conditioning system 725 may include suitable optical elements configured to process the image light 750. The optical paths of the image light 750 propagating in the light conditioning system 725 are not shown in FIG. 7A. The image light 750 may propagate in the light conditioning system 725 in any suitable optical paths.

In some embodiments, the polarization conversion element 722 in the light conditioning system 725 may be configured to convert the image light 750 into an image light with a predetermined polarization (e.g., a circular polarization) during the display frame, before the image light 750 is incident onto the first polarization switch 723. In some embodiments, the polarization conversion element 722 may be disposed between the light source 720 and the first polarization switch 723. In some embodiments, the light source 720 may be configured to emit the image light 750 with a predetermined polarization, and the polarization conversion element 722 may be omitted.

In some embodiments, the collimator 721 (e.g., a collimating lens) may be configured to collimate the image light 750 generated by the light source 720. For example, in the embodiment shown in FIG. 7A, the collimator 721 may be disposed between the first polarization switch 723 and the light guide 710, and configured to collimate the first image light output from the first polarization switch 723. Although not shown, in some embodiments, the collimator 721 may be disposed between the polarization conversion element 722 and the first polarization switch 723, and configured to collimate the image light output from the polarization conversion element 722. In some embodiments, the collimator 721 may be disposed between the light source 720 and the polarization conversion element 722, and configured to collimate the image light 750 output from the light source 720.

In some embodiments, the first polarization switch 723 may be similar to the first polarization switch 423 shown in FIGS. 4A and 4B. In some embodiments, the first polarization switch 723 may include an SHWP. In the embodiment shown in FIG. 7A, the first polarization switch 723 is a part of the light conditioning system 725. In some embodiments, the first polarization switch 723 may not be a part of the light conditioning system 725. Instead, the first polarization switch 723 may be a part of the light source assembly 705, and may be disposed between the light conditioning system 725 and the light guide 710. In some embodiments, the first polarization switch 723 may not be a part of the light source assembly 705, and may be coupled to the light guide 710. For example, the first polarization switch 723 may be disposed at a surface of one of the light guide 710 of the light guide 710.

The light guide 710 may be coupled with one or more in-coupling elements. In some embodiments, each in-coupling element may be polarization selective. In some embodiments, each in-coupling element may include one or more polarization selective gratings. For discussion purposes, each in-coupling element may be referred to as an in-coupling grating. It is understood that in other embodiments, the in-coupling element may include a non-grating structure. In the embodiment shown in FIG. 7A, the light guide 710 may be coupled with a first in-coupling grating 735-1 and a second in-coupling grating 735-2. For illustrative purposes, FIG. 7 shows that the in-coupling gratings 735-1 and 735-2 are stacked at the first surface 710-1 of the light guide 710. In some embodiments, the light guide display assembly 700 may include a single in-coupling element. The number of in-coupling elements is not limited to one or two, and may be any suitable number, such as three, four, etc.

The light guide 710 may be coupled with one or more out-coupling elements. In some embodiments, each out-coupling element may be polarization selective. In some embodiments, each out-coupling element may include one or more gratings. For discussion purposes, each out-coupling element may be referred to as an out-coupling grating. It is understood that in other embodiments, the out-coupling element may include a non-grating structure. In the embodiment shown in FIG. 7A, the light guide 710 may be coupled with a first out-coupling grating 745-1 and a second out-coupling grating 745-2. The number of out-coupling elements is not limited to two, and may be any suitable number, such as three, four, etc. The first out-coupling grating 745-1 and the second out-coupling grating 745-2 may be stacked at a same surface of the light guide 710.

The first out-coupling grating 745-1 and the second out-coupling grating 745-2 may be spaced apart from each other by a distance d, in the thickness direction of the stack of the first out-coupling grating 745-1 and the second out-coupling grating 745-2 (or in the thickness direction of the light guide 710). In some embodiments, the first out-coupling grating 745-1 and the second out-coupling grating 745-2 may substantially overlap and may align with each other in the thickness direction of the light guide 710. In some embodiments, the first out-coupling grating 745-1 and the second out-coupling grating 745-2 may have a substantially same light exiting area (e.g., a substantially same area from which the respective TIR propagating light is coupled out from the light guide 710 by the respective out-coupling grating).

In some embodiments, a space between the first out-coupling grating 745-1 and the second out-coupling grating 745-2 may be at least partially filled with an index-matching material 770 configured to suppress the light reflections within the space. The index-matching material 770 may have a refractive index matching with the refractive indices of the materials of the first out-coupling grating 745-1 and the second out-coupling grating 745-2. In some embodiments, a space around the first out-coupling grating 745-1 and the second out-coupling grating 745-2 may also be at least partially filled with the index-matching material 770 for suppressing the light reflections within the space. In some embodiments, the distance d between the first out-coupling grating 745-1 and the second out-coupling grating 745-2 may be defined by the thickness of the index-matching material 770 filling the space between the first out-coupling grating 745-1 and the second out-coupling grating 745-2. In some embodiments, the distance d between the first out-coupling grating 745-1 and the second out-coupling grating 745-2 may be fixed. In some embodiments, the distance d between the first out-coupling grating 745-1 and the second out-coupling grating 745-2 may be adjustable by a suitable mechanism.

For illustrative purposes, FIG. 7A shows that the in-coupling gratings 735-1 and 735-2 are stacked at the second surface 710-2 of the light guide 710, and the out-coupling gratings 745-1 and 745-2 are stacked at the first surface 710-1 of the light guide 710. Although not shown, in some embodiments, the in-coupling gratings 735-1 and 735-2 may be stacked or disposed side by side at the first surface 710-1, and the out-coupling gratings 745-1 and 745-2 may be stacked at the second surface 710-2. In some embodiments, the in-coupling gratings 735-1 and 735-2 and the stack of the out-coupling gratings 745-1 and 745-2 may be disposed at the same surface (e.g., the first surface 710-1 or the second surface 710-2) of the light guide 710.

In some embodiments, each of the in-coupling gratings 735-1, 735-2 and each of the out-coupling gratings 745-1 and 745-2 may be a transmissive type grating (e.g., a transmissive PVH grating) or a reflective type grating (e.g., a reflective PVH grating). In the embodiment shown in FIGS. 7A and 7B, the in-coupling gratings 735-1 and 735-2 may be reflective PVH gratings configured to backwardly diffract circularly polarized lights with orthogonal polarizations, and the out-coupling gratings 745-1 and 745-2 may be reflective PVH gratings configured to backwardly diffract circularly polarized lights with orthogonal polarizations. Each of the out-coupling gratings 745-1 and 745-2 may have the same polarization selectivity as a corresponding one of the in-coupling gratings 735-1 and 735-2. For illustration and discussion purposes, the out-coupling gratings 745-1 and 745-2 may have the same polarization selectivity as the in-coupling gratings 735-1 and 735-2, respectively.

The first input light 753 having the first polarization and the second input light 754 having the second polarization may propagate inside the light guide 710 from the in-coupling gratings 735-1 and 735-2 toward the out-coupling gratings 745-1 and 745-2 as a first TIR propagating light and a second TIR propagating light during the two consecutive sub-frames, respectively. In some embodiments, the first TIR propagating light may have the first polarization as an initial polarization, and the second TIR propagating light may have the second polarization as an initial polarization. In some embodiments, the polarizations of the first and second TIR propagating lights may not be maintained (i.e., may change from the respective initial polarizations) when propagating inside the light guide 710 through TIR. When the first TIR propagating light arrives at the stack of the first out-coupling element 745-1 and the second out-coupling element 745-2, the first TIR propagating light may include a first polarized component and a second polarized component. The first polarized component may have the first polarization and the second polarized component may have the second polarization. Hence, the first polarized component and the second polarized component may be referred to as orthogonally polarized components. When the second TIR propagating light arrives at the stack of the first out-coupling element 745-1 and the second out-coupling element 745-2, the second TIR propagating light may include a first polarized component and a second polarized component, similar to the first TIR propagating light. Thus, during each of the two consecutive sub-frames, the two out-coupling gratings 745-1 and 745-2 may couple, via diffraction, two orthogonally polarized components of a corresponding TIR propagating light out of the light guide 710 as a plurality of primary output lights and a plurality of secondary output lights. The primary output lights and the secondary output lights may be orthogonally polarized output lights. In each sub-frame, the primary output light and the secondary output light may form two images, one of which may be a primary image and the other may be a ghost image. The ghost image may be suppressed or eliminated via the second polarization switch 740 and an absorptive polarizer 742 disposed between the out-coupling gratings 745-1 and 745-2 (or light guide 710) and the eye 260.

The second polarization switch 740 may be disposed between the absorptive polarizer 742 and the light guide 710, and the absorptive polarizer 742 may be disposed between the second polarization switch 740 and the eye 260. The second polarization switch 740 may be similar to the first polarization switch 723, and may be synchronized with the first polarization switch 723. For example, both of the second polarization switch 740 and the first polarization switch 723 may be controlled by the controller 715 to operate in the switching state during one of the first and second sub-frames, and to operate in the non-switching state during the other of the first and second sub-frames. In some embodiments, the second polarization switch 740 may not be synchronized with the first polarization switch 723. For example, the second polarization switch 740 and the first polarization switch 723 may be configured to operate in the switching state during different sub-frames, and to operate in the non-switching state during different sub-frames. In other words, in a sub-frame, one of the first polarization switch 723 and the second polarization switch 740 may operate in the switching state, and the other one of the first polarization switch 723 and the second polarization switch 740 may operate in the non-switching state. The absorptive polarizer 742 may be configured to block a light forming the ghost image via absorption, and transmit a light forming the primary image. In some embodiments, the absorptive polarizer 742 may be a circular polarizer. In some embodiments, the absorptive polarizer 742 may be a linear polarizer, and a QWP may be disposed between the absorptive polarizer 742 and the second polarization switch 740. The QWP may be configured to convert a circularly polarized light into a linearly polarized light or vice versa.

As shown in FIG. 7A, during a first sub-frame of the display frame, the light source 720 may emit the image light 750 toward the polarization conversion element 722. For illustrative purposes, the image light 750 may be an unpolarized light or a linearly polarized light. The polarization conversion element 722 may be configured to convert the image light 750 into a circularly polarized light (e.g., an RHCP light). The polarization conversion element 722 may output the circularly polarized light toward the first polarization switch 723 (e.g., SHWP). The first polarization switch 723 (e.g., SHWP) may be controlled by the controller 715 to operate in the non-switching state to transmit the circularly polarized light (e.g., an RHCP light) without affecting the polarization. For example, the first polarization switch 723 (e.g., SHWP) may transmit the circularly polarized light (e.g., an RHCP light) received from the polarization conversion element 722 as a circularly polarized light (e.g., an RHCP light). In some embodiments, the circularly polarized light (e.g., an RHCP light) may be collimated by the collimator 721 as the first image light 753 (e.g., an RHCP light). That is, during the first sub-frame of the display frame, the light source assembly 705 may be configured to output the first image light 753 (e.g., an RHCP light) toward the light guide 710. The first image light 753 (e.g., an RHCP light) may also be referred to as the first input light 753 (e.g., an RHCP light) of the light guide 710.

The first in-coupling grating 735-1 may be configured to couple, via diffraction, the first input light 753 (e.g., an RHCP light) into the light guide 710 as a first TIR propagating light 755 (e.g., an RHCP light). For illustrative purposes, FIG. 7A shows one first TIR propagating ray 755a of the first TIR propagating light 755. The initial polarization of the first TIR propagating light 755 (e.g., right-handed circular polarization) may not be maintained (i.e., may change) when the first TIR propagating light 755 propagates inside the light guide 710 through TIR toward the out-coupling gratings 745-1 and 745-2. When arriving at the out-coupling gratings 745-1 and 745-2, the first TIR propagating light 755 may include a primary portion (or a first polarized component) having the initial polarization and a secondary portion (or a second polarized component) having a polarization orthogonal to the initial polarization (i.e., changed from the initial polarization). For example, when arriving at the out-coupling gratings 745-1 and 745-2, the first TIR propagating light 755 may include a primary portion (or a first polarized component) that is an RHCP component of the first TIR propagating light 755, and a secondary portion (or a second polarized component) that is an LHCP component of the first TIR propagating light 755.

The first out-coupling grating 745-1 may be configured to couple, via diffraction, the first polarized component (e.g., the RHCP component) of the first TIR propagating light 755 out of the light guide 710 at different positions of the first out-coupling grating 745-1 as a plurality of primary output lights (e.g., RHCP lights), e.g., 761-1 and 761-2, when the first TIR propagating light 755 is incident onto the different first positions (e.g., P1 and P1') of the first out-coupling grating 745-1. The first out-coupling grating 745-1 may be configured to transmit, without diffraction, the second polarized component (e.g., the LHCP component) of the first TIR propagating light 755 toward the second out-coupling grating 745-2. For illustrative purposes, FIG. 7A shows one primary output ray 761a of the primary output light 761-1 (e.g., an RHCP light) and one primary output ray 761b of the primary output light 761-2 (e.g., an RHCP light).

The second out-coupling grating 745-2 may be configured to couple, via diffraction, the second polarized component (e.g., the LHCP component) of the first TIR propagating light 755 out of the light guide 710 at different second positions (e.g., P2 and P2') of the second out-coupling grating 745-2 as a plurality of secondary output lights (e.g., LHCP lights), e.g., 762-1 and 762-2, when the second polarized component (e.g., the LHCP component) of the first TIR propagating light 755 is incident onto the different second positions of the second out-coupling grating 745-2. For illustrative purposes, FIG. 7A shows one secondary output ray 762a of the secondary output light 762-1 (e.g., an LHCP light) and one secondary output ray 762b of the secondary output light 762-2 (e.g., an LHCP light).

A pair of the primary output light 761-1 (or 761-2) and the secondary output light 762-1 (or 762-2) with orthogonal polarizations may form two images, one being a primary image formed by the primary output light 761-1 (or 761-2) diffracted by the first out-coupling grating 745-1 and the other being a ghost image that is a mirror image formed by the secondary output light 762-1 (or 762-2) diffracted by the second out-coupling grating 745-2. In some embodiments, the controller 715 may control the second polarization switch 740 and the first polarization switch 723 to synchronize the operation states. For example, the second polarization switch 740 (e.g., SHWP) may be synchronized with the first polarization switch 723 (e.g., SHWP) to operate in the non-switching state, thereby transmitting the primary output lights 761-1 and 761-2 (e.g., RHCP lights) and the secondary output lights 762-1 and 762-2 (e.g., LHCP lights) without affecting the respective polarizations. In some embodiments, the second polarization switch 740 (e.g., SHWP) may be configured to transmit the primary output lights 761-1 and 761-2 (e.g., RHCP lights) as lights 763-1 and 763-2 (e.g., RHCP lights), respectively, and transmit the secondary output lights 762-1 and 762-2 (e.g., LHCP lights) as lights 764-1 and 764-2 (e.g., LHCP lights). For illustrative purposes, FIG. 7A shows one ray 763a of the light 763-1 (e.g., an RHCP light), one ray 763b of the light 763-2 (e.g., an RHCP light), one ray 764a of the light 764-1 (e.g., an LHCP light), and one ray 764b of the light 764-2 (e.g., an LHCP light).

The polarizer 742 may be configured to transmit a light forming the primary image, and block a light forming the ghost image via absorption. In some embodiments, as shown in FIG. 7A, the polarizer 742 may be an absorptive type circular polarizer configured to transmit an RHCP light and block an LHCP light via absorption. Thus, the lights 763-1 and 763-2 (e.g., RHCP lights) may be transmitted through the polarizer 742 as first output lights 757-1 and 757-2 (e.g., RHCP lights) propagating toward the eye 260, and the lights 764-1 and 764-2 (e.g., LHCP lights) may be blocked by the polarizer 742 via absorption. For illustrative purposes, FIG. 7A shows one first output ray 757a of the first output light 757-1 and one first output ray 757b of the first output light 757-2. Thus, the lights 764-1 and 764-2 may not reach the eye 260. Accordingly, the eye 260 may observe the primary image formed by the primary output light 761-1 and/or 767-2 diffracted by the first out-coupling grating 745-1, and may not observe the ghost image formed by the secondary output lights 762-1 and 762-2 diffracted by the second out-coupling grating 745-2.

Referring to FIG. 7B, during a second sub-frame of the display frame, the light source 720 may output the image light 750 toward the polarization conversion element 722. For illustrative purposes, the image light 750 may be an unpolarized light or a linearly polarized light. The polarization conversion element 722 may be configured to convert the image light 750 into a circularly polarized light (e.g., an RHCP light), and may output the circularly polarized light toward the polarization switch 723 (e.g., SHWP). The polarization switch 723 (e.g., SHWP) may be configured to operate in the switching state to switch the handedness of the circularly polarized light (e.g., an RHCP light) to the opposite handedness. For example, the polarization switch 723 (e.g., SHWP) may transmit the circularly polarized light (e.g., an RHCP light) received from the polarization conversion element 722 as a circularly polarized light having an opposite handedness (e.g., an LHCP light). In some embodiments, the circularly polarized light (e.g., an LHCP light) may be collimated by the collimator 721 as the second image light 754 (e.g., an LHCP light). That is, during the second sub-frame of the display frame, the light source assembly 705 may be configured to output the second image light 754 (e.g., an LHCP light) toward the light guide 710. The second image light 754 (e.g., an LHCP light) may also be referred to as the second input light 754 (e.g., an LHCP light) of the light guide 710.

As the first in-coupling grating 735-1 is configured to backwardly diffract an RHCP light and transmit an LHCP light with substantially zero or negligible diffraction, the second input light 754 (e.g., an LHCP light) may be transmitted through the first in-coupling grating 735-1 toward the second in-coupling grating 735-2. The second in-coupling grating 735-2 may be configured to couple, via diffraction, the second input light 754 (e.g., an LHCP light) into the light guide 710 as a second TIR propagating light 756 (e.g., an LHCP light). For illustrative purposes, FIG. 7B shows one second TIR propagating ray 756a of the second TIR propagating light 756. The initial polarization of the second TIR propagating light 756 (e.g., left-handed circular polarization) may not be maintained (i.e., may change) when the second TIR propagating light 756 propagates inside the light guide 710 through TIR toward the out-coupling gratings 745-1 and 745-2. When arriving at the out-coupling gratings 745-1 and 745-2, the second TIR propagating light 756 may include a primary portion (or a first polarized component) having the initial polarization and a secondary portion (or a second polarized component) having a polarization orthogonal to the initial polarization. For example, when arriving at the out-coupling gratings 745-1 and 745-2, the second TIR propagating light 756 may include a primary portion (or a first polarized component) that is an LHCP component of the second TIR propagating light 756, and a secondary portion (or a second polarized component) that is an RHCP component of the second TIR propagating light 756.

The first out-coupling grating 745-1 may be configured to couple, via diffraction, the first polarized component (e.g., the RHCP component) of the second TIR propagating light 756 out of the light guide 710 at different positions of the first out-coupling grating 745-1 as a plurality of secondary output lights (e.g., RHCP lights), e.g., 765-1 and 765-2, when the first TIR propagating light 755 is incident onto the different positions of the first out-coupling grating 745-1. The first out-coupling grating 745-1 may be configured to transmit, with substantially zero or negligible diffraction, the second polarized component (e.g., the LHCP component) of the second TIR propagating light 756 toward the second out-coupling grating 745-2. For illustrative purposes, FIG. 7B shows one secondary output ray 765a of the secondary output light 765-1 (e.g., an RHCP light) and one secondary output ray 765b of the secondary output light 765-2 (e.g., an RHCP light).

The second out-coupling grating 745-2 may be configured to couple, via diffraction, the second polarized component (e.g., the LHCP component) of the second TIR propagating light 756 out of the light guide 710 at different positions of the second out-coupling grating 745-2 as a plurality of primary output lights (e.g., LHCP lights), e.g., 766-1 and 766-2, when the second polarized component (e.g., the LHCP component) of the second TIR propagating light 756 is incident onto the different positions of the second out-coupling grating 745-2. For illustrative purposes, FIG. 7B shows one primary output ray 766a of the primary output light 766-1 (e.g., an LHCP light) and one primary output ray 766b of the primary output light 766-2 (e.g., an LHCP light).

A pair of the primary output light 766-1 (or 766-2) and the secondary output light 765-1 (or 765-2) with orthogonal polarizations may form two images, one being a primary image formed by the primary output light 766-1 (or 766-2) diffracted by the second out-coupling grating 745-2 and the other being a ghost image that is a mirror image formed by the secondary output light 765-1 (or 765-2) diffracted by the first out-coupling grating 745-1. In some embodiments, the controller 715 may control the second polarization switch 740 and the first polarization switch 723 to synchronize the operation states. For example, the second polarization switch 740 (e.g., SHWP) may be synchronized with the first polarization switch 723 (e.g., SHWP) to operate in the switching state. In the switching state, the second polarization switch 740 (e.g., SHWP) may be configured to switch or change a polarization of a light to an orthogonal polarization. For example, the second polarization switch 740 may switch the handedness of the secondary output lights 765-1 and 765-2 (e.g., RHCP lights) and output lights 767-1 and 767-2 with an orthogonal polarization (e.g., LHCP lights), respectively. In some embodiments, the second polarization switch 740 (e.g., SHWP) may be configured to switch the handedness of the primary output light 766-1 and 766-2 (e.g., LHCP lights) and output lights 768-1 and 768-2 with an orthogonal polarization (e.g., RHCP lights). For illustrative purposes, FIG. 7B shows one ray 768a of the light 768-1 (e.g., an RHCP light), one ray 768b of the light 768-2 (e.g., an RHCP light), one ray 767a of the light 767-1 (e.g., an LHCP light), and one ray 767b of the light 767-2 (e.g., an LHCP light).

As the polarizer 742 may be an absorptive type circular polarizer configured to transmit an RHCP light and block an LHCP light via absorption, the lights 768-1 and 768-2 (e.g., RHCP lights) may be transmitted through the polarizer 742 as second output lights 758-1 and 758-2 (e.g., RHCP lights) propagating toward the eye 260, and the lights 767-1 and 767-2 (e.g., LHCP lights) may be blocked by the polarizer 742 via absorption. For illustrative purposes, FIG. 7B shows one second output ray 758a of the second output light 758-1 and one second output ray 758b of the second output light 758-2. Thus, the lights 767-1 and 767-2 may not reach the eye 260. Accordingly, the eye 260 may observe the primary image formed by the primary output light 766-1 and/or 766-2 diffracted by the second out-coupling grating 745-2, and may not observe the ghost image formed by the secondary output lights 765-1 and 765-2 diffracted by the first out-coupling grating 745-1.

Figure 7C:
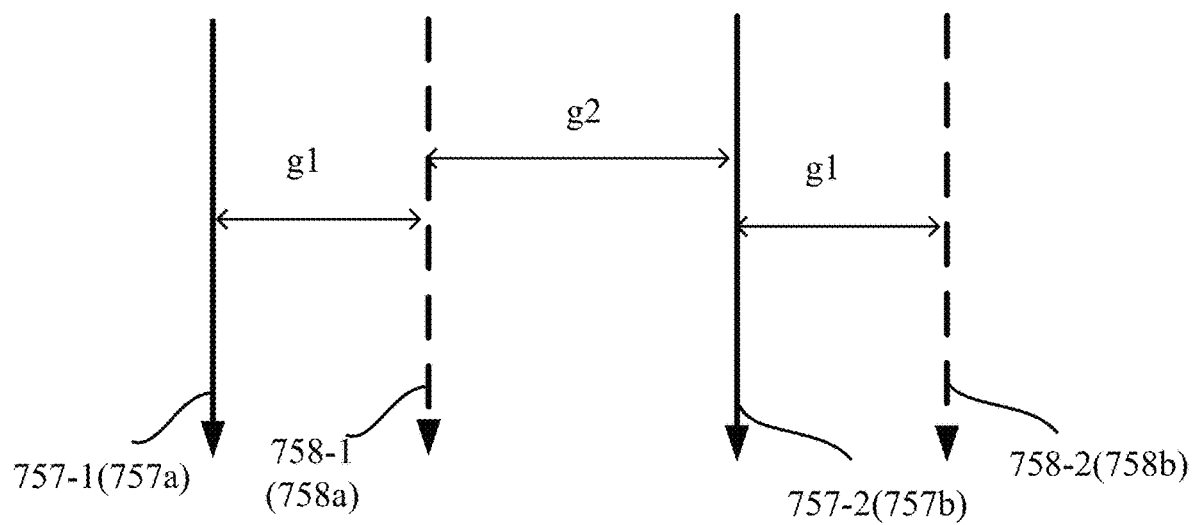
FIG. 7C schematically illustrates output lights of a light guide during the first sub-frame and the second sub-frame, shown in FIG. 7A and FIG. 7B, according to an embodiment of the present disclosure.

FIG. 7C schematically illustrates the output lights 757-1, 758-1, 757-2, and 758-2 that are output during consecutive sub-frames, i.e., the first sub-frame and the second sub-frame shown in FIG. 7A and FIG. 7B. The output lights 757-1 and 757-2 are output during the first sub-frame, and the output lights 758-1 and 758-2 are output during the second sub-frame. Each of the output lights 757-1, 758-1, 757-2, and 758-2 may have the same FOV as the image light 750. In other words, each of the output lights 757-1, 758-1, 757-2, and 758-2 may represent the same image content as the image light 750. As shown in FIG. 7C, a gap g1 may exist between two neighboring output image lights that are output at consecutive sub-frames. For example, the gap g1 may exist between the first output light 757-1 (representing or forming a first pupil) and the second output light 758-1 (representing or forming a second pupil), and between the first output light 757-2 and the second output light 758-2. A gap g2 may exist between two neighboring output image lights that are output at different positions of the light guide 710. For discussion purposes, the output lights 757-1 and 758-1 are regarded as being output from a first output region (similar to output region 391 shown in FIG. 3A) of the light guide 710, and the output lights 757-2 and 758-2 are regarded as being output from a second output region (similar to output region 392 shown in FIG. 3B) of the light guide 710. The gaps g1 and g2 may be adjusted to sufficiently separate the output lights 757-1 and 758-1, such that the pupils formed by the output lights 757-1 and 758-1 are substantially non-overlapping. Likewise, the output lights 757-2 and 758-2 may be sufficiently separated such that the pupils formed by the output lights 757-2 and 758-2 are substantially non-overlapping. In addition, in a conventional light guide display assembly having a single, polarization nonselective out-coupling element, the output lights 757-1 and 758-1 may coincide with one another (e.g., there may be output light 757-1 only) and the output lights 757-2 and 758-2 may coincide with one another (e.g., there may be output light 757-2 only). Thus, in a conventional light guide display assembly, there may be only two pupils formed by output lights 757-1 and 757-2. With the disclosed light guide display assembly 700, the number of pupils within the eyebox may be doubled, and the pupil replication density may be increased. The gap g1 may be determined by the distance d between the first out-coupling grating 745-1 and the second out-coupling grating 745-2. When the distance d is increased, the gap g1 may be increased, and the gap g2 may be decreased. When the distance d is decreased, the gap g1 may be decreased, and the gap g2 may be increased. By suitably adjusting the distance d, the gap g1 and the gap g2 may be adjusted such that a uniform distribution of the pupils may be achieved (e.g., g1 may be adjusted to be substantially equal to g2).

All of the embodiments shown in the figures illustrate light guide display assemblies configured to provide 1D pupil replication, as examples for describing the principles of the pupil replication. To achieve 2D pupil replications, the light guide display assemblies may include additional gratings. The additional gratings may perform functions similar to the illustrated gratings, except that the pupil replication/expansion direction of the additional gratings may be in a direction different from the pupil replication/expansion direction of the shown out-coupling gratings, e.g., in the x-axis direction (perpendicular to the illustrated expansion direction, the y-axis direction).

For example, in the light guide display assembly shown in FIGS. 3A and 3B, to provide 2D pupil replication, two additional out-coupling gratings may be stacked at the second surface 310-2 of the light guide 310 (opposing the stack of the two out-coupling gratings 345-1 and 345-2). In the light guide display assembly shown in FIGS. 4A and 4B, to provide 2D pupil replication, two additional out-coupling gratings may be, for example, stacked at the second surface 410-2 of the light guide 410 (opposing the stack of the two out-coupling gratings 445-1 and 445-2). In the light guide display assembly shown in FIG. 5, to provide 2D pupil replication, an additional out-coupling grating may be, for example, stacked with the out-coupling grating 545-1 at the first surface 510-1 of the light guide 510, and an additional out-coupling grating may be, for example stacked with the out-coupling grating 545-2 at the second surface 510-2 of the light guide 520. In the light guide display assembly shown in FIGS. 6A and 6B, to provide 2D pupil replication, an additional out-coupling grating may be, for example, stacked with the out-coupling grating 645-1 at the first surface 610-1 of the light guide 610, and an additional out-coupling grating may be, for example stacked with the out-coupling grating 645-2 at the second surface 610-2 of the light guide 620. In the light guide display assembly shown in FIGS. 7A and 7B, to provide 2D pupil replication, two additional out-coupling gratings may be, for example, stacked at the second surface 710-2 of the light guide 710 (opposing the stack of the two out-coupling gratings 745-1 and 745-2).

In the disclosed light guide display assemblies shown in FIGS. 3A-7C, as the lights out-coupled from the light guide by the out-coupling gratings are polarized lights, the light guide display assembly may further include one or more polarization selective elements configured to modulate the lights out-coupled from the light guide by the out-coupling gratings with an improved power efficiency. For example, the light guide display assembly may further include one or more polarization selective lenses coupled with the light guide, and configured to generate a virtual image with an adjustable image distance, based on the lights out-coupled from the light guide by the out-coupling gratings. The term "virtual image" as used herein refers to an image formed at a location at which the lights out-coupled from the light guide would meet when extended in directions opposite to the propagation directions of the lights. A virtual image may be formed at a back side of a lens, and may be perceived by the eye located at the front side of the lens. That is, the virtual image and the eye may be located at different sides of the lens. In some embodiments, the one or more polarization selective lenses may also be configured to adjust the accommodation for different users and/or mitigating the vergence-accommodation conflict in NEDs. Existing NEDs for VR, AR, and/or MR applications often have the so-called vergence-accommodation conflict, where a stereoscopic image pair drives the vergence state of a user's human visual system to arbitrary distances, but the accommodation or focusing state of the user's eyes is optically driven towards a fixed distance. The vergence-accommodation conflict causes eye strain or headaches during prolonged VR/AR/MR sessions, thereby significantly degrading the visual experience of the users. In addition, different users wearing the same NED may have different accommodation abilities, which may vary with an age of a user. In general, older people have a weaker accommodation capability than younger people, i.e., an accommodative range of older people is smaller than that of younger people.

In the disclosed light guide display assemblies shown in FIGS. 3A-7C, the out-coupling gratings and the polarization selective lenses may be configured to have the same type of polarization selectivity, e.g., linear polarization selectivity, circular polarization selectivity, or elliptical polarization selectivity, etc. In some embodiments, the out-coupling grating may be a PVH grating, and the polarization selective lens may be a Pancharatnam-Berry phase ("PBP") lens. Both the PVH grating and the PBP lens may have a circular polarization selectivity. The PVH grating may couple a TIR propagating light out of the light guide as circularly polarized output lights. The PBP lens may utilize the circularly polarized output lights received from the PVH grating with negligible efficiency loss.

In a conventional light guide display assembly having a single, polarization nonselective out-coupling element, the out-coupling element may couple a TIR propagating light out of a light guide as an unpolarized output light, and an absorptive polarizer may be disposed between the out-coupling element and the polarization selective lens to convert the unpolarized output light into a polarized output light with a predetermined polarization. Thus, at least half of the light intensity of the unpolarized output light may be lost after the unpolarized output light propagates through the absorptive polarizer due to the absorption by the absorptive polarizer, resulting in a loss of the power efficiency of the light guide display assembly. In addition, the polarization selective lens may be a refractive lens that is relatively thick and heavy.

In the disclosed light guide display assemblies of the present disclosure, through coupling the out-coupling element (e.g., PVH grating) with the polarization selective lens (e.g., PBP lens) having the same type of polarization selectivity, an absorptive polarizer (or additional polarization conversion elements) may be omitted. The polarized output lights output from the out-coupling element (e.g., PVH grating) may be fully utilized by the polarization selective lens with negligible efficiency loss. Thus, the power efficiency of the NED may be improved, while the weight and cost of the NED may be reduced. In addition, the PBP lens may be a diffractive lens having a substantially small thickness, e.g., within a range of 1-10 microns. Thus, the disclosed light guide display assemblies may have a compactness that significantly reduces the form factor of an optical system including the disclosed light guide display assemblies.

In some embodiments, the out-coupling element (e.g., PVH grating) and the polarization selective lenses may have different types of polarization selectivity, and one or more polarization conversion elements (e.g., a waveplate) may be disposed between the out-coupling element (e.g., PVH grating) and the polarization selective lens. For example, the out-coupling element (e.g., PVH grating) may have a circular polarization selectivity, and the polarization selective lens may have a linear polarization selectivity. In some embodiments, a quarter waveplate ("QWP") may be disposed between the out-coupling element (e.g., PVH grating) and the polarization selective lens to convert a circularly polarized output light output from the light guide to a linearly polarized light. The QWP may have a negligible efficiency loss during the polarization conversion. Thus, the polarization selective lens may utilize the circularly polarized output light output from the light guide with negligible efficiency loss.

Figure 8A:
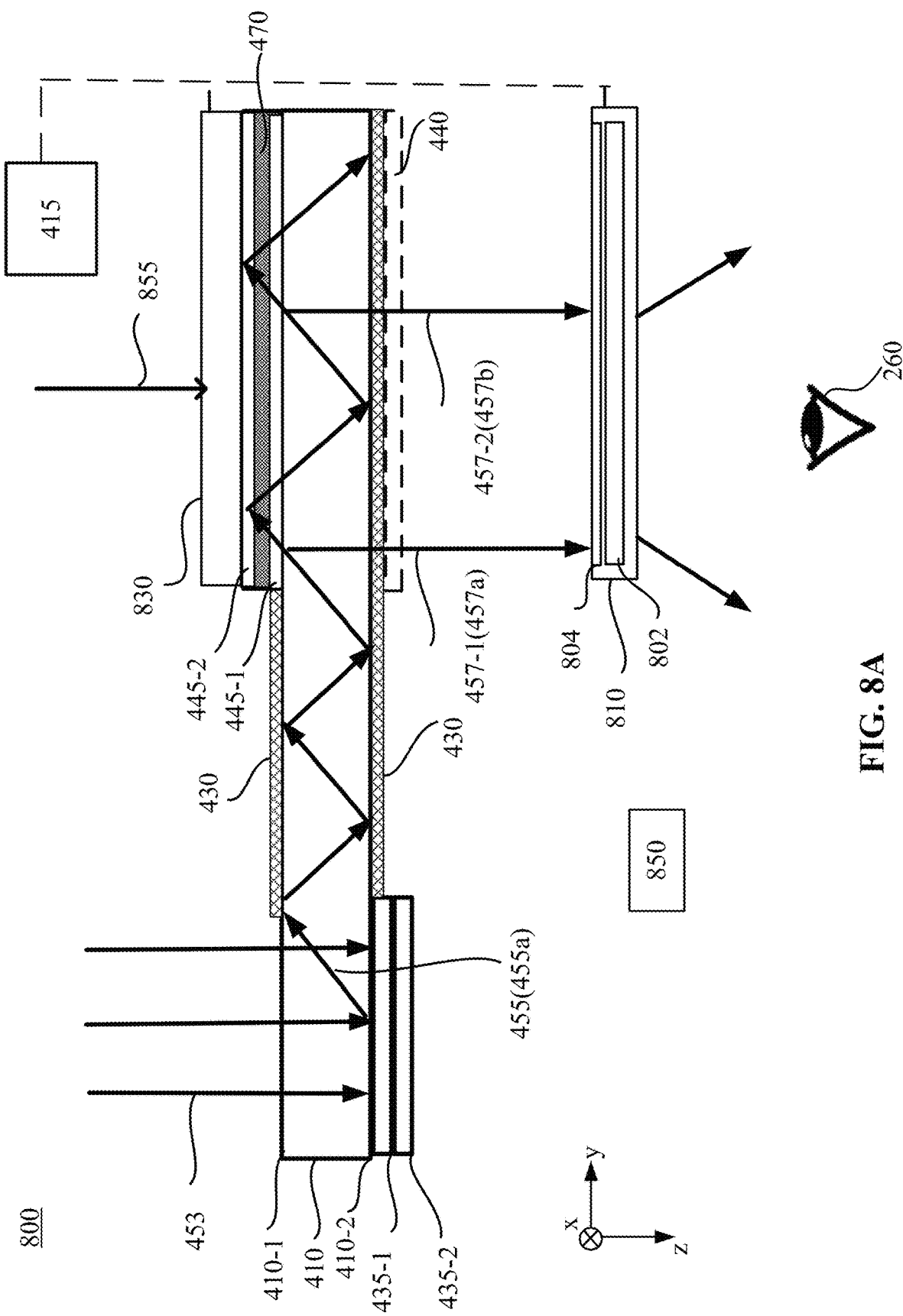
FIGS. 8A and 8B schematically illustrate diagrams of a light guide display assembly during a first sub-frame and a second sub-frame of a display frame, respectively, according to another embodiment of the present disclosure.
Figure 8B:
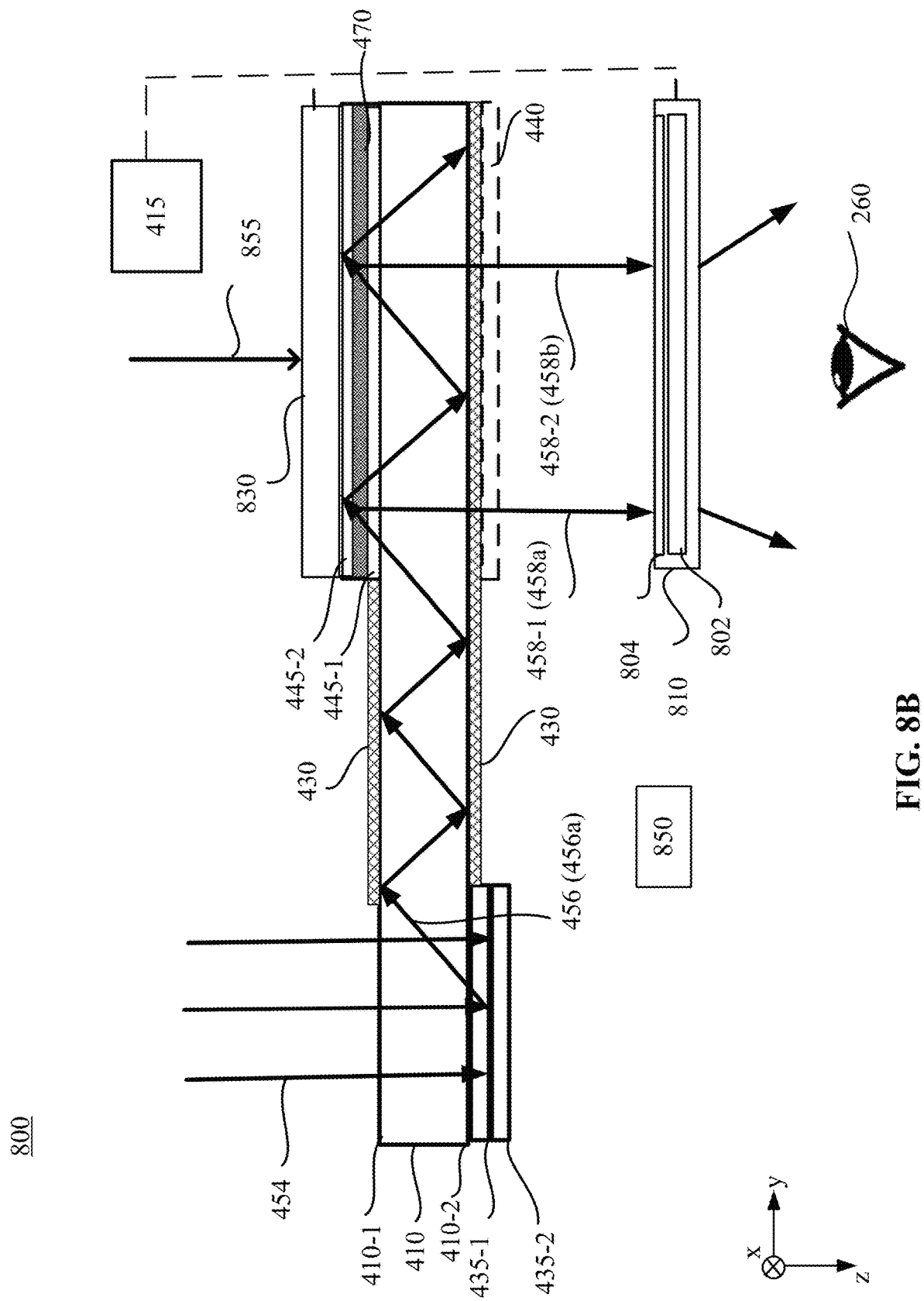

FIGS. 8A and 8B illustrate a schematic diagram of a light guide display assembly 800 during a first sub-frame and a second sub-frame, respectively, according to another embodiment of the disclosure. The light guide display assembly 800 may include elements similar to or the same as those included in the light guide display assembly 300 shown in FIG. 3A, the light guide display assembly 380 shown in FIG. 3B, the light guide display assembly 400 shown in FIGS. 4A and 4B, the light guide display assembly 500 shown in FIG. 5, the light guide display assembly 600 shown in FIGS. 6A and 6B, or the light guide display assembly 700 shown in FIGS. 7A and 7B. Descriptions of the same or similar element can refer to the above descriptions rendered in connection with FIG. 3A, FIG. 3B, FIGS. 4A and 4B, FIG. 5, FIGS. 6A and 6B, or FIGS. 7A and 7B.

For discussion purposes, FIGS. 8A and 8B show the light guide display assembly 800 may include elements similar to or the same as those included in the light guide display assembly 400 shown in FIGS. 4A and 4B (the light source assembly 415 is not shown in FIGS. 8A and 8B). The light guide display assembly 800 may further include an optical lens assembly 810 disposed at an output side of the light guide 410 facing the eye 260, e.g., a second surface 410-2 of the light guide 410. In some embodiments, the optical lens assembly 810 may function as an eyesight correction lens (also referred to as prescription correction lens or "Rx correction lens") to provide Rx correction and accommodation correction. For example, a user may be near-sighted or far-sighted, and may need to wear prescription glasses during normal life and while using an optical device (e.g., an AR, VR, or MR device). Wearing prescription eyeglasses while wearing an AR, VR, or MR device may be cumbersome. The optical lens assembly 810 may be configured to provide eyesight correction (i.e., prescription correction or "Rx correction") and accommodation correction such that the user need not wear regular prescription glasses when operating the optical device that includes the optical lens assembly 810. In addition, the optical device may be used by different users with different eye prescriptions. The optical lens assembly 810 may provide different Rx corrections and/or accommodation corrections to different users.

The optical lens assembly 810 may be configured to receive image lights out-coupled from the light guide 410 by an out-coupling grating, and generate, based on the out-coupled lights, a virtual image having an image distance (e.g., a distance between the virtual image and the eye 260). The eyes 260 may focus on the virtual image. In some embodiments, the optical lens assembly 810 may be configured to provide an adjustable optical power to the out-coupled lights, thereby adjusting the image distance of the virtual image at which the eyes 260 are focused. Thus, a determined discrepancy between a vergence and an accommodation may be reduced. For example, the optical lens assembly 810 may be configured to receive the first output lights 457-1 and 457-2 out-coupled from the light guide 410 by the first out-coupling grating 445-1, and/or the second output lights 458-1 and 458-2 out-coupled from the light guide 410 by the second out-coupling grating 445-2, and generate a virtual image that is presented to the eye 260 at an image distance (e.g., a distance between the virtual image and the eye 260). In some embodiments, the optical lens assembly 810 may be configured to provide an adjustable optical power to the first output lights 457-1 and 457-2 and/or the second output lights 458-1 and 458-2, thereby adjusting the image distance of the virtual image presented to the eye 260.

The optical lens assembly 810 may include at least one polarization selective lens 802 configured to provide a plurality of optical powers (continuous and/or discrete optical powers), i.e., an optical power adjustable within a predetermined range. In some embodiments, the polarization selective lens 802 may be an active lens, which may be directly switchable by an external field (e.g., an electric field) or indirectly switchable by an external polarization switch coupled with the polarization selective lens 802. In some embodiments, the active lens may be switchable between a lens switched-on state with a non-zero optical power and a lens switched-off state with a substantially zero optical power. In some embodiments, the polarization selective lens 802 may be a passive lens that may be indirectly switchable by an external polarization switch coupled with the polarization selective lens 802. In some embodiments, the passive lens may be switchable between two different optical powers. In some embodiments, the polarization selective lens 802 may be a liquid crystal ("LC") lens.

In some embodiments, the optical lens assembly 810 may also include a polarization independent (or non-selective) lens, such as a glass lens, a plastic lens, and/or an LC lens, etc. In some embodiments, the optical lens assembly 810 may include a plurality of polarization selective lenses (e.g., a lens stack), each of which may be an active lens or a passive lens. The plurality of polarization selective lenses may provide a plurality of combinations of optical powers, i.e., an optical power adjustable within a predetermined range, for the optical lens assembly 810. In some embodiments, the optical lens assembly 810 may also include other optical elements, such as one or more polarization switches. With the adjustable optical power provided by the optical lens assembly 810, different eyesight and/or accommodation corrections may be provided to different users operating the optical device that includes the optical lens assembly 810. In some embodiments, a suitable optical power adjustment mechanism, such as a software adjustment or a hardware adjustment, may be provided in the optical device for manually adjusting the optical power by different users. In some embodiments, the optical power may be automatically adjusted by the optical device (e.g., based on information obtained by an eye-tracking system) to provide a suitable optical power for the eyesight correction and/or accommodation correction for a specific user.

In some embodiments, the out-coupling gratings (e.g., the first out-coupling grating 445-1, the second out-coupling grating 445-2) and the polarization selective lens 802 may have the same type of polarization selectivity, e.g., a linear polarization selectivity, a circular polarization selectivity, or an elliptical polarization selectivity, etc. The out-coupling gratings (e.g., the first out-coupling grating 445-1, the second out-coupling grating 445-2) may provide output lights (e.g., the first output lights 457-1 and 457-2, the second output lights 458-1 and 458-2) with a predetermined polarization to the polarization selective lens 802. The polarization selective lens 802 may generate a virtual image based on the output lights (e.g., the first output lights 457-1 and 457-2, the second output lights 458-1 and 458-2) with negligible efficiency loss.

In some embodiments, the first out-coupling grating 445-1 and the second out-coupling grating 445-2 may be PVH gratings that are circular polarization selective, and the polarization selective lens 802 may be a PBP lens 802 that is circular polarization selective. For example, the PBP lens 802 may be configured to defocus (or diverge) a circularly polarized light having a first handedness and focus (or converge) a circularly polarized light having a second handedness that is opposite to the first handedness. For example, during the first sub-sub frame of the display frame, as shown in FIG. 8A, the first out-coupling grating 445-1 may couple the first TIR propagating light 455 out of the light guide 410 as the first output lights 457-1 and 457-2 that are circularly polarized output lights with the first handedness. The second polarization switch 440 disposed between the light guide 410 and the optical lens assembly 810 may be controlled by the controller 415 to operate in the non-switching state, and transmit the first output lights 457-1 and 457-2 without changing the polarization thereof. Thus, the PBP lens 802 in the optical lens assembly 810 may be configured to diverge the first output lights 457-1 and 457-2, and generate a virtual image.

During the second sub-sub frame of the display frame, as shown in FIG. 8B, the second out-coupling grating 445-2 may couple the second TIR propagating light 456 out of the light guide 410 as the second output lights 458-1 and 458-2 that are circularly polarized output lights with the second handedness. The second polarization switch 440 disposed between the light guide 410 and the optical lens assembly 810 may be controlled by the controller 415 to operate in the switching state, and transmit the second output lights 458-1 and 458-2 while reversing the handedness of the second output lights 458-1 and 458-2 from the second handedness to the first handedness. Thus, the PBP lens 802 in the optical lens assembly 810 may be configured to diverge the second output lights 458-1 and 458-2, generating a virtual image. In some embodiments, the optical power of the PBP lens 802 may be adjustable, when controlled by the controller 415, such that the PBP lens 802 may be configured to diverge the first output lights 457-1 and 457-2 (the second output lights 458-1 and 458-2) to generate a virtual image with a desirable image distance, thereby reducing a discrepancy between a vergence and an accommodation.

In some embodiments, the light guide display assembly 800 may not include the second polarization switch 440 disposed between the light guide 410 and the optical lens assembly 810. Instead, the optical lens assembly 810 may include a polarization switch 804 disposed between the light guide 410 and the polarization selective lens 802. In some embodiments, the polarization switch 804 may be similar to the second polarization switch 440, for example, the polarization switch 804 may include an SHWP. The SHWP operating at the switching state may reverse the handedness of a circularly polarized light, and the SHWP operating at the non-switching state may transmit a circularly polarized output light without reversing the handedness. Thus, the polarization switch (e.g., the SHWP) 804 may be configured to control a handedness of a circularly polarized light (e.g., the first output lights 457-1 and 457-2, the second output lights 458-1 and 458-2) before the circularly polarized output light is incident onto the PBP 802, thereby controlling the optical state of the PBP lens 802. In some embodiments, the controller 415 may be communicatively coupled with the optical lens assembly 810, and may control the operations of the elements (e.g., the polarization switch 804 and/or the polarization selective lens 802) included in the optical lens assembly 810.

In some embodiments, the light guide display assembly 800 may also include an eye-tracking system 850 configured to determine eye-tracking information relating to the eye 260. In some embodiments, based on the eye-tracking information (e.g., vergence distance), the controller 415 may control the polarization selective lens (e.g., PBP lens) 802 to provide an optical power. Accordingly, the optical lens assembly 810 may provide the optical power to the first output lights 457-1 and 457-2 (or the second output lights 458-1 and 458-2) to generate a virtual image with a desirable image distance to reduce a discrepancy between the vergence and the accommodation. In some embodiments, the eye-tracking system 850 may include suitable elements to obtain eye-tracking information. For example, the eye-tracking system 850 may include one or more light sources configured to illuminate one or both eyes 260 of the user. In some embodiments, the eye-tracking system 850 may include one or more sensors (e.g., optical sensors such as cameras, or other sensors) configured to capture data (e.g., images, other sensor information) of one or both eyes of the user for determining the eye-tracking information. In some embodiments, the eye-tracking system 850 may include a processor configured to control the sensors (e.g., camera or other suitable sensors), the light sources, and/or to analyze the sensor data (e.g., captured images) to obtain the eye-tracking information. The eye-tracking information may include information of an orientation of the eye 260 in the eye-box, i.e., information about an angle of an eye gaze. In some embodiments, the eye 260 may be illuminated by a structured light, and the eye-tracking system 850 may determine the position and eye gaze of the eye 260 based on locations of the structured light reflected by the eye 260 in a captured image. In some embodiments, the eye-tracking system 850 may determine the position and eye gaze of the eye 260 based on numbers of the images captured over a plurality of time instants or time durations. In some embodiments, the processor may be configured to determine a vergence distance of the gaze of the user based on the gaze point or an estimated intersection of the gaze lines. Vergence is the simultaneous movement or rotation of both eyes in opposite directions to maintain a single binocular vision, which is naturally and automatically performed by the human eyes. Thus, a location where the eyes 260 are verged is where the user is currently looking at and is also typically the location where the eyes are currently focused. For example, the processor may triangulate the gaze lines to estimate a distance or depth from the user associated with intersection of the gaze lines. Then the depth associated with intersection of the gaze lines may be used as an approximation for the accommodation distance, which identifies a distance from the user where the eyes 260 are looking at. Thus, the vergence distance may allow for the determination of a location where the eyes are to be focused. In some embodiments, the controller 415 and the eye-tracking system 850 may use the same processor, e.g., the processor included in the controller 415.

In some embodiments, the optical lens assembly 810 may be a first optical lens assembly 810, and the light guide display assembly 800 may also include a second optical lens assembly 830, as shown in FIG. 8B. When the light guide display assembly 800 is configured for AR and/or MR applications, the second optical lens assembly 830 may be configured to compensate for the distortion of the real-world images caused by the first optical lens assembly 810. Thus, the real-world objects viewed through the light guide 410 may remain unaltered. The optical powers provided by the first optical lens assembly 810 and the second optical lens assembly 830 may have opposite signs and a substantially same absolute value. For example, when the first optical lens assembly 810 is configured to provide a positive optical power to a light 855 from a real world environment, the second optical lens assembly 830 may be configured to provide a negative optical power of the same magnitude to the light 855. In some embodiments, when the light guide display assembly 800 is used for VR applications, the second optical lens assembly 830 may be omitted or configured to operate at a zero optical power state.

Figure 9B:
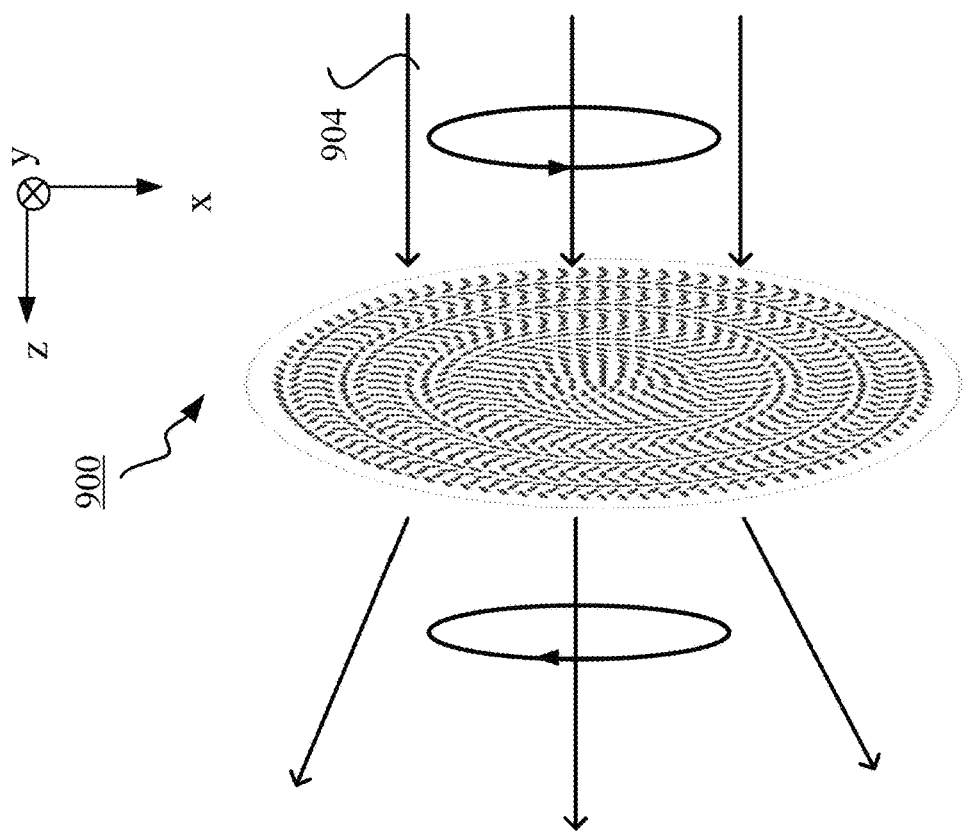
FIG. 9B schematically illustrates a PBP lens operating in a defocusing state, according to an embodiment of the present disclosure.
Figure 9A:
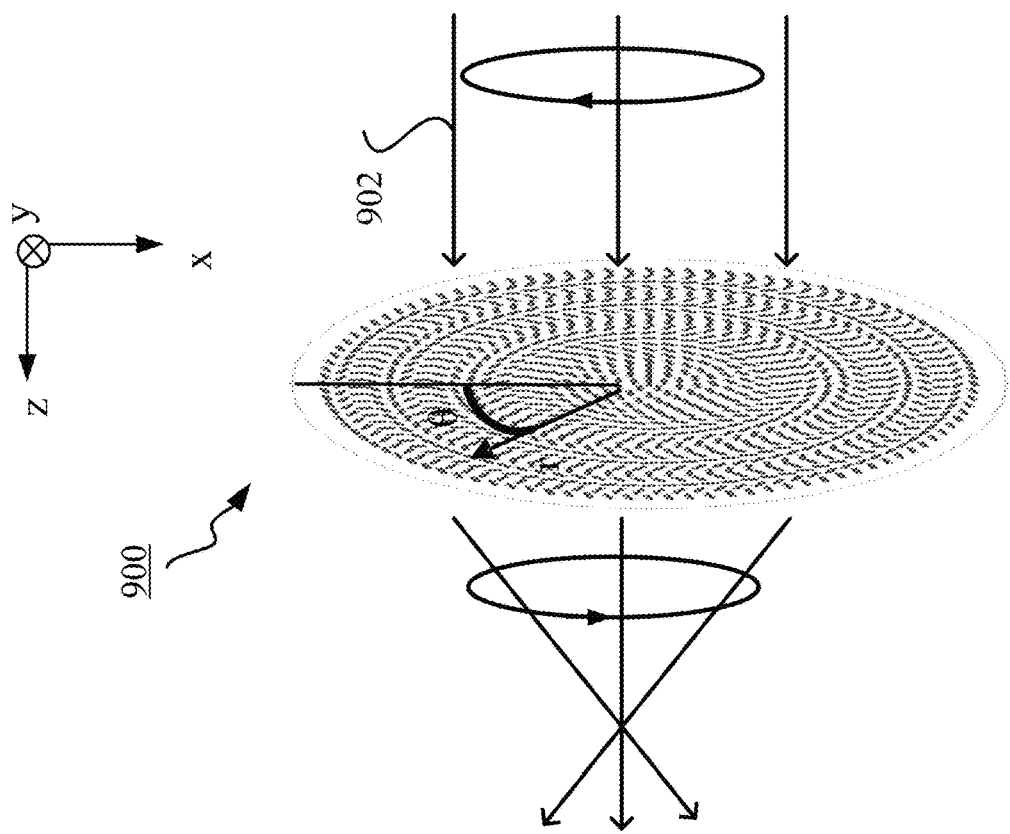
FIG. 9A schematically illustrates a Pancharatnam-Berry phase ("PBP") lens operating in a focusing state, according to an embodiment of the present disclosure.

FIG. 9A illustrates schematic diagrams of a PBP element (e.g., a PBP lens) 900 operating at a converging state, and FIG. 9B illustrates the PBP lens 900 operating at a diverging state, according to another embodiment of the disclosure. The PBP lens 900 may be an embodiment of the polarization selective lens 802 included in the first optical lens assembly 810 shown in FIGS. 8A and 8B. The PBP lens 900 may be a diffractive lens sensitive to handedness of a circularly polarized incident light. As shown in FIG. 9A, the PBP lens 900 may include a thin film of LCs (or an LC film), and may create a lens profile via an in-plane orientation (azimuth angle θ) of LC molecules. When the thickness of the LC film corresponds to a half-wave plate (phase difference of π between the ordinary and the extraordinary polarization), the phase difference T between two points across the light profile may be equal to two times of the relative rotation of the optic axis, i.e., T=2θ.

In some embodiments, the PBP lens 900 may be an active lens having three optical states. The PBP lens 900 may include electrodes electrically coupled with a power source. The power source may be controlled by a controller. The controller may control the power source to supply a predetermined voltage to the electrodes to control the state of the PBP lens 900. The three optical states are a focusing (or converging) state, a neutral state, and a defocusing (or diverging) state. The PBP lens 900 operating at the focusing state may have a positive focus of f and the PBP lens 900 operating at the defocusing state may have a negative focus of −f. The PBP lens 900 operating at the focusing state or defocusing state may reverse the handedness of a circularly polarized incident light propagating through the PBP lens 900, in addition to being focused or defocused. The PBP lens 900 may operate at the neutral state when a voltage applied to the PBP lens 900 is sufficiently high to re-orientate the LC molecules along a direction of a generated electric field. The PBP lens 900 operating at the neutral state may have a substantially zero optical power, and may maintain or reverse the handedness of circularly polarized light propagating through the PBP lens 900.

In some embodiments, the PBP lens 900 may be a passive lens having two optical states (or operating state): a focusing state and a defocusing state. The optical state of the PBP lens 900 may be determined by the handedness of the circularly polarized light incident onto the PBP lens 900. The PBP lens 900 may operate in the focusing state for a circularly polarized light having a predetermined handedness (e.g., left handedness or right handedness), and operate in a defocusing state for a circularly polarized light having a handedness that is opposite to the predetermined handedness. For example, as shown in FIG. 9A, the PBP lens 900 may operate in the focusing state (or a converging state) for a right-handed circularly polarized ("RHCP") incident light 902. As shown in FIG. 9B, the PBP lens 900 may operate in the defocusing state (or a diverging state) for an LHCP incident light 904. Thus, the PBP lens 900 may be indirectly switched between operating in the focusing state and operating in the defocusing state by switching the handedness of the polarization of the incident light. In some embodiments, the PBP lens 900 may be configured to operate in the focusing state for an LHCP incident light and operate in the defocusing state for an RHCP incident light. In addition, the PBP lens 900 may reverse the handedness of a circularly polarized light propagating therethrough in addition to focusing or defocusing (or converging or diverging) the circularly polarized incident light. The switching of the handedness of the polarization of the incident light may be achieved through a polarization switch disposed at a light incidence side of the PBP lens 900. The detailed operation principles of the polarization switch have been described above.

Figure 9C:
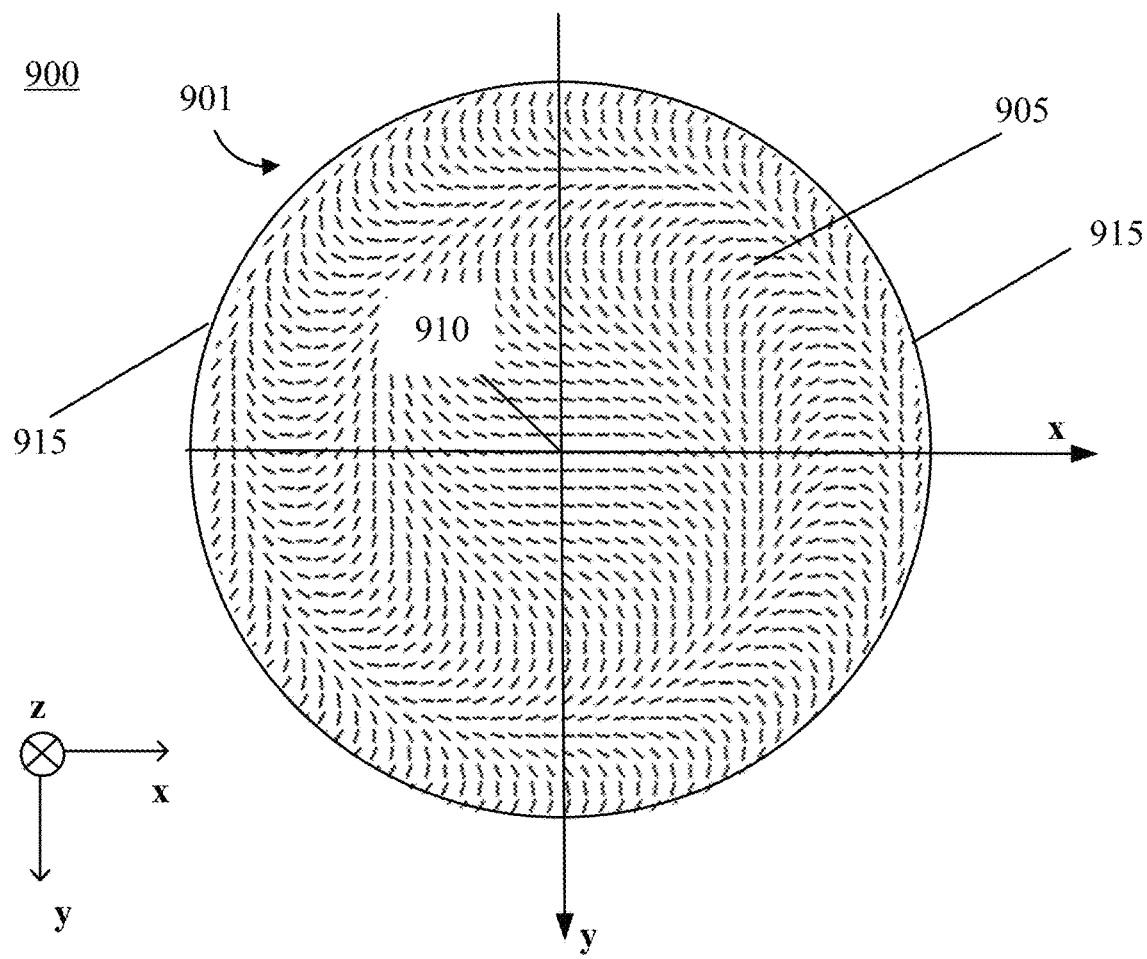
FIG. 9C schematically illustrates an LC alignment pattern in a PBP lens, according to an embodiment of the present disclosure.
Figure 9D:
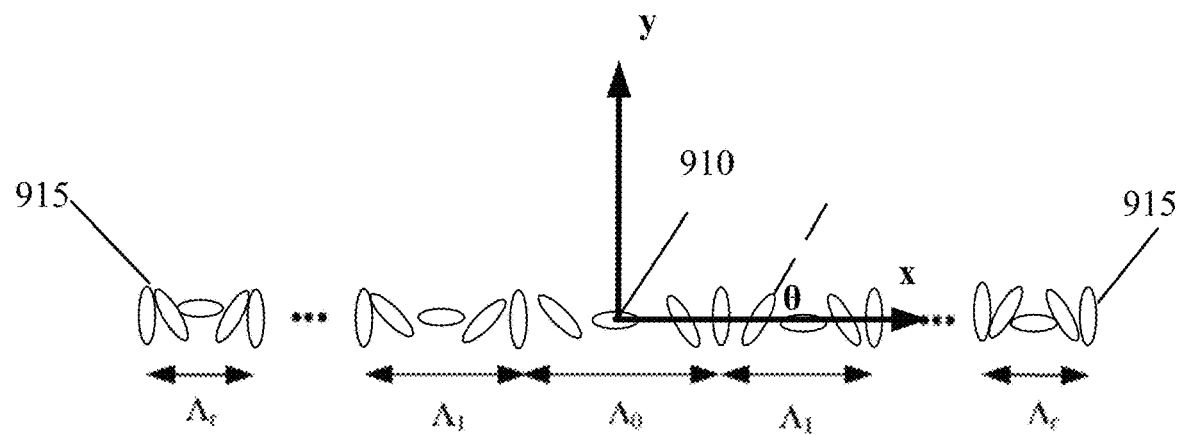
FIG. 9D schematically illustrates a section of an LC alignment pattern taken along an x-axis in the PBP lens shown in FIG. 9C, according to an embodiment of the present disclosure.

FIG. 9C illustrates an LC alignment pattern in the PBP lens 900 shown in FIG. 9A, according to an embodiment of the present disclosure. FIG. 9D illustrates a section of an LC alignment pattern taken along an x-axis in the PBP lens 900 shown in FIG. 9C, according to an embodiment of the present disclosure. As shown in FIG. 9C, the PBP lens 900 may include an LC film 901. A lens layer refers to a layer of the LC film 901 included in the PBP lens 900. The directors of LC molecules 905 may be configured with a continuous in-plane rotation pattern, or the azimuthal angles of the LC molecules 905 may be configured with a continuous in-plane changing pattern. Orientations of the LC directors (or azimuthal angles (θ) of the LC molecules 905) may be configured with a continuous in-plane rotation pattern having a varying pitch from a lens center 910 to a lens periphery 915 in a plurality of radial directions. Thus, an optic axis of the LC film 901 may be configured with a continuous in-plane rotation pattern having a varying pitch from the lens center 910 to the lens periphery 915 in the radial directions. A pitch Λ of the continuous in-plane rotation pattern may be defined as a distance over which the azimuthal angle (θ) of the LC molecule 905 (or the orientation of the LC directors) changes by a predetermined amount (e.g., 180°).

As shown in FIGS. 9C and 9D, according to the LC director field along the x-axis, the pitch Λ may be a function of the distance from the lens center 910. The pitch may monotonically decrease from the lens center 910 to the lens periphery 915 in a radial direction in the x-y plane, i.e., $\Lambda_0 > \Lambda_1 > \ldots > \Lambda_r$, where $\Lambda_0$ is the pitch at a central region of the PBP lens 900, which may be the largest. The pitch $\Lambda_r$ is the pitch at an edge region of the PBP lens 900, which may be the smallest. In the x-y plane, the LC director of the LC molecules 905 may continuously rotate in a rotation pattern having a varying pitch ($\Lambda_0, \Lambda_1, \ldots, \Lambda_r$) along the opposite radial axes or directions.

Figure 9E:
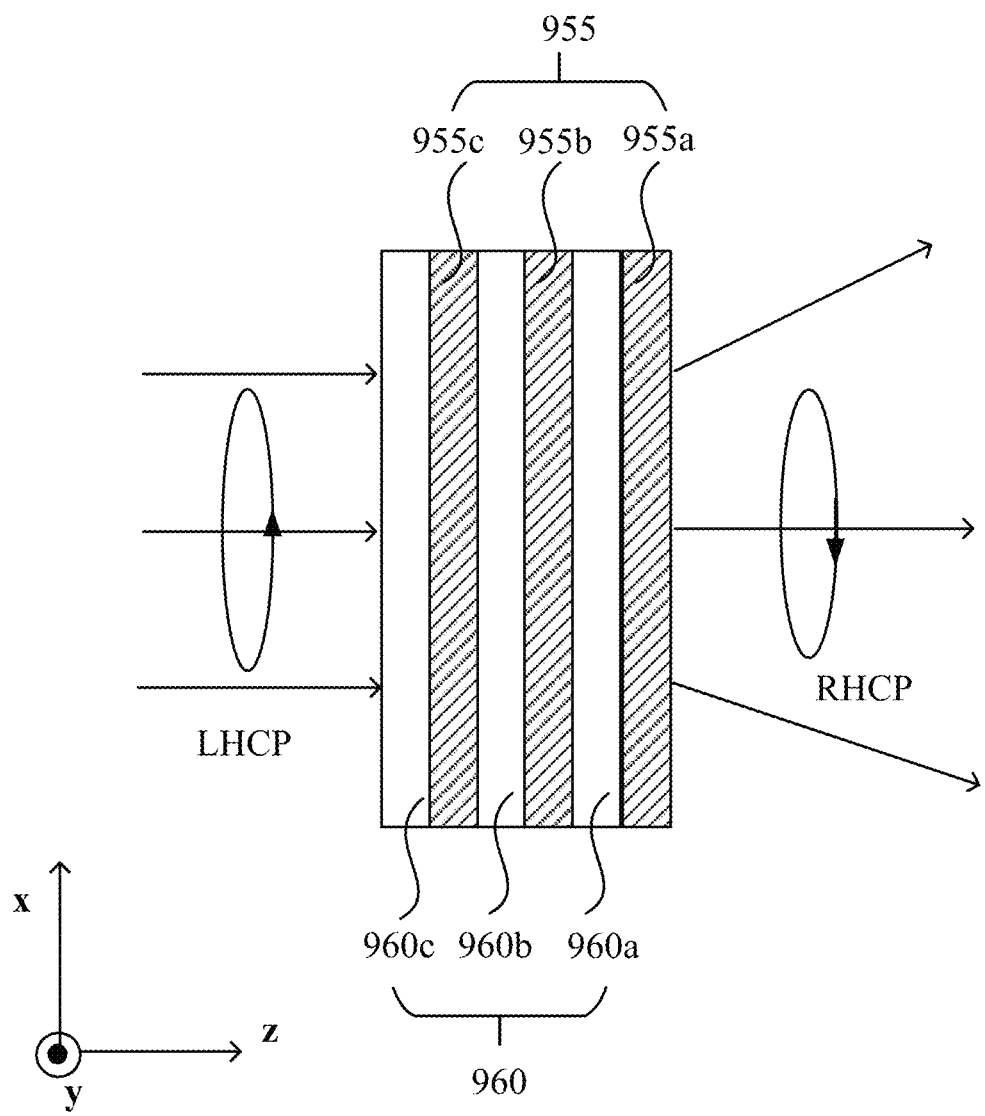
FIG. 9E schematically illustrates a diagram of a PBP lens stack, according to an embodiment of the disclosure.

FIG. 9E illustrates a schematic diagram of a PBP lens stack 950, according to an embodiment of the disclosure. The PBP lens stack 950 may be included in the optical lens assembly 810 shown in FIGS. 8A and 8B. As shown in FIG. 9E, the PBP lens stack 950 may include a plurality of PBP lenses 955 (e.g., 955a, 955b, and 955c) arranged in an optical series. The plurality of PBP lenses 955 may provide a plurality of optical states. The plurality of optical states may correspond to a plurality of optical powers for PBP lens stack 950. Thus, the PBP lens stack 950 may provide a variable optical power adjustable within a range defined by a minimum optical power and a maximum optical power. An optical power P of the PBP lens stack 950 may be a sum of the optical powers of the respective PBP lenses 955 included in the PBP lens stack 950. In some embodiments, the PBP lens stack 950 may include at least one SHWP arranged adjacent a PBP lens. For illustrative purposes, FIG. 9E shows that the PBP lens stack 950 may include a plurality of SHWPs 960 (e.g., three SHWPs 960a, 960b, and 960c) and a plurality of PBP lenses 955 (e.g., three PBP lenses 955a, 955b, and 955c) alternately arranged. The SHWP 960 may be configured to reverse or maintain a handedness of a polarized light depending on an operating state of the SHWP. A thickness of an individual PBP lens 955 (e.g., 955a, 955b, or 955c) may be 1-10 microns, which may be negligible when compared with a thickness of the substrate. Thus, an overall thickness of the PBP lens stack 950 may be substantially determined by the thickness of the glass or plastic substrate(s). The overall thickness of the PBP lens stack 950 may have a thickness of, for example, 1-10 millimeters. Although three lenses 955a, 955b, and 955c and three SHWPs 960a, 960b, and 960c are shown in FIG. 9E for illustrative purposes, the PBP lens stack 950 may include any suitable number of lenses (including any suitable number of disclosed off-axis focusing PBP lenses), such as one, two, four, five, etc., and any suitable number of SHWPs, such as one, two, four, five, etc.

In some embodiments, the PBP lens stack 950 may include one or more active PBP lenses 955, which may provide an optical power (zero or non-zero optical power) depending on the handedness of a circularly polarized light incident on the PBP lens 955, the handedness of LC director rotation in the PBP lens 955, and an applied voltage. In some embodiments, each PBP lens 955 included in the PBP lens stack 950 may be an active PBP lens, and the PBP lens stack 950 may be switchable between a focusing state (or a defocusing state) and a neutral state by the applied voltage. In some embodiments, the PBP lens stack 950 may include one or more passive PBP lenses 955, which may provide an optical power (zero or non-zero optical power) depending on the handedness of a circularly polarized light incident on the PBP lens 955 and the handedness of LC director rotation in the PBP lens 955. Thus, through controlling the operating state (switching or non-switching state) of the at least one SHWP 960 coupled with a corresponding PBP lens 955, the PBP lens stack 950 may provide a plurality of optical states. In some embodiments, the PBP lens stack 950 may include at least one active PBP lens and at least one passive PBP lens. Through controlling the operating state (switching or non-switching state) of the at least one SHWP 960 coupled with a corresponding passive PBP lens, and controlling the operating state (switching or non-switching state) of the at least one SHWP 960 coupled with a corresponding active PBP lens and an applied voltage applied to the active PBP lens, the PBP lens stack 950 may provide a plurality of optical states. The plurality of optical states may correspond to a plurality of optical powers. That is, the PBP lens stack 950 may provide a variable optical power that may be adjusted within a range defined by a minimum optical power and a maximum optical power.

It is noted that the number of pupils shown in the figures is for illustrative purposes. The number of pupils provided in each assembly may be any suitable number. In the light guide display assemblies shown in the figures, the TIR propagating light may be an unpolarized light or a polarized light. As the TIR propagating light propagates inside the light guide, the polarization of the TIR propagating light may or may not be maintained. When the TIR propagating light arrives at the first and second out-coupling elements, the TIR propagating light may be polarized (e.g., circularly, linearly, or elliptically polarized) or unpolarized.

Figure 10:
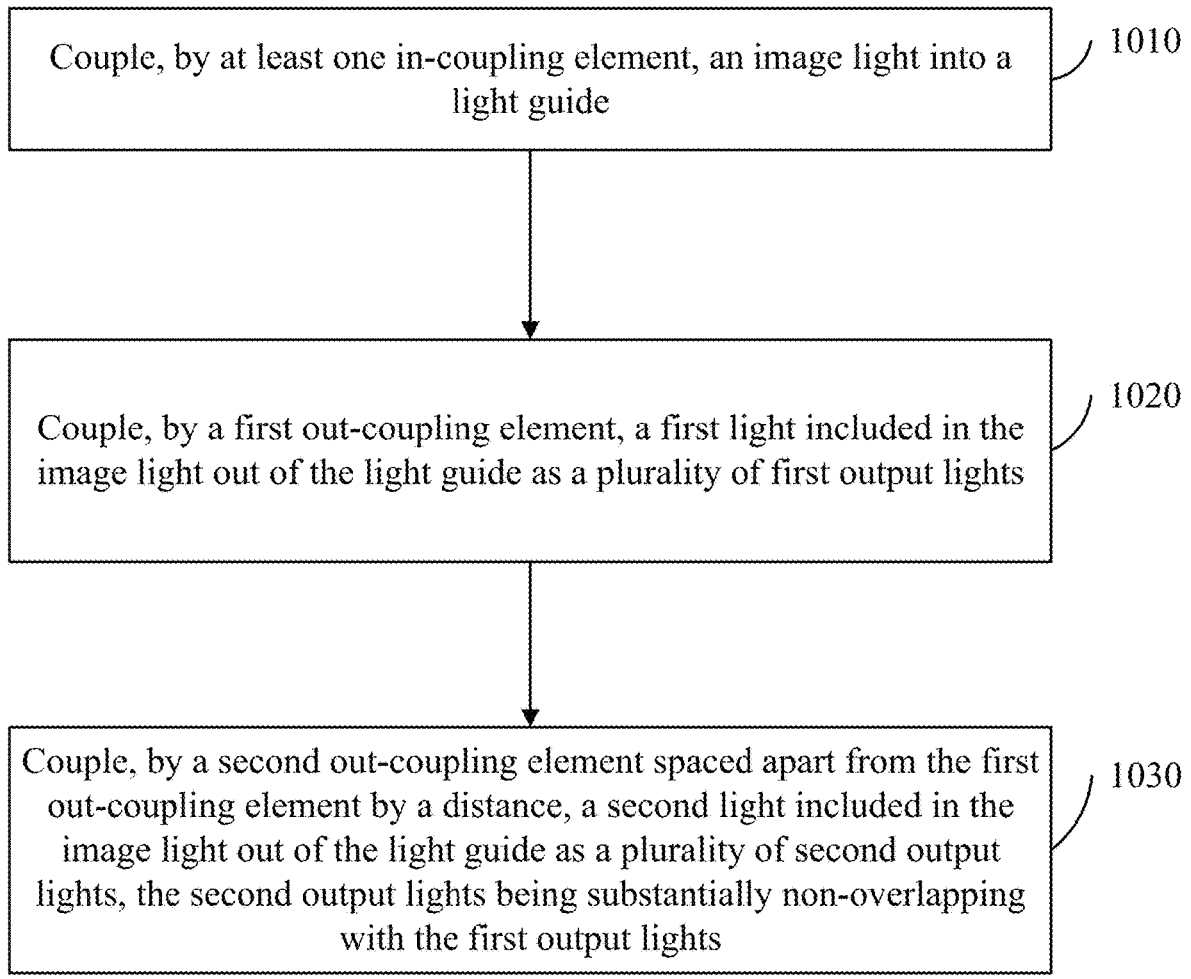
FIG. 10 is a flowchart illustrating a method for providing an increased pupil replication density, according to an embodiment of the present disclosure.

FIG. 10 is a flowchart illustrating a method 1000 for providing an increased pupil replication density, according to an embodiment of the present disclosure. The method 1000 may include coupling, by at least one in-coupling element, an image light into a light guide (step 1010). In some embodiments, the at least one in-coupling element may be polarization nonselective. In some embodiments, the at least one in-coupling element may include a first in-coupling element and a second in-coupling element, each being polarization selective. The first in-coupling element and the second in-coupling element may be configured to couple two orthogonally polarized components (or lights) included in the image light into the light guide as two TIR propagating lights.

The method 1000 may include coupling, by a first out-coupling element, a first light included in the image light out of the light guide as a plurality of first output lights (step 1020). The method 1000 may also include coupling, by a second out-coupling element spaced apart from the first out-coupling element by a distance, a second light included in the image light out of the light guide as a plurality of second output lights, the second output lights being substantially non-overlapping with the first output lights (step 1030). In some embodiments, the first out-coupling element and second out-coupling element may be polarization selective with different polarization selectivities (e.g., gratings configured to diffract lights of orthogonal polarizations). In some embodiments, the first light and the second light may be two separate lights. The first light may be output from the light guide as the plurality of first output lights at a plurality of first positions along the light guide. Each of the first positions may be within a respective output region of the light guide. The first output lights may form a plurality of first pupils. The second light may be output from the light guide as the plurality of second output lights at a plurality of second positions along the light guide. Each of the second positions may be within a respective output region of the light guide. The second output lights may form a plurality of second pupils. A gap between a pair of neighboring first and second pupils within a same output region of the light guide may be configured such that the neighboring first and second pupils are separated from one another, i.e., substantially non-overlapping. In some embodiments, the method 1000 may also include adjusting the gap between the pair of neighboring first and second pupils through adjusting a distance between the first and second out-coupling elements. In some embodiments, the first light and the second light may be lights having different polarizations emitted by a light source assembly simultaneously (e.g., within a same time period), or sequentially (e.g., within two consecutive time periods). In some embodiments, the first light and the second light may be the first polarized component and the second polarized component of an unpolarized light or a linearly polarized light. The first polarized component may have a first polarization, and the second polarized component may have a second polarization that is orthogonal to the first polarization. In some embodiments, the first light and the second light may have the same TIR propagation angle. In some embodiments, each of the first output lights and the second output lights may have a same FOV as the image light emitted by the light source assembly and coupled into the light guide.

Some portions of this description may describe the embodiments of the present disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the present disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or any combination thereof. The PLD may be a complex programmable logic device ("CPLD"), a field-programmable gate array ("FPGA"), etc.

Embodiments of the present disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
    a light guide;
    at least one in-coupling element configured to couple an image light having a predetermined field of view ("FOV") and representing a predetermined image content into the light guide;
    a first out-coupling element configured to couple a first portion of the image light out of the light guide as a plurality of first output lights; and
    a second out-coupling element spaced apart from the first out-coupling element by a distance and configured to couple a second portion of the image light out of the light guide as a plurality of second output lights, the plurality of second output lights being substantially non-overlapping with the plurality of first output lights,
    wherein the plurality of first output lights are associated with the same predetermined FOV and the same image content as the image light, and the plurality of second output lights are associated with the same predetermined FOV and the same image content as the image light.

2. The device of claim 1, wherein a gap between a first output light and a neighboring second output light is adjustable based on the distance between the first out-coupling element and the second out-coupling element.

3. The device of claim 1, wherein the first portion of the image light and the second portion of the image light have orthogonal polarizations.

4. The device of claim 3, wherein
    the first out-coupling element is configured to couple the first portion of the image light out of the light guide at a plurality of first positions along the light guide as the plurality of first output lights, and
    the second out-coupling element is configured to couple the second portion of the image light out of the light guide at a plurality of second positions along the light guide as the plurality of second output lights.

5. The device of claim 1, wherein
    the first out-coupling element and the second out-coupling element are stacked at a same surface of the light guide, and
    a space between the first out-coupling element and the second out-coupling element is at least partially filled with an index-matching material.

6. The device of claim 1, wherein the first out-coupling element and the second out-coupling element are disposed at different surfaces of the light guide, and overlap in a thickness direction of the light guide.

7. The device of claim 1, wherein at least one of the first out-coupling element or the second out-coupling element includes at least one of sub-wavelength structures, a birefringent material, or a photo-refractive holographic material.

8. The device of claim 1, further comprising:
    a light source assembly configured to emit the image light; and
    a controller configured to control the light source assembly to emit the first portion of the image light and the second portion of the image light having orthogonal polarizations during a same time period,
    wherein during the same time period, the first out-coupling element is configured to couple the first portion of the image light out of the light guide as the plurality of first output lights, and the second out-coupling element is configured to couple the second portion of the image light out of the light guide as the plurality of second output lights.

9. The device of claim 1, further comprising:
    a light source assembly configured to emit the image light; and
    a controller configured to control the light source assembly to emit the first portion of the image light and the second portion of the image light having orthogonal polarizations separately during a first time period and a consecutive, second time period,
    wherein the first out-coupling element is configured to couple the first portion of the image light out of the light guide as the plurality of first output lights during the first time period, and the second out-coupling element is configured to couple the second portion of the image light of the light guide as the plurality of second output lights during the second time period.

10. The device of claim 1, further comprising one or more polarization correction films disposed at a surface of the light guide, and configured to maintain a polarization of the image light when the image light propagates inside the light guide through total internal reflection ("TIR").

11. The device of claim 1, wherein the at least one in-coupling element comprises:
    a first in-coupling element configured to couple the first portion of the image light into the light guide as a first total internal reflection ("TIR") propagating light propagating along the light guide; and
    a second in-coupling element configured to couple the second portion of the image light into the light guide as a second TIR propagating light propagating along the light guide.

12. The device of claim 11,
    wherein during a first time period,
        the first out-coupling element is configured to couple a first polarized component of the first TIR propagating light out of the light guide as the plurality of first output lights having a first polarization, and
        the second out-coupling element is configured to couple a second polarized component of the first TIR propagating light out of the light guide as a plurality of third output lights having a second polarization, the second polarization being orthogonal to the first polarization, and
    wherein the device further comprises:
        a polarization switch configured to maintain the first polarization of the first output lights and the second polarization of the third output lights; and
        a polarizer configured to transmit the first output lights and block the third output lights.

13. The device of claim 12,
    wherein during a second time period,
        the first out-coupling element is configured to couple a first polarized component of the second TIR propagating light out of the light guide as a plurality of fourth output lights having the first polarization, and
        the second out-coupling element is configured to couple a second polarized component of the second TIR propagating light out of the light guide as the plurality of second output lights having the second polarization, wherein the polarization switch is configured to change a polarization of the fourth output lights from the first polarization to the second polarization, and change a polarization of the second output lights from the second polarization to the first polarization, and wherein the polarizer is configured to block the fourth output lights and transmit the second output lights.

14. The device of claim 1, further comprising:

an optical lens assembly disposed at an output side of the light guide and configured to provide an adjustable optical power to the first output lights and the second output lights output from the light guide, wherein the optical lens assembly includes at least one polarization selective lens having a same type of polarization selectivity as the first out-coupling element and the second out-coupling element.

15. A device comprising:

a light guide;

at least one in-coupling element configured to couple an image light into the light guide;

a first out-coupling element configured to couple a first portion of the image light out of the light guide as a plurality of first output lights; and a second out-coupling element spaced apart from the first out-coupling element by a distance and configured to couple a second portion of the image light out of the light guide as a plurality of second output lights, the plurality of second output lights being substantially non-overlapping with the plurality of first output lights, wherein the first out-coupling element includes a first polarization selective element having a first polarization selectivity, and the second out-coupling element includes a second polarization selective element having a different, second polarization selectivity.

16. The device of claim 15, wherein the first polarization selective element and the second polarization selective element are polarization selective gratings.

17. The device of claim 15, wherein at least one of the first polarization selective element or the second polarization selective element includes a birefringent material having an optic axis with an orientation spatially varying in both an in-plane direction and an out-of-plane direction.

18. A method, comprising:

coupling, by at least one in-coupling element, an image light into a light guide, the image light having a predetermined field of view ("FOV") and representing a predetermined image content;

coupling, by a first out-coupling element, a first portion of the image light out of the light guide as a plurality of first output lights, wherein the plurality of first output lights are associated with the same predetermined FOV and the same predetermined image content as the image light; and coupling, by a second out-coupling element spaced apart from the first out-coupling element by a distance, a second portion of the image light out of the light guide as a plurality of second output lights, the second output lights being substantially non-overlapping with the first output lights, wherein the plurality of second output lights are associated with the same predetermined FOV and the same predetermined image content as the image light.

19. The method of claim 18, wherein the first portion of the image light and the second portion of the image light have orthogonal polarizations, and the first out-coupling element and the second out-coupling element are polarization selective with different polarization selectivities, and wherein the method further comprises:

coupling, by the first out-coupling element, the first portion of the image light out of the light guide at a plurality of first positions along the light guide as the plurality of first output lights; and coupling, by the second out-coupling element, the second portion of the image light out of the light guide at a plurality of second positions along the light guide as the plurality of second output lights.

20. The method of claim 18, wherein the first portion of the image light and the second portion of the image light have orthogonal polarizations, the at least one in-coupling element comprises a first in-coupling element and a second in-coupling element, and the first out-coupling element and the second out-coupling element are polarization selective with different polarization selectivities, and wherein the method further comprises:

coupling, by the first in-coupling element, the first portion of the image light into the light guide as a first total internal reflection ("TIR") propagating light;

coupling, by the second in-coupling element, the second portion of the image light into the light guide as a second TIR propagating light;

coupling, by the first out-coupling element, the first TIR propagating light out of the light guide at a plurality of first positions along the light guide as the plurality of first output lights; and coupling, by the second out-coupling element, the second TIR propagating light out of the light guide at a plurality of second positions along the light guide as the plurality of second output lights.

\* \* \* \* \*